United States Patent [19]
Glover

[11] Patent Number: 6,092,009
[45] Date of Patent: Jul. 18, 2000

[54] AIRCRAFT TERRAIN INFORMATION SYSTEM

[75] Inventor: J. Howard Glover, Bellevue, Wash.

[73] Assignee: AlliedSignal, Morristown, N.J.

[21] Appl. No.: 08/902,769

[22] Filed: Jul. 30, 1997

Related U.S. Application Data

[60] Provisional application No. 60/023,305, Jul. 30, 1996.

[51] Int. Cl.[7] .................................................. G08G 5/04
[52] U.S. Cl. ........................... 701/14; 340/970; 701/208; 701/213
[58] Field of Search .............................. 701/4–9, 14, 120, 701/301, 302, 208, 213; 73/178 R, 178 T; 244/180, 181; 340/970

[56] References Cited

U.S. PATENT DOCUMENTS

| | | | |
|---|---|---|---|
| 3,715,718 | 2/1973 | Astengo | 340/970 |
| 3,925,751 | 12/1975 | Bateman et al. | 340/967 |
| 3,934,221 | 1/1976 | Bateman et al. | 340/970 |
| 3,934,222 | 1/1976 | Bateman et al. | 340/970 |
| 3,936,796 | 2/1976 | Bateman et al. | 340/970 |
| 3,944,968 | 3/1976 | Bateman et al. | 340/970 |
| 3,947,808 | 3/1976 | Bateman | 340/970 |
| 3,947,810 | 3/1976 | Bateman et al. | 340/970 |
| 3,958,218 | 5/1976 | Bateman | 340/970 |
| 3,958,219 | 5/1976 | Bateman | 340/970 |
| 4,030,065 | 6/1977 | Bateman | 340/970 |
| 4,060,793 | 11/1977 | Bateman | 340/970 |
| 4,063,073 | 12/1977 | Strayer | 364/439 |
| 4,215,334 | 7/1980 | Bateman | 340/970 |
| 4,224,669 | 9/1980 | Brame | 364/433 |
| 4,319,218 | 3/1982 | Bateman | 340/970 |
| 4,484,192 | 11/1984 | Seitz et al. | 340/970 |
| 4,567,483 | 1/1986 | Bateman et al. | 340/970 |
| 4,642,775 | 2/1987 | Cline et al. | 364/443 |
| 4,646,244 | 2/1987 | Bateman et al. | 364/461 |
| 4,675,823 | 6/1987 | Noland | 364/460 |
| 4,835,537 | 5/1989 | Manion | 340/961 |
| 4,894,655 | 1/1990 | Joguet et al. | 340/988 |
| 4,903,212 | 2/1990 | Yokouchi et al. | 364/449.95 |
| 4,912,645 | 3/1990 | Kakihara et al. | 364/449.2 |
| 4,914,436 | 4/1990 | Bateman et al. | 340/970 |
| 4,914,733 | 4/1990 | Gralnick | 340/961 |
| 4,916,448 | 4/1990 | Thor | 340/970 |
| 4,924,401 | 5/1990 | Bice et al. | 364/424.015 |
| 4,947,164 | 8/1990 | Bateman | 340/968 |

(List continued on next page.)

FOREIGN PATENT DOCUMENTS

| | | | |
|---|---|---|---|
| 1033828 | 6/1978 | Canada | 343/15 |
| 0790487A2 | 8/1987 | European Pat. Off. | G01C 23/00 |
| 2689668 | 10/1993 | France | G08G 5/04 |
| 2721130 | 12/1995 | France | G08G 5/04 |
| 4304561A | 8/1994 | Germany | B64D 45/04 |
| 4327706A1 | 2/1995 | Germany | G08G 5/04 |
| 2 266 286 | 10/1993 | United Kingdom | B64D 45/04 |
| WO 85/03566 | 8/1985 | WIPO | G01C 5/00 |

OTHER PUBLICATIONS

Baldwin et al. "GPS–Based Terrain Avoidance Systems—A Solution for General Aviation Controlled Flight into Terrain," *Rannoch Corporation*, (date unknown).

Bateman, "How to Terrain–proof the World's Airline Fleet," *Sundstrand Data Control Flight Safety Foundation*, 44th IASS, Singapore, 1991.

(List continued on next page.)

*Primary Examiner*—William A. Cuchlinski, Jr.
*Assistant Examiner*—Edward J. Pipala

[57] ABSTRACT

In order to provide the pilots with a display or a map of the terrain below the aircraft, a display is generated on a cockpit display, such as a weather radar, of the contours of the terrain below the aircraft. The terrain contour display is generated from aircraft position information and a terrain data base. Terrain contours are depicted with the highest terrain colored red, intermediate terrain contours in green with varying dot densities and the lowest terrain in black.

45 Claims, 38 Drawing Sheets

U.S. PATENT DOCUMENTS

| | | | |
|---|---|---|---|
| 4,954,959 | 9/1990 | Moroto et al. | 364/449.5 |
| 4,987,413 | 1/1991 | Grove | 340/970 |
| 5,086,396 | 2/1992 | Waruszewski, Jr. | 364/454 |
| 5,136,512 | 8/1992 | Le Borne | 364/461 |
| 5,140,532 | 8/1992 | Beckwith, Jr. et al. | 395/101 |
| 5,153,588 | 10/1992 | Muller | 340/968 |
| 5,155,688 | 10/1992 | Tanaka et al. | 364/454 |
| 5,157,615 | 10/1992 | Brodegard | 364/461 |
| 5,196,847 | 3/1993 | Bateman | 340/970 |
| 5,202,690 | 4/1993 | Frederick | 342/26 |
| 5,252,978 | 10/1993 | Priestley | 342/29 |
| 5,257,195 | 10/1993 | Hirata | 364/449.95 |
| 5,265,025 | 11/1993 | Hirata | 364/449.7 |
| 5,285,391 | 2/1994 | Smith, Jr. et al. | 364/443 |
| 5,293,163 | 3/1994 | Kakihara et al. | 340/995 |
| 5,293,318 | 3/1994 | Fukushima | 364/449.95 |
| 5,337,242 | 8/1994 | Yamamoto et al. | 364/449.2 |
| 5,414,631 | 5/1995 | Denoize et al. | 364/461 |
| 5,442,556 | 8/1995 | Boyes et al. | 364/461 |
| 5,486,821 | 1/1996 | Stevens et al. | 340/970 |
| 5,488,563 | 1/1996 | Chazelle et al. | 364/461 |
| 5,495,249 | 2/1996 | Chazelle et al. | 342/36 |
| 5,526,000 | 6/1996 | Chazelle et al. | 342/407 |
| 5,638,282 | 6/1997 | Chazelle et al. | 364/461 |
| 5,661,486 | 8/1997 | Faivre et al. | 342/33 |
| 5,677,842 | 10/1997 | Denoize et al. | 364/461 |
| 5,839,080 | 11/1998 | Muller et al. | 701/9 |

OTHER PUBLICATIONS

Bennett and Cockburn, "Pilot Monitoring of Display Enhancements Generated From A Digital Data Base," *AGARD Conference Proceedings No. 456*, 1990.

Bennett, "The Use of Digital Map Data to Provide Enhanced Navigation and Displays for Poor Weather Penetration and Recovery," *GEC Marconi Avionics*, 1993.

Bice, "Development of an Automated Ground Collision Avoidance System Using A Digital Terrain Database," *Wright Patterson AFB*, 1989.

DiPadua et al., "Comparison of the General Dynamics Ground Clobber Algorithm with the GCAS and Laws Algorithms," *Crew Station Design Facility, Wright Patterson AFB*, 1988.

Fitzgerald and Brunner, "Use of High–Fidelity Simulation in the Development of an F/A–18 Active Ground Collision Avoidance System," *SAE International*, 1992.

Fitzsimmons, "First moves towards an "intelligent" GPWS,", *Interavia/Aerospace World*, 1993.

Grey and Dale, "Advances in Techniques and Technologies for Air Vehicle Navigation and Guidance," *NATO Advisory Group for Aerospace Research and Development (AGARD)*, Guidance and Control Panel 48th Symposium, 1989.

Hewitt, "The Use of Terrain Databased for Avionic Systems," *The Institution of Electrical Engineers*, 1995.

Hopkins et al., "Quo Vadis?," *Flight International* 11–17:37–40, Mar., 1992.

"GCAS—Past, Present and Future of Alert Systems for Abnormal Closure to Ground," *Abstract*, 1993, translation by Kei Kino.

Kuchar and Hansman, Jr., "Part–Task Simulator Evaluations of Advanced Terrain Display," Preprints, SAE Aerotech Conference and Exposition, Anaheim, CA, 1993.

Lawrence, "Modern Inertial Technology," Springer–Verlag New York, Inc., 1993.

LeBorn, "A Generic Ground Collision Avoidance System for Tactical Aircraft," *Cubic Defense Systems*, San Diego, California. IEEE National Aerospace and Electronics Conference, 1988.

Moller and Sachs, "Synthetic Vision for Enhancing Poor Visibility Flight Operations," *IEEE AES Systems*:27–42, 1994.

Rueb, et al., "Evaluation of the C/EC/KC–135 Ground Collision Avoidance System (GCAS) (Study 2)," *Integrated Engineering and Tech. Management Directorate*, Wright–Patterson AFB, Final Report, 1993.

Shah, "Ground Collision Warning System Performance Criteria for High Maneuverability Aircraft," *Flight Stability and Control Branch* Wright Patterson AFB, 1988.

Stevens, "Terprom Helps Low–Altitude Flight,: Terrain_ Navigation System for Flying at Low Height," *Elektronica* 1986, (Dutch) w/English Transl.

"Safety Through Interactions and International Standards," *Proceedings of the Flight Safety Foundation* , 46th Annual International Air Safety Seminar, Kuala Lumpuir, Malaysia, 1993.

Williams and Mitchell, "Effects of Integrated Flight Path and Terrain Displays on Controlled Flight into Terrain," Center for Human–Machine Systems Research, School of Industrial and Systems Engineering, Georgia Institute of Technology.

Young, Warning System Concepts to Prevent Controlled Flight Into Terrain (CFIT), *Defense Systems & Electronics Group*, Texas Instruments, Inc. IEEE, 1993.

"Bae Terrain Software Bound for USF–16," *Flight International*, Aug., 1993, Computer Printout.

"Technology and Air Attack," *Asian Defense Journal*, 1993. The F–16 Digital Terrain System, British Aerospace, The Institute of Electrical Engineers, 1995.

"GCAS—Past, Present and Future of Alert Systems for Abnormal Closure to Ground," *Abstract*, Mar., 1993, Translation of Abstract. (Japanese).

"Terrain Databases and Their Use In Navigation and Collision Avoidance," Institute of Electrical Engineers, Electronics Division Colloquim, Professional Group E15, Radar Sonar and Navigation Systems, Digest No. 1995/066, 1995, paper by Allerton.

Kucher and Hansman, Jr., "Part–Task Simulation Study of Candidate Terrain Alerting Displays," Department of Aeronautics and Astronautics, Massachusetts Institute of Technology, Jun. 30, 1993.

Kuchar and Hansman, Jr., "Advanced Terrain Displays for Transport Category Aircraft," ASL, Department of Aeronautics & Astronautics, Massachusetts Institute of Technology, Aug. 23, 1991.

"The Future Flight Deck," The Flight Operations Group of the Royal Aeronautical Society and The Guild of Air Pilots and Air Navigators of London.

Hewitt et al., "A Ground and Obstacle Collision Avoidance Technique (GOCAT)," *IEEE*, May, 1991.

Moore, "We Have the Technology," *Flying Safety*, Jun., 1992.

Hughes, "Glass Cockpit Study Reveals Human Factors Problems," *Aviation Week & Space Technology*, Aug. 7, 1989.

Hoffman and Burnham, "Airborne Electronic Map systems," *IEEE*, 769–772, 1981.

Burnham and Kline, "Airborne Electronic Terrain Map System, Part 2—Applications," *IEEE*, 786–789, 1981.

Sander, "Algorithms for an Adaptive Dynamic Window in Electronic Map systems," Air Force Wright Aeronautical Laboratories.

Weber and Opttek, "Airborne Electronic Terrain Map System," *IEEE*, 773–778, 1981.

Small, "The Electronic Terrain Map—A New Avionics Integrator–," Avionics Laboratory, Wright–Patterson Air Force Base, Ohio, 356–359.

Tang and Mealy, "Application of Multiple Model Estimation Techniques to a Recursive Terrain Height Correlation System," *IEEE*, 757–764, 1981.

Woodward and Hoover, "Passive Terrain Following Using Stored Map and Global Positioning System," *IEEE*, 779–785, 1981.

"Air Force Evaluating Model of Electronic Map Technology," *Aviation Week & space Technology*, 76, Dec. 19, 1983.

Kuchar and Hansman, Jr., "An Exploratory Study of Plan–View Terrain Displays for Air Carrier Operations," *The International Journal of Aviation Psychology*, 3(1):39–54, 1993.

Paper re: Proceedings of the National Technical Meeting, The Institute of Navigation, Anaheim, California dated Jan. 20–23, 1987 (4 pages).

Paper re: A New Approach to CFIT Prevention: GCAS Ground Collision Avoidance System, Dassault Electronique, Rockwell Avionics, Author: Jean–Francis Manf roy and Lothar J. Taylor dated Nov. 1995 (12 pages).

Proctor, "Avionics Unit Eyes Expanded Markets," *Aviation Week & Space Technology*, Aug. 15, 1994, p. 41.

Proctor, "Terrain Alert Graphics Tested on cockpit Displays," *Aviation Week & Space Technology*, Aug. 8, 1994, p. 51.

Kerrill, Tamara, "Satellite–Guided Airplane Flies Right Into the Future," *Chicago Sun–Times*, Oct. 28, 1994, p. 22.

Malm, Richard, "Engineers Can Tap Into Global Positioning System" *Engineering Times*, Apr., 1995, pp. 11–44.

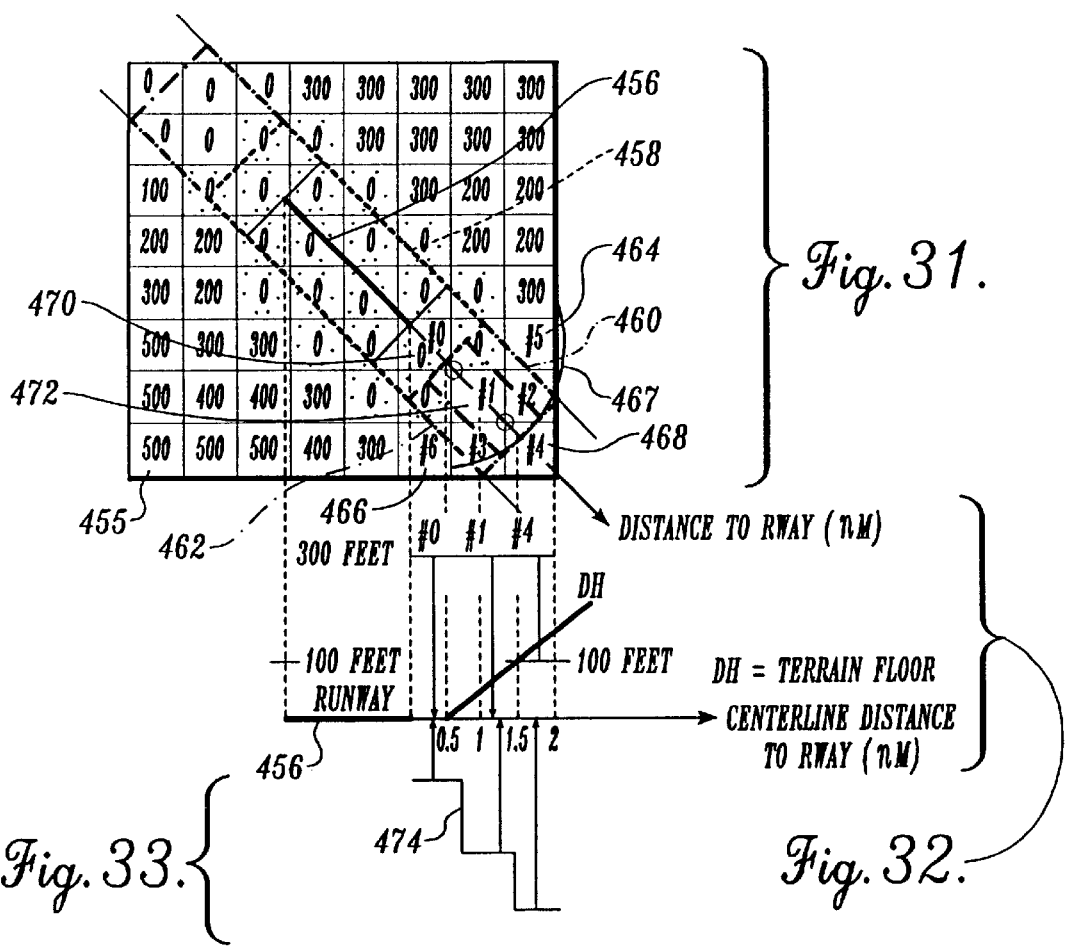
Fig. 31.
Fig. 32.
Fig. 33.
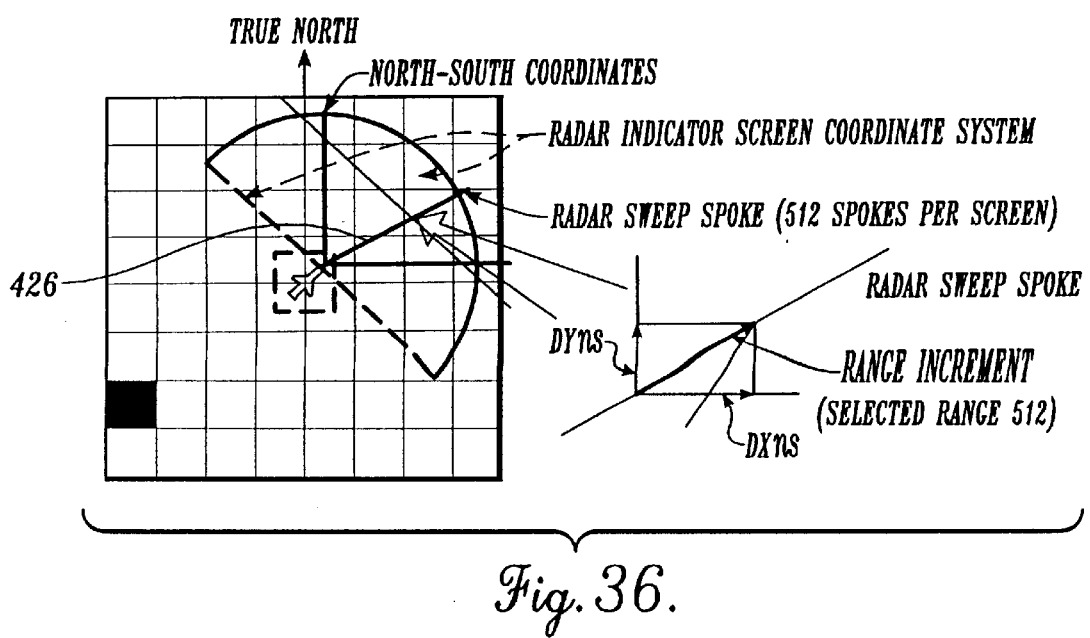
Fig. 36.

LEAST DENSE PATTERN
4 OF 64 = 1/16

436

MEDIUM DENSE PATTERN
16 OF 64 = 1/4

434

DENSEST PATTERN
32 OF 64 = 1/2

432

AIRCRAFT TERRAIN INFORMATION SYSTEM

This application claims priority from U.S. Provisional Application Ser. No. 60/023,305 filed Jul. 30, 1996 entitled "Terrain Awareness System" and from U.S. application Ser. No. 08/509,642 filed Jul. 31, 1995.

FIELD OF THE INVENTION

The invention relates to field of aircraft terrain advisory systems and more particularly to such systems that provide a cockpit display of terrain.

BACKGROUND OF THE INVENTION

Various systems have been developed that provide warnings and advisory indications of hazardous flight conditions. Among such systems are systems generally known as ground proximity warning systems (GPWS) which monitor the flight conditions of an aircraft and provide a warning if flight conditions are such that inadvertent contact with terrain is imminent. Among the flight conditions normally monitored by such systems are radio altitude and rate, barometric altitude and rate, air speed, flap and gear positions. These parameters are monitored and an advisory signal and/or warning signal is generated when the relationship between the parameters is such that terrain impact is likely to occur. Typical examples of such systems are disclosed in U.S. Pat. Nos. 3,715,718; 3,936,796; 3,958,218; 3,944,968; 3,947,808; 3,947,810; 3,934,221; 3,958,219; 3,925,751; 3,934,222; 4,060,793; 4,030,065; 4,215,334; and 4,319,218, all assigned to the same assignee as the assignee of the present invention and hereby incorporated by reference.

While the above-referenced systems do provide advisory and warning signals in the event of proximity to terrain, the warnings generated by such systems are based solely upon flight conditions of the aircraft and do not provide any navigational information nor a visual indication of the terrain below the aircraft. Consequently, the sensitivity of such systems must be adjusted to provide adequate warnings when a hazardous flight condition exists without generating false or spurious warnings. However, such an adjustment can result in a compromise that may still result in nuisance warnings over terrain unique to particular geographic areas and shorter than desired warning times in yet other geographic areas.

Several attempts have been made to improve upon such ground proximity warning systems utilizing ground-based navigational information. For example, U.S. Pat. Nos. 4,567,483; 4,646,244; 4,675,823; and 4,914,436 all disclose ground proximity warning systems which monitor the position of the aircraft relative to stored terrain data in order to provide modified ground proximity warnings. However, the utility of such systems is limited. For example, the systems disclosed in U.S. Pat. Nos. 4,567,483 and 4,914,436 disclose ground proximity warning systems which utilize navigational data to modify predetermined warning envelopes surrounding certain particular airports. U.S. Pat. Nos. 4,646,244 and 4,675,823 disclose terrain advisory systems which utilize various ground-based navigational inputs and stored terrain data to provide various ground proximity warning systems based on the position of the aircraft. However, as with the systems described above, none of these systems provide the pilot with navigational information or an indication of the terrain below the aircraft.

Recently an enhanced ground proximity warning system (EGPWS) which includes a terrain advisory and warning system has been developed. In this system data stored in a terrain data base is used in conjunction with aircraft position information to generate a visual terrain advisories and warning on a cockpit display, such as weather radar. An object of the EGPWS is to provide the crew with a terrain awareness system which provides increased warning times to the pilot of an aircraft of a hazardous flight condition while minimizing nuisance warnings. An example of a EGPWS is described in U.S. patent application Ser. No. 08/509,642 filed on Jul. 31, 1995 and which is assigned to the assignee of this application. However, the terrain display feature of the EGPWS provides at best only a simple contoured display of terrain relative to the altitude of the aircraft. Further, when the aircraft is more than 2000 feet above the highest terrain within the range of the display, no terrain features are shown.

However, there are some circumstances in which it would be desirable to provide the pilots with a contoured display of terrain below the aircraft when the aircraft is not in an immediate hazard condition. For example, it would be useful to be able to provide the flight crew with a means of assessing the potential terrain conflicts which might occur if a rapid descent is initiated from the aircraft's normal flight path. A loss of cabin pressure, for instance, might require the crew to initiate an emergency decent and it would be very useful if the crew had a map of the terrain below the aircraft. This would be particularly important when the aircraft is traversing mountainous terrain. Since the terrain display of the EGPWS normally does not display terrain more than 2000 feet below the aircraft this system is not normally available for planning a rapid decent from a relatively high altitude.

SUMMARY OF THE INVENTION

It is therefore an object of the invention to provide a terrain information system whereby a pilot can select a contoured display of the terrain below and ahead of the aircraft regardless of the aircraft's current altitude. It is also possible to provide for automatic selection of the contoured display in response to certain flight conditions such as a rapid descent rate or a descent attitude.

It is another object of the invention to provide a system for generating warnings of terrain proximate to the aircraft combined with a terrain information system which provides a display of the contours of the terrain below the aircraft.

It is a further object of the invention to provide a terrain information system which provides a contoured display of the terrain below and ahead of the aircraft where the number and the intervals between the contours are varied as a function of the difference between the highest and lowest terrain levels.

Another object of the present invention to provide a terrain information system which utilizes signals representing the position of the aircraft in combination with a terrain data base to provide a cockpit display of the contours of the terrain between the highest and lowest terrain levels below the aircraft. In one embodiment of the invention the highest terrain is displayed in red with the lowest terrain level displayed in black with the intermediate levels displayed in green with varying dot densities representing the contour levels. Preferably the display also includes a numeric indication of the highest and lowest terrain levels along with a numeric indication of the range of the display.

BRIEF DESCRIPTION OF THE DRAWING

FIG. 31 is similar to FIG. 30 and illustrates a method for correcting various cells in the vicinity of a runway;

FIG. 32 is a simplified elevational view of certain data illustrated in FIG. 31;

FIG. 33 is a diagram of a display illustrating the weather radar sweep spokes and the determination of the range increments;

FIG. 36 is a diagram of a display illustrating a radar sweep spoke and a method for determining the range increments of the radar sweep spoke;

DETAILED DESCRIPTION OF THE INVENTION

Introduction

Figure 1A:
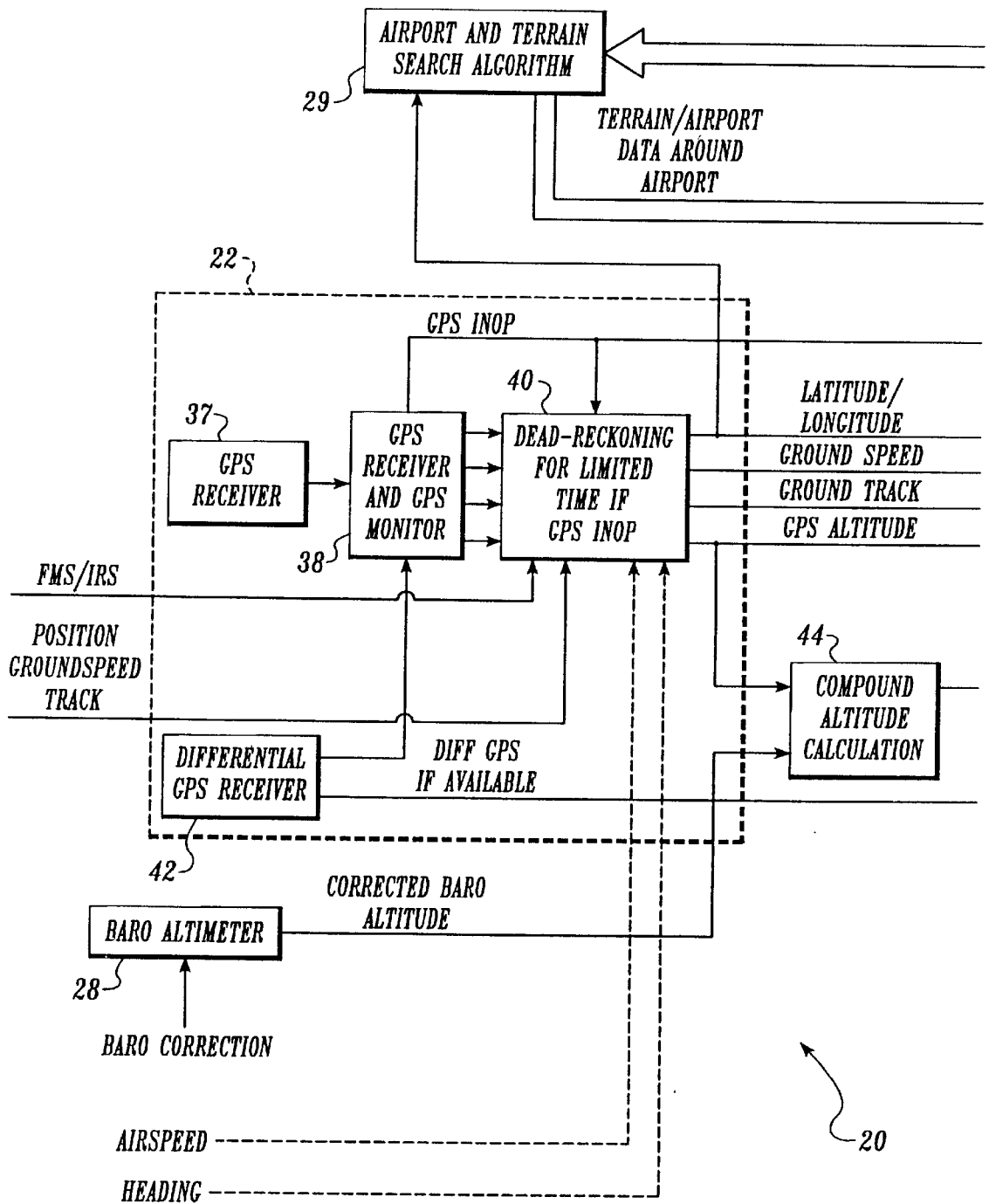
FIGS. 1A and 1B represent a block diagram of a terrain advisory and warning system.
Figure 1B:
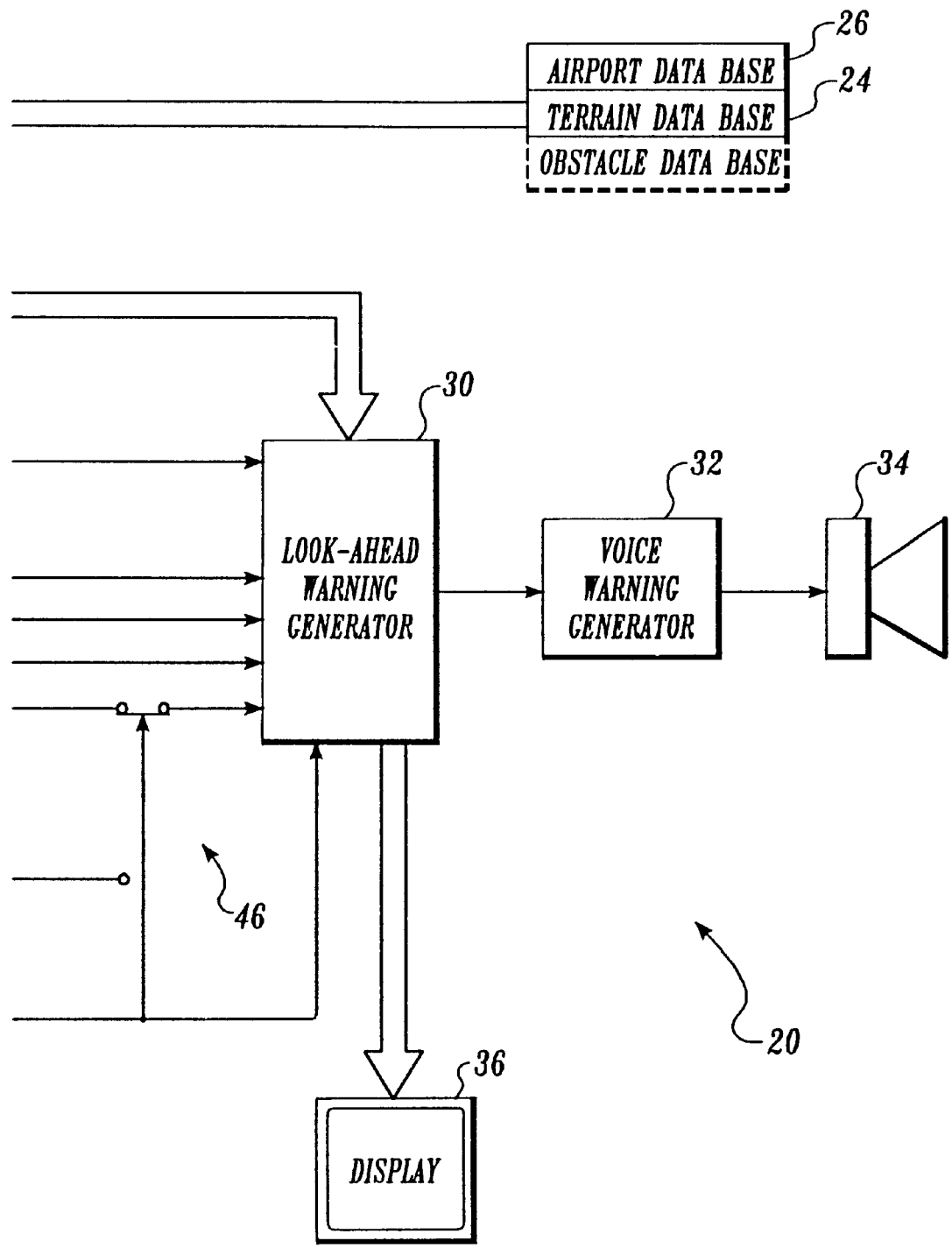

Since the preferred embodiment of the terrain information system or Peaks Mode utilizes many of the elements of a terrain warning and advisory system, including for example the terrain data base and the cockpit display, this description will first describe in detail the operation of the terrain advisory and warning system. The terrain advisory and warning system is described in connection with FIGS. 1–45 and the terrain information system of the invention is described in connection with FIGS. 46–48.

Terrain Advisory and Warning System

Referring to FIG. 1, a terrain advisory and warning system or terrain awareness system (TAS), generally identified with the reference number 20, is illustrated. As will be discussed in more detail below, the TAS 20 utilizes inputs from a satellite-based navigational system, such as global positioning system (GPS) 22 (longitude, latitude, altitude, groundtrack, ground speed), and/or an FMS/IRS navigational system which may be updated by the GPS and/or DME/DME, a terrain data base 24, an airport data base 26 and corrected barometric altitude, for example from a barometric altimeter 28 to provide a LOOK-AHEAD warning system which provides relatively longer warning times while minimizing nuisance warnings. Since the TAS 20 does not require a radio altimeter input, the system can be used with certain aircraft, such as commuter aircraft, which are not normally equipped with a radio altimeter.

The current longitude and latitude of the aircraft from the GPS 22 are applied to an Airport and Terrain Search Algorithm, indicated by a block 29, which includes location search logic for determining the terrain data, as well as the airport data surrounding the aircraft. Such search logic is described in detail in U.S. Pat. Nos. 4,675,823 and 4,914,436 assigned to the same assignee as the present invention and hereby incorporated by reference. The GPS inputs, along with terrain and airport data surrounding the aircraft from the search algorithm, indicated by the block 29, are applied to the LOOK-AHEAD warning generator 30, which provides both terrain advisory and terrain warning signals based upon the position and projected flight path of the aircraft. The LOOK-AHEAD warning generator 30 may provide both an aural warning by way of a voice warning generator 32 and speaker 34, and/or a visual warning by way of a map or a display 36, as discussed below.

GLOBAL POSITIONING SYSTEM

The primary positional information for the aircraft is provided by the GPS 22, such as disclosed in U.S. Pat. Nos. 4,894,655; 4,903,212; 4,912,645; 4,954,959; 5,155,688; 5,257,195; 5,265,025; 5,293,163; 5,293,318; and 5,337,242, all hereby incorporated by reference. The GPS 22 includes a GPS receiver 37 and a combination GPS receiver and monitor 38. The positional inputs from the GPS 22 are processed by a dead reckoning algorithm, indicated by the block 40, for example as discussed in detail in U.S. Pat. No. 5,257,195, to compensate for temporary outages of the GPS 22, such as loss or masking of satellites. The dead reckoning algorithm can be replaced by an additional navigational system, such as an FMS or an IRS, which can be used during GPS outages.

A differential GPS receiver 42 can also be used to provide an indication of a GPS altitude. As long as the differential GPS information is received and four more satellites are visible, the differential GPS information from the differential GPS receiver 42 is sufficiently accurate for the TAS 20. If the differential GPS receiver 42 is not available, a compound altitude signal may be generated by the block 44 and connected to the LOOK-AHEAD warning generator 30 by way of a single-pole, double-throw switch 46, under the control of a signal "DIFF GPS AVAILABLE", which indicates when the differential GPS receiver 42 is available. In a first mode when differential GPS information is available, the switch 46 connects the GPS altitude signal from the GPS 22 to the LOOK-AHEAD warning generator 30. In this position, the GPS altitude signal is generated either from the GPS 22 or from the differential GPS receiver 42, as discussed above. When a differential GPS receiver 42 is not available, a compound altitude signal is provided by the block 44 to the LOOK-AHEAD warning generator 30. During this condition, the switch 46, under the control of a "DIFF GPS AVAILABLE" signal, connects the block 44 to the LOOK-AHEAD warning generator 30 to enable the compound altitude signal to be provided to the LOOK-AHEAD warning generator 30. Within the Differential GPC Receiver 42, the barometric altitude is compared with the GPS altitude to generate a compound altitude signal which could be used to limit the maximum difference between the GPS output altitude signal and the barometric altitude to the maximum expected GPS altitude error. Such a configuration would reduce the effect of erroneous pressure correction settings on the barometric altimeter 28.

TERRAIN AND AIRPORT DATA BASES

As mentioned above, the airport data and terrain data are separated into two different data bases 26 and 24, respectively. Such a configuration allows either of the data bases 24 or 26 to be updated without the need to update the other.

The airport data base 26 contains various types of information relating to airports, such as runway midpoint coordinates, runway length, runway heading, runway elevation and airport/runway designation data. Additional data relating to obstacles along the approach path (i.e. high-rise hotels adjacent Heathrow Airport in England) and a nominal final approach slope could also be included in the airport data base 26. A separate obstacle data base may also be provided, structured similar to the airport data base.

In order for the TAS 20 to be useful, all airports, for example, which commuter planes without radio altimeters can land, would have to be included in the airport data base 26. In areas where the airport data base 26 is not complete, the search algorithm 29 would indicate NO DATA. Since the airport data base 26 is organized in a similar fashion as the terrain data base 24 as described below, additional airport data could be added in a piecewise fashion when available. The estimated size of the airport data base 26 is contemplated to be relatively small, compared to the terrain data base 24, for example less than 200 kilobytes depending on the amount of data stored per airport.

The terrain data base 24 may require up to 40 megabytes of storage space, which makes it compatible with available flash erasable programmable read only memory (ROM) devices, such as a flash EEPROM, or mini hard disk drives, which could take advantage of known data compression techniques to reduce the amount of storage space required and also promote easy data retrieval by the search algorithm 29.

An important aspect of the invention is that the terrain data base 24 is structured to provide varying resolutions of terrain data as a function of the topography of the terrain, as well as distance to airports. For example, a relatively high resolution can be provided close to the airport on the order of ¼ to ⅛ nautical miles and a medium resolution, for example ½ to 1 nautical miles within a 30-mile radius of the airport. Outside of the 30-mile radius from the airport, a coarser resolution is sufficient as will be described below.

Figure 2:
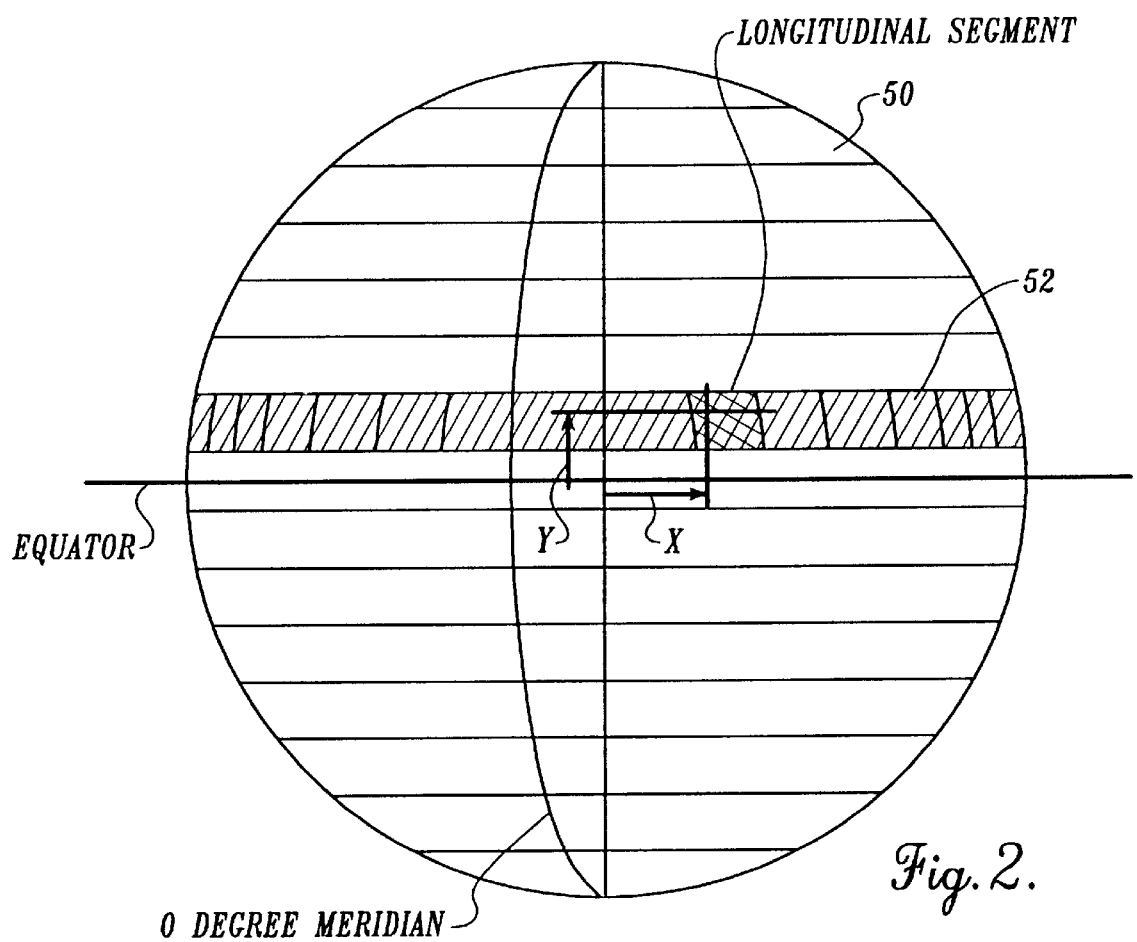
FIG. 2 is a diagram of the world broken down into various latitude segments and longitude segments in accordance with the present invention.
Figure 3:
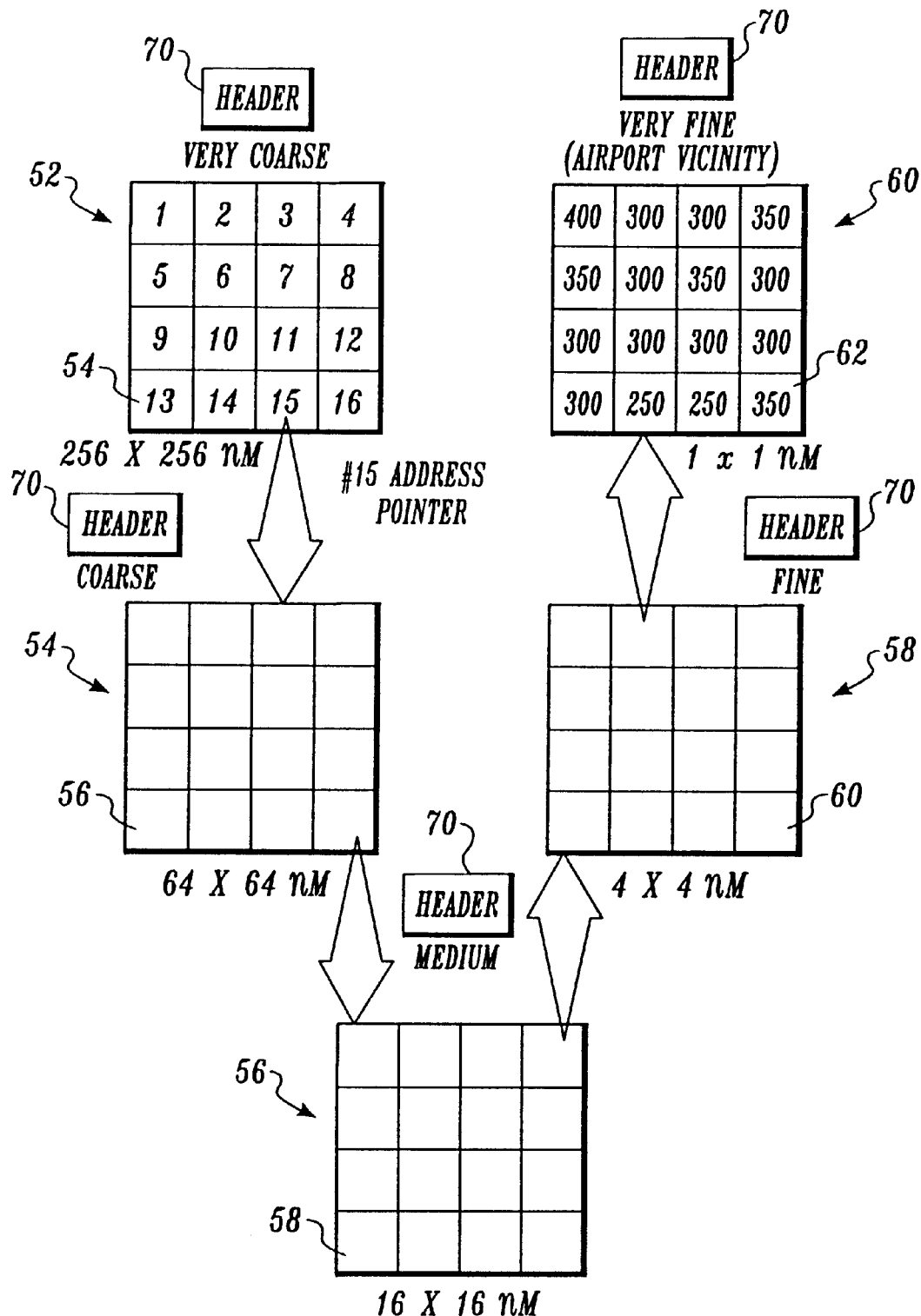
FIG. 3 is a graphical representation of the various memory map and resolution sequencing in accordance with the present invention.

FIGS. 2 through 4 illustrate the organization of the terrain data base. Referring first to FIG. 2, the world is divided into a plurality of latitude bands 50, for example each about 4° wide. Each latitude band 50 is then divided into a plurality of longitudinal segments 52, which are about 4° wide around the equator, such that each longitudinal segment 52 is about 256×256 nautical miles. In order to maintain a relatively constant segment size, the number of longitudinal segments 52 per latitude band 50 are reduced closer to the poles.

Since the number of latitude bands 50 and the number of longitudinal segments 52 per latitude band 50 is fixed, determination of the particular segment corresponding to the current aircraft position is readily determined. For example, the aircraft current latitude X is used to determine the latitude band number. Next, the number of longitudinal segments 52 associated with that band 50 is determined either by way of a LOOK-UP table or by calculation. Once the number of longitudinal segments 52 in the particular latitude band 50 of interest is determined, the current longitudinal position Y of the aircraft can be used to readily determine the longitudinal segment number.

The minimum data associated with each longitudinal segment 52 corresponds to the highest altitude within that segment. As mentioned above, each of the segments 52 is approximately 256×256 nautical miles. As shown in FIG. 3, these longitudinal segments 52 can be broken down into various subsquares to provide varying levels of resolution. For example, each segment 52 may be broken down into a plurality of subsquares 54, each subsquare 54 being 64×64 nautical miles to provide a very coarse resolution. The subsquares 54, can, in turn, be further subdivided into a number of subsquares 56, for example, each 16×16 nautical miles, to provide a coarse resolution. These subsquares 56, in turn, can be subdivided into a plurality of subsquares 58, for example, each 4×4 nautical miles, to provide a medium resolution. The subsquares 58 can also be broken down into a plurality of subsquares 60, for example 1×1 nautical miles, to provide a fine resolution. In the vicinity around airports, it may even be desirable to break down the subsquares 60 down into smaller subsquares 62 to provide even finer resolution, for example ¼×¼ nautical miles.

Figure 4A:
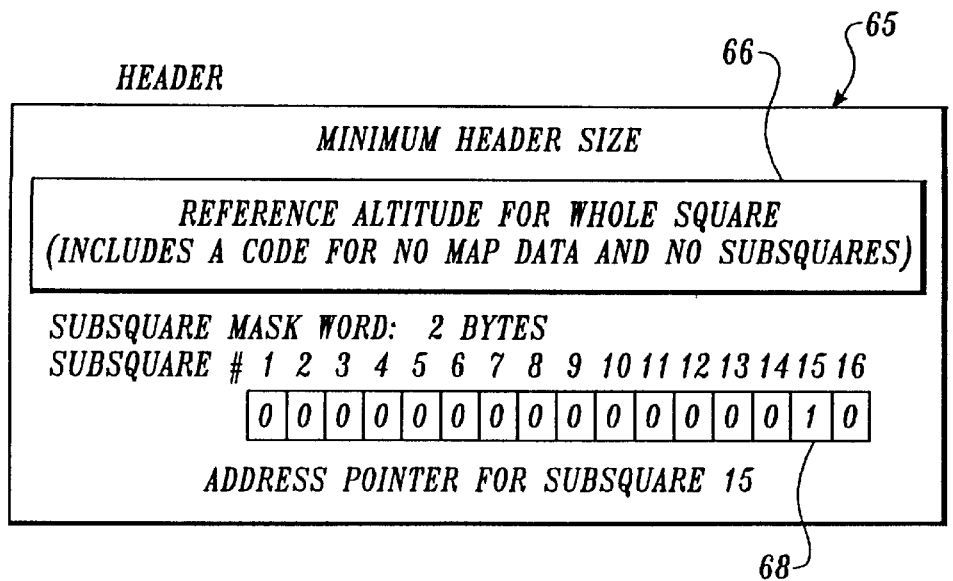
FIG. 4A is an exemplary representation of the digital header and subsquare mask word for identifying geographical areas in accordance with the present invention.

As shown in FIG. 4A, the minimum data associated with each longitudinal segment 52 consists of a header 65 which includes a multiple data byte 66 which includes the reference altitude which corresponds to the highest altitude for all the subsquares within the segment, which assumes that the highest elevation in a square is representative of the entire square elevation. The multiple data byte 66 may also include a flag to indicate when no further subdividing is required for certain geographical areas. For example, for segments representing the ocean, all subsquares would have the same maximum altitude and thus no further subdividing would be required. In order to enable the data base to be created and updated on a piecewise basis, the multiple data byte 66 may also contain a flag bit or code indicating that data corresponding to further subdivisions does not exist for a particular segment 52 containing a code indicating that no map data exists in the segment.

For geographical areas, such as mountainous areas and areas in the vicinity of an airport, the longitudinal segments 52 are subdivided as discussed above. In such a situation, the stored data would include a 2-byte mask word 68, which points to the subsquares having different altitudes. For example, as shown in FIG. 4, the 2-byte mask word 68 is illustrated with a pointer in the box 15 within the subsquare 54 within the longitudinal segment 52, which represents a different altitude which points to the next finer layer of resolution as discussed above. The subsquares each include a header 70 including a mask as described above to enable a pointer for each subsquare having a different altitude to point to the next finer layer until the finest resolution level desire is reached as shown.

The data base structure provides for flexibility as to resolution required and can be constructed on a piecewise basis at different times. As such, the structure contains the entire framework necessary to add new data or modify existing data without changing any of the software.

The size of the data base is proportional to the resolution and the size of the area to be covered. In order to cover the entire earth's surface, about 149 million square nautical miles, only about 2,500 to 3,500 longitudinal segments 52 are required. Thus, the overhead for the minimum header sizes is relatively small.

Figure 4B:
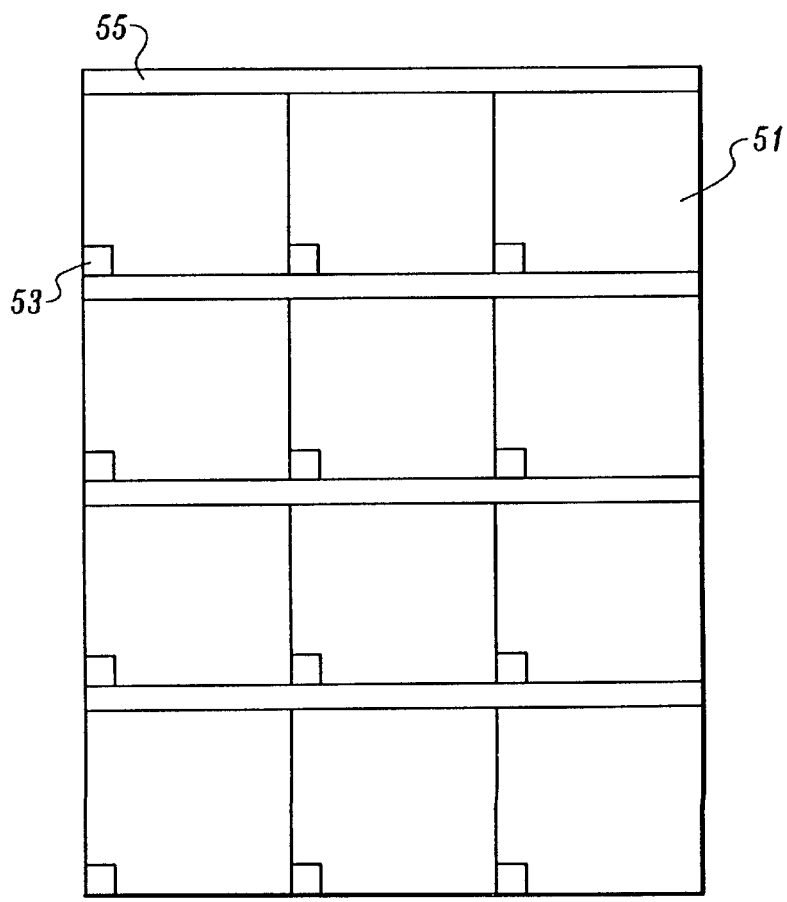
FIG. 4B is a terrain map alternative to FIG. 3.

Alternatively, the world may be divided into a plurality of, for example, 1°×1° map files or cells 51 as shown in FIG. 4B. The various map files 51 may be formed with variable resolution. More particularly, each of the map files may be subdivided into a plurality of subcells 53 with the highest terrain elevation in each subcell indicated, with the resolution of all of the subcells within a particular map file being of the same resolution. As indicated above, the maps are generally 1°×1°, which may be combined for coarser resolution (i.e. 2°×2° or 10°×10°).

The size of the subcells 53 is varied to provide varying degrees of resolution. For example, for relatively high resolution, the size of the subcells 53 may be selected as either 15×15 arc seconds or 30×30 arc seconds. The size of the subcells 53 may also be varied as a function of the terrain in particular geographic areas. For example, the size of the subcells 53 may be selected as 30×60 arc seconds at relatively far north longitudes and as 30×120 arc seconds at longitudes even further north. The size of the subcells 53 may also be varied as a function of the distance to the nearest airport. For example, for distances greater than 64 miles from an airport, the size of the subcells may be selected as 60×60 arc seconds while at distances greater than, for example, 128 miles from the airport, size of the subcell 53 may be selected as 120×120 arc seconds. For a course resolution, for example for use during a cruise mode as discussed below, the size of subcells may be selected as 5×5 arc minutes.

Figure 27:
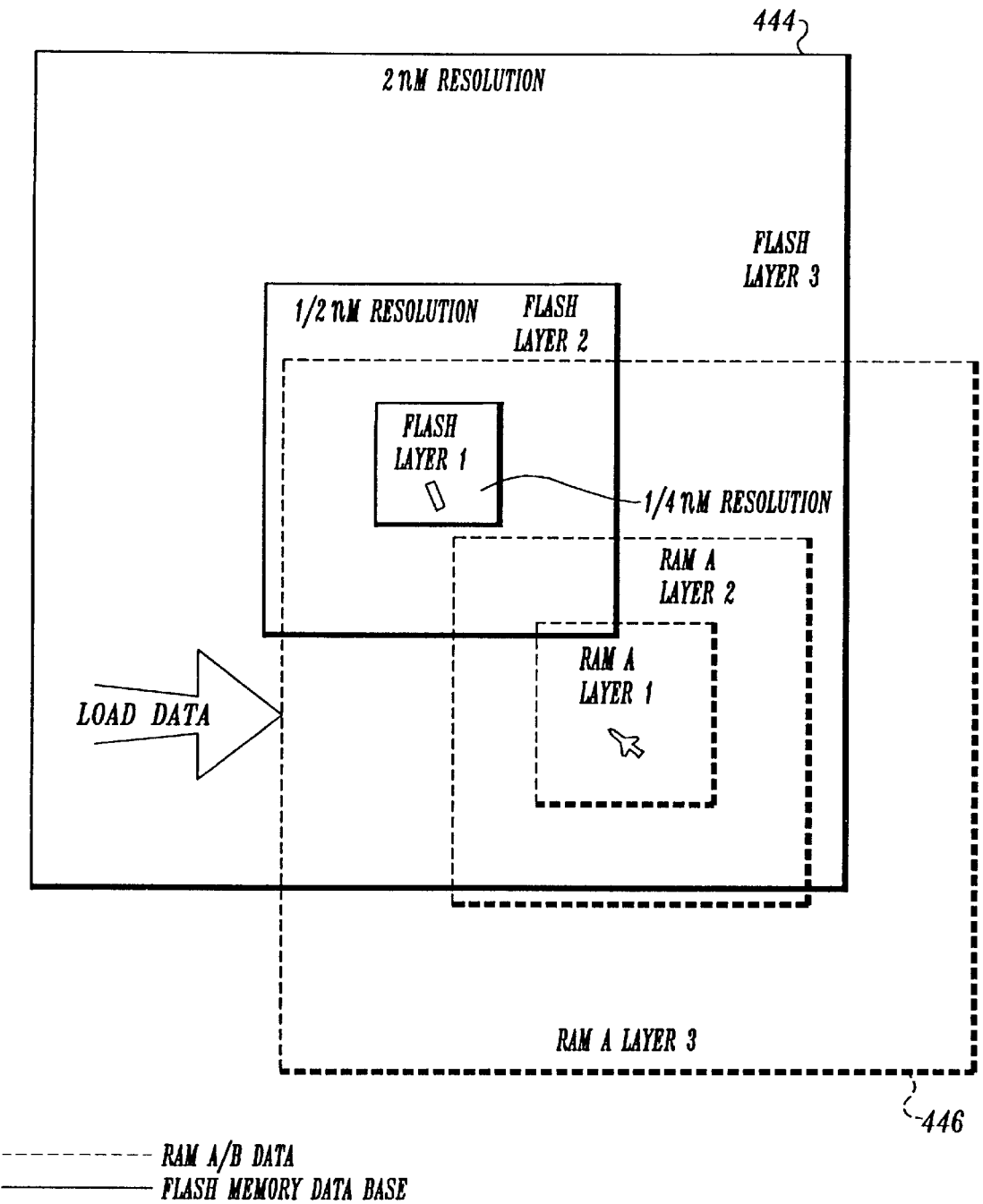
FIG. 27 is a block diagram illustrating the configuration of a flash ROM for a terrain data base and a RAM used with the present invention.
Figure 28:
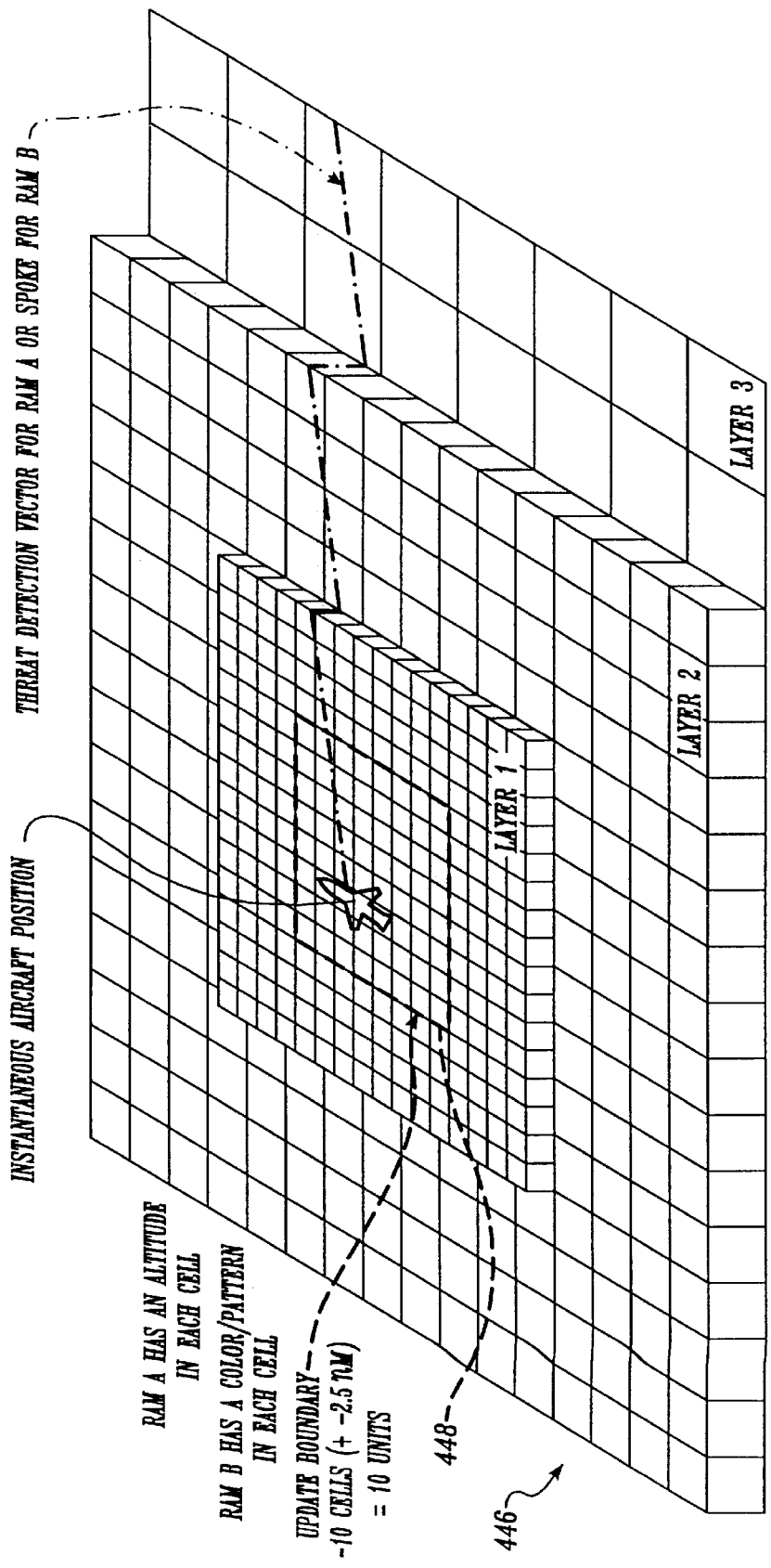
FIG. 28 illustrates a wedding-cake configuration for a RAM utilized in the present invention.

As discussed below and as illustrated in FIG. 27, the data base may be compressed by a compression algorithm and stored in a flash read only memory (ROM), configured as a wedding cake as illustrated in FIG. 28. Various compression algorithms are known and suitable for this application. The compression algorithm does not form a part of the present invention.

In order to simplify computation, each of the map files includes a header 55, which includes, inter alia, the resolution of the particular map file 51 as well as the location of one or more corners, for example, the northwest and southeast corners. The headers 55 as well as the map files 51 are discussed in more detail below and illustrated in more detail in FIG. 29.

For certain terrain, for example, terrain adjacent a runway, the resolution of the map files 51 (i.e. relatively large size of the subcells 53) may result in errors in runway elevation. More particularly, since each subcell 53 contains the highest elevation within the subcell 53, certain errors relating to runway elevations can occur, depending on the resolution of the map file 51. Correction of the elevations adjacent the runways is discussed in more detail below in conjunction with FIGS. 30–33. Systematic errors may also be introduced by the maps, which are digitized, for example, by the Defense Mapping Agency, using known averaging algorithms, which are known to fill in valleys and cut-off the tops of sharp peaks of the terrain.

LOOK-AHEAD WARNING GENERATOR

As mentioned above, the LOOK-AHEAD warning generator 30 generates both a terrain advisory signal and a terrain warning signal based upon the position and trajectory of the aircraft relative to stored terrain data. There are two aspects of the terrain advisory and terrain warning signals: LOOK-AHEAD distance/direction; and terrain threat boundaries.

LOOK-AHEAD DISTANCE/DIRECTION

The LOOK-AHEAD direction for detecting threatening terrain is along the groundtrack of the aircraft. In order to prevent nuisance warnings, the LOOK-AHEAD distance is limited, as will be discussed below. Otherwise, potentially threatening terrain along the current flight path of the aircraft relatively far from its current position could produce nuisance warnings.

Two different LOOK-AHEAD distances (LAD) are utilized. The first LAD is used for a terrain advisory signal (also referred to as a yellow alert LAD). A second LAD is used for terrain warning signals which require immediate evasive action (also referred to as a red-alert LAD).

Figure 5:
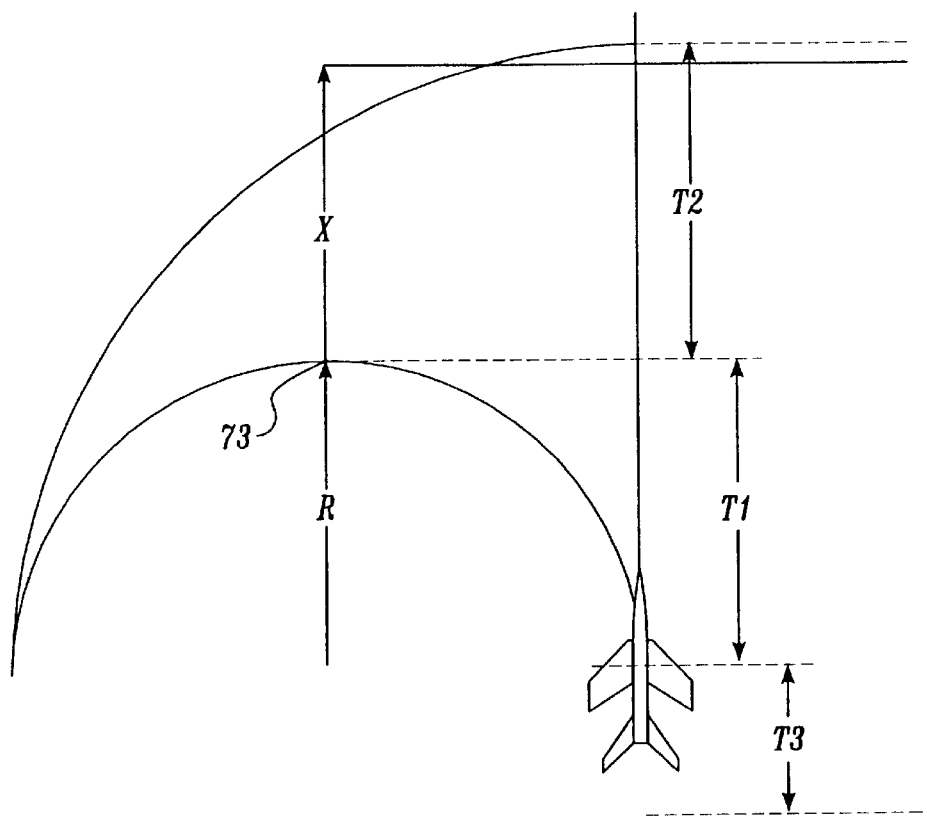
FIG. 5 is a graphical illustration of the LOOK-AHEAD distance assuming the aircraft turns at a 30° angle.

The LAD for a terrain advisory condition is considered first in determining the LAD because it is assumed that the pilot could make a 30° bank turn at any time at a turning radius R. The LAD is equal to the product of the speed of aircraft and the total LOOK-AHEAD time. As shown in FIG. 5, the total LOOK-AHEAD time is equal to the sum of the LOOK-AHEAD time $T_1$ for a single turning radius R; the LOOK-AHEAD time $T_2$ for terrain clearance at the top of the turn (i.e. point 73) plus a predetermined reaction $T_3$.

The terrain clearance at the top 73 of the turn is provided to prevent inadvertent terrain contact as a result of the turn. This terrain clearance may be selected as a fixed distance or may be made equal to the turning radius R.

As shown in equation (1), the turning radius R is proportional to the square of the speed of the aircraft and inversely proportional to the bank angle TG (ROLL).

$$R = V^2 / G \times TG \text{ (Roll)} \tag{1}$$

For a 30° bank angle, the turning radius R in nautical miles (nM) as a function of the speed in knots is given by equation (2).

$$R = 0.000025284 * V^2 \tag{2}$$

The LOOK-AHEAD time $T_1$ for a single turning radius is given by equation (3).

$$T_1 = R/V \tag{3}$$

Substituting R from equation (1) into equation (3) yields the LOOK-AHEAD time $T_1$ for a single turn radius as shown in equation (4) as a function of the speed of the aircraft and the bank angle.

$$T = V/G \times TG \text{ (Roll)} \tag{4}$$

TABLE 1 provides various LOOK-AHEAD times $T_1$ at various turning radii and ground speeds.

TABLE 1

| Radius (nM) | Speed (knots) | $T_1$ (sec) |
|---|---|---|
| ½ | 140 | 13 |
| 1 | 200 | 18 |
| 2 | 280 | 26 |
| 3 | 345 | 31 |
| 4 | 400 | 38 |
| 5 | 445 | 40 |
| 6 | 490 | 44 |

By assuming that the fixed terrain clearance at the top 73 of the turn is equal to one turning radius R, the total LOOK-AHEAD time for two turn radii (i.e. $T_1+T_2$) is simply twice the time for a single turning radius. Thus, the total LOOK-AHEAD time is $2*T_1$ plus the predetermined reaction time $T_3$, for example 10 seconds, as given by equation (5).

$$T_{TOTAL} = 2*T_1 + T_3 \tag{5}$$

By substituting R from equation (2) into equation (4), the LOOK-AHEAD time for a single turn radius is given by equation (6).

$$T_1 = 0.000025284 * V \tag{6}$$

Thus, if it is assumed that the fixed clearance X at the top of the turn 73 is also equal to the turning radius R, the total LOOK-AHEAD time for two turning radii is given by equation (7) below, simply twice the value determined in equation (6).

$$T_1 + T_2 = 2 * 0.000025284 * V \tag{7}$$

For a predetermined reaction time $T_3$, for example 10 seconds, the LOOK-AHEAD distance (LAD) in nautical miles for a terrain advisory signal can be determined simply by multiplying the speed of the aircraft (V) by the total time $T_{TOTAL}$ as shown in equation (8).

$$LAD = V*(0.0000278 + 2*0.000252854*V) + \text{fixed distance}*K, \tag{8}$$

where K is a constant, for example 0.

However, in order to provide optimal conditions during a terrain advisory condition, the LAD is limited with an upper limit and a lower limit. The lower limit may be a configurable amount, for example, either 0.75, 1 or 1½ nautical miles at relatively low speeds (i.e. speeds less than 150 knots) and limited to, for example, 4 nautical miles at speeds, for example, greater than 250 knots. The LAD may also be limited to a fixed amount regardless of the speed when the distance to the runway is less than a predetermined amount, for example 2 nautical miles, except when the aircraft altitude is greater than 3,000 feet, relative to the runway.

The terrain warning LAD is given by equation (9) below.

LAD=

$k_1$*LAD (terrain for LOOK-DOWN/LOOK-AHEAD advisory indication), $k_2$*LAD (terrain LOOK-DOWN/LOOK-AHEAD warning), $k_3$*LAD (terrain LOOK-UP advisory), (9)

where $k_1=1.5$, except when the LAD is limited at its lower limit, in which case $k_1=1$, $k_3=1$ and where $k_2=0.5$, $k_3=2$.

TERRAIN THREAT BOUNDARIES

The terrain threat boundaries include a terrain floor boundary, terrain advisory boundaries (yellow alert), as well as terrain warning boundaries (red alert) and are provided along the groundtrack of the aircraft.

TERRAIN FLOOR BOUNDARY

The terrain floor boundary is the basis for the terrain threat boundaries and is similar to the terrain floor developed for the GPWS. The terrain floor relates to a distance $\Delta H$ below the aircraft and is proportional to the distance to the closest runway to prevent nuisance warnings when the aircraft is taking off and landing, while providing adequate protection in other modes of operation. As illustrated in equation (10), the terrain floor boundary below the aircraft is essentially based upon providing 100 feet clearance per nautical mile from the runway, limited to 800 feet.

$$\Delta H = 100 \text{ (ft/nM)} * (\text{distance to runway threshold} - \text{an offset}) + 100 \text{ (ft/nM)} * (\text{distance to runway center} - 12 \text{ nautical miles}) \quad (10)$$

Figure 6:
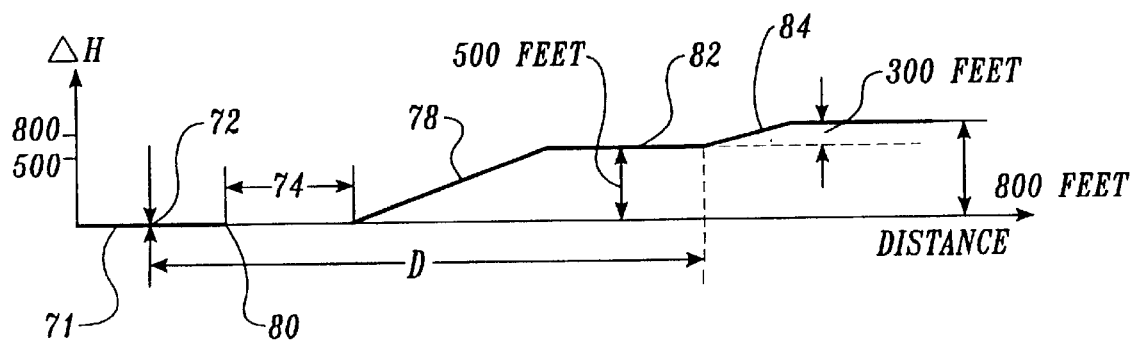
FIG. 6 is a graphical representation of a ΔH terrain floor boundary which forms the bases for a terrain advisory signal and a terrain warning signal.

Equation (10) is shown graphically in FIG. 6. Referring to FIG. 6, the horizontal axis represents the distance from the runway, while the vertical axis represents the $\Delta H$ terrain floor boundary beneath the aircraft. The first segment 71 represents the runway length, while the point 72 represents the runway center. After a small offset 74, the next segment 78, which starts at 0 feet, slopes at 100 feet per nautical mile distance from the runway threshold, identified by the point 80, up to a maximum of 500 feet. The 500 foot maximum continues along a segment 82 until the distance to the runway center 72 is a predetermined distance D, for example 12 nautical miles. The next segment 84 slopes up at a 100 feet per nautical mile distance until the distance rises 300 feet from the segment 82 for a total of 800 feet.

The terrain floor $\Delta H$ boundary beneath the aircraft is limited such that the segment 78 begins at 0 and the segment 82 never goes above a predetermined maximum, for example 500 feet. In addition, the terrain floor $\Delta H$ boundary is also limited so that the segment 84 never goes below the vertical height of the segment 82 and rises no more than 300 feet relative to the segment 82. During conditions when the aircraft is 3,000 feet above the terrain, the terrain floor $\Delta H$ boundary is maintained at the upper limit of 800 feet.

TERRAIN ADVISORY BOUNDARIES

Figure 7:
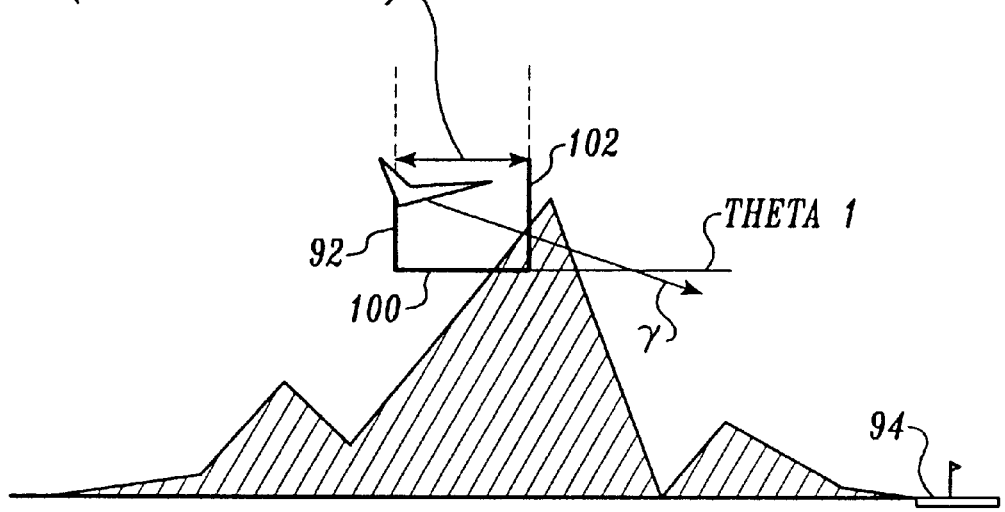
FIG. 7 is a graphical illustration of a terrain advisory signal for an aircraft relative to the terrain and an airport for a condition when the aircraft flight path angle is less than a first predetermined reference plane or datum.
Figure 8:
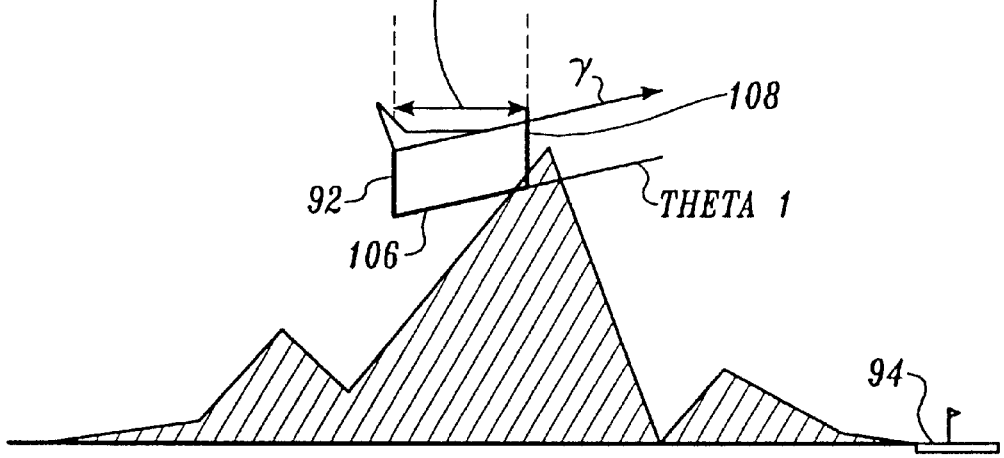
FIG. 8 is similar to FIG. 7 but for a condition when the aircraft flight path angle is greater than the first predetermined reference plane.

Two terrain advisory boundaries are shown graphically in FIGS. 7 and 8. FIG. 7 represents a condition when the aircraft is descending while FIG. 8 represents a condition when the aircraft is ascending. As will be discussed in more detail below, the terrain advisory boundaries are based upon the relationship between the flight path angle $\gamma$ and a first configurable datum, THETA1.

Referring first to FIG. 7, the terrain advisory (yellow alert) boundaries are shown. The first segment of the terrain advisory boundary, identified with the reference numeral 92, corresponds to the $\Delta H$ terrain floor boundary. As mentioned above, the $\Delta H$ terrain floor boundary is a function of the distance from the runway 94. In order to determine the bottom segment 100 of the terrain advisory boundary, it is necessary to determine whether the flight path angle $\gamma$ is more or less than a configurable datum, identified as THETA1. As shown and described herein, THETA1 is set for 0°. However, it should be clear that other angles for THETA1 are within the broad scope of the present invention. For the condition illustrated in FIG. 7, the flight path angle $\gamma$ is less than THETA1. Thus, the segment 100 extends from the $\Delta H$ terrain floor boundary at the angle THETA1 to the LOOK-AHEAD distance for a terrain advisory. The final segment 102 is generally parallel to the segment 92 and extends in a vertical direction along the LAD for the terrain advisory boundary.

If the flight path angle $\gamma$ is greater than THETA1 as shown in FIG. 8., then different terrain advisory boundaries are provided. The segment 92 will be the same as shown in FIG. 7 and described above. However, when the flight path angle $\gamma$ is greater than THETA1 as shown in FIG. 8, a bottom segment 106 is formed by extending a line segment from the bottom of the segment 92, which represents the $\Delta H$ terrain floor, along a direction parallel with the flight path angle $\gamma$ up to the LAD. A vertical segment 108 extends from the bottom segment 106 along the LAD to form the terrain advisory boundaries.

Thus, as shown, if the airplane is climbing, only terrain which penetrates the upward-sloping terrain advisory boundaries will cause an advisory signal, such that if the aircraft clears the terrain by a safe margin, no advisory signal is given, even if the terrain ahead is at or above the present aircraft altitude. However, if terrain penetrates the terrain advisory boundaries, an aural warning, such as "CAUTION, TERRAIN" aural advisory may be given. In addition, visual warnings may be provided.

TERRAIN WARNING BOUNDARIES

Figure 9:
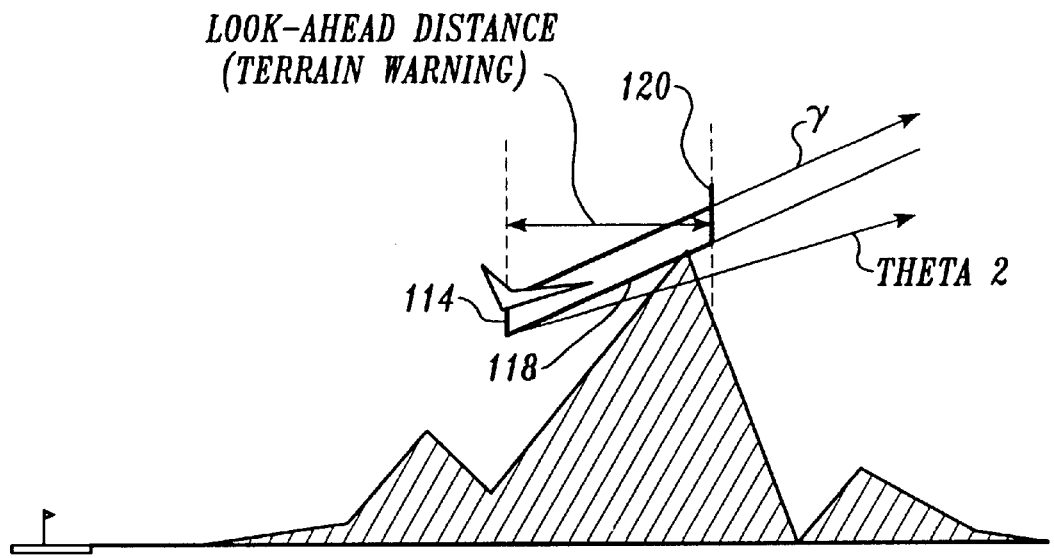
FIG. 9 is a graphical illustration of a terrain warning signal for an aircraft relative to the terrain and an airport for a condition when the aircraft flight path angle is greater than a second reference plane or datum.
Figure 10:
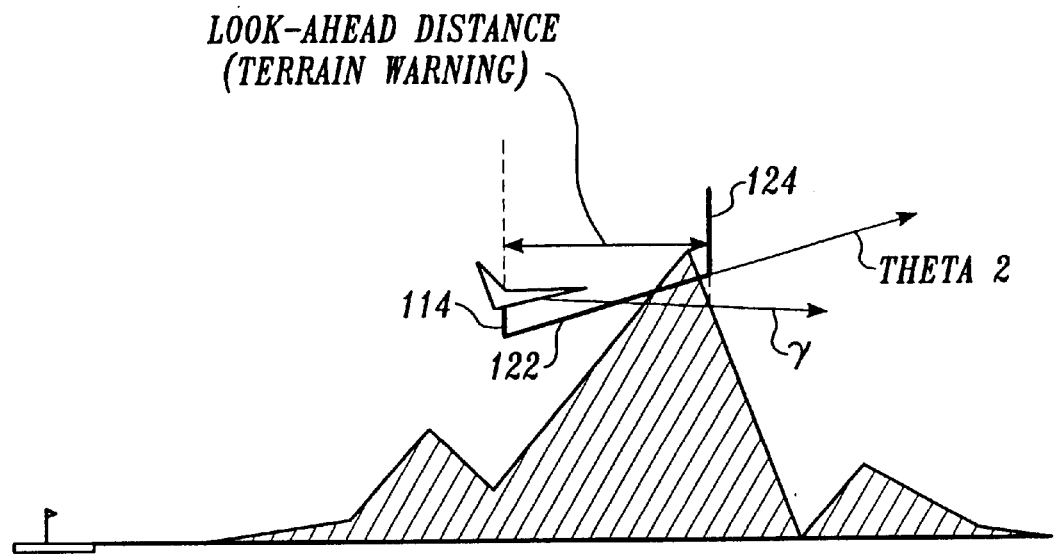
FIG. 10 is similar to FIG. 9 but for when the flight path angle of the aircraft is less than the second reference plane or datum.

The terrain warning boundaries are shown in FIGS. 9 and 10 and, in general, indicate to the pilot of an aircraft conditions when evasive action is required to avoid terrain contact. The terrain warning boundaries are based on the relationship of the flight path angle of the aircraft relative to a second configurable datum, THETA2. The datum THETA2 may be selected with an upslope of, for example, 6°, which is equal to the average climb capability of airliners. The datum THETA2 could be modified, taking into consideration aircraft type, configuration, altitude and time for takeoff. However, because of the longer LOOK-AHEAD distance as discussed above for the terrain warning boundaries, a terrain warning could occur before a terrain advisory indication for extreme terrain conditions.

Referring to FIGS. 9 and 10, two different terrain warning boundaries are illustrated. In particular, FIG. 9 illustrates a condition when the flight path angle $\gamma$ is greater than the second datum THETA2. FIG. 10 illustrates a condition when the flight path angle $\gamma$ is less than the second datum THETA2. In both conditions, the first segment 114 of the terrain warning boundary is extended below the aircraft for a distance ½ of the $\Delta H$ terrain floor, which, as mentioned above, is a function of the distance of the aircraft from a runway. As mentioned above, the terrain warning boundaries are dependent on the relationship between the flight path angle $\gamma$ of the aircraft and the datum THETA2.

Referring first to FIG. 9, since the flight path $\gamma 0$ is less than the second datum THETA2, the bottom segment 118 of the terrain warning boundary is formed by extending a line from the segment 114 at an angle equal to the flight path angle $\gamma$ up to the LOOK-AHEAD distance for a terrain warning as discussed above. A vertical segment 120 extends from the lower segment 118 along the LAD for a terrain warning, forming the terrain warning boundaries illustrated in FIG. 9.

If the flight path angle of the aircraft is less than the slope of the second datum THETA2 as shown in FIG. 10, a bottom segment 122 extends from the segment 114 up to the LOOK-AHEAD distance at an angle equal to the flight path angle $\gamma$. A segment 124 extends upwardly along the LAD from the segment 122. If any terrain along the groundtrack of the aircraft out to the LAD for the terrain warning penetrates the envelope, aural and/or visual terrain ahead warnings may be given.

CUT-OFF BOUNDARIES

Figure 11:
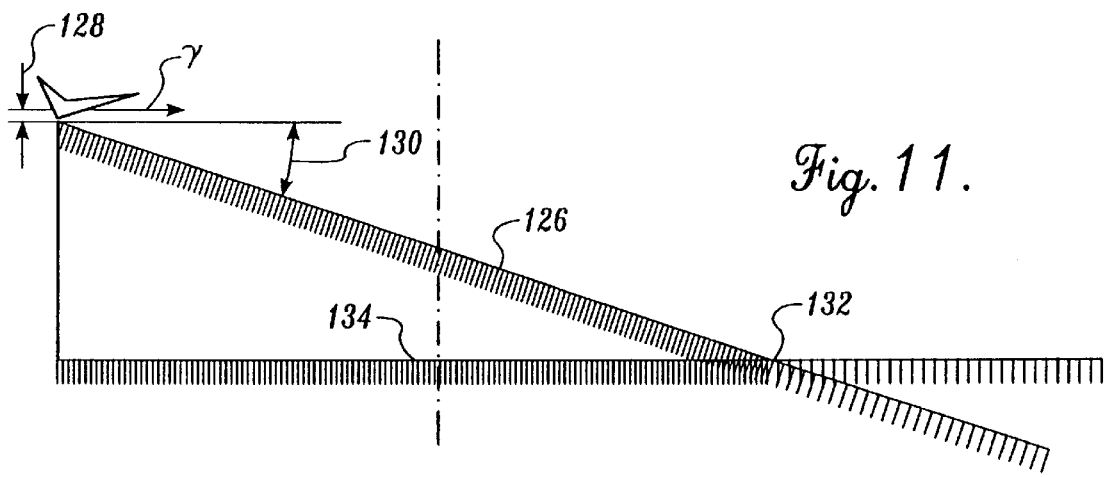
FIG. 11 is a graphical illustration of a cut-off angle correction boundary for a level flight condition in accordance with the present invention.
Figure 12:
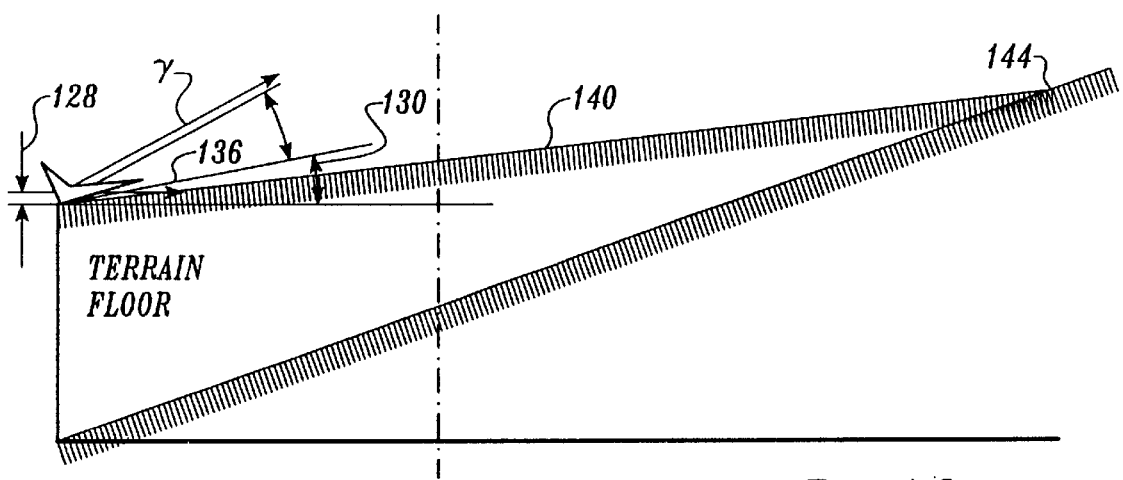
FIG. 12 is similar to FIG. 11 but for a condition when the flight path angle of the aircraft is greater than a predetermined reference plane or datum.
Figure 13:
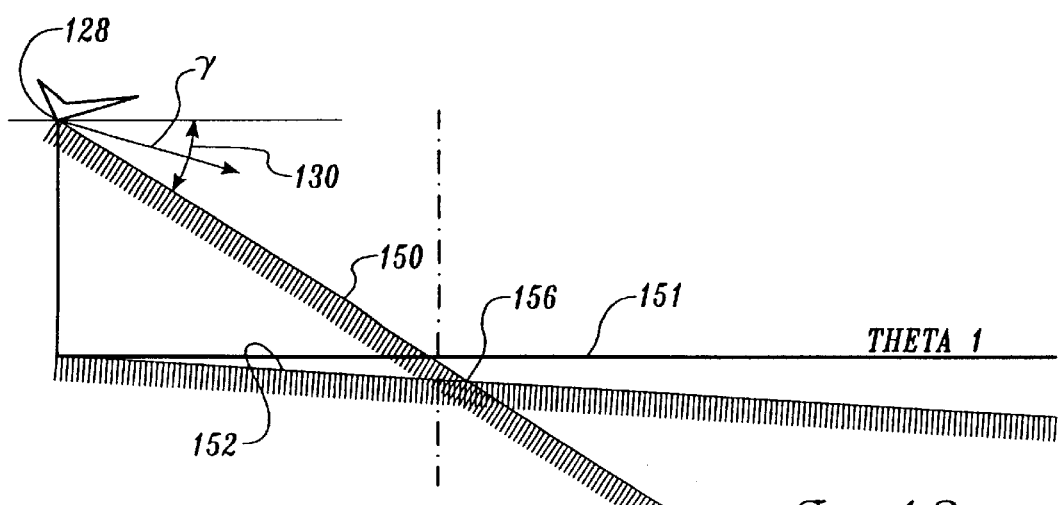
FIG. 13 is similar to FIG. 11 but for a condition when the flight path angle of the aircraft is less than a predetermined reference plane or datum and also illustrates a BETA sink rate enhancement boundary.

In order to avoid spurious warnings when the aircraft overflies a ridge at relatively low altitudes, the warning boundaries may include cut-off boundaries, for example, as illustrated in FIGS. 11, 12 and 13. Without the cut-off boundaries, warnings would be given, although the terrain is virtually below the aircraft and no terrain is visible ahead. Referring first to FIG. 11, the cut-off boundary 126 begins at a predetermined cut-off offset 128 below the aircraft and extends in a direction in front of the aircraft at a predetermined envelope cut-off angle 130. The envelope cut-off angle 130 is equal to the flight path angle $\gamma$ plus a configurable predetermined cut-off angle, described and illustrated as −6°. For level flight as shown in FIG. 11, the cut-off boundary 126 extends from the cut-off offset 128 in the direction of the envelope cut-off angle 130 toward the front of the aircraft to a point 132 where it intersects a terrain advisory boundary or terrain warning boundary, identified with the reference numeral 134. For level flight, as shown in FIG. 11, the flight path angle $\gamma$ is zero. Thus, the cut-off boundary 126 illustrated in FIG. 11 will extend from the cut-off offset 128 along an angle equal to the cut-off angle, which, as mentioned above, is selected as −6° for illustration. As mentioned above, the cut-off boundary 126 extends from the cut-off offset 128 to the point 132 where it intersects the terrain advisory boundary 134 discussed above. The warning boundary is then selected to be the highest of the terrain advisory boundary 134 and the envelope cut-off boundary 126. Thus, for the example illustrated in FIG. 11, the terrain advisory boundary would consist of the cut-off boundary 126 up to the point 132, where the envelope cut-off boundary 124 intersects the warning envelope 126. From the point 132 forward, the normal terrain advisory boundary 134, corresponding, for example, to a THETA1 slope, is utilized. Thus, if either a terrain advisory boundary or terrain warning boundary is below the cut-off boundary 126, the cut-off boundary 126 becomes the new boundary for the advisory or warning signal.

The cut-off angle 130 is limited such that if the flight path angle $\gamma$ is a relatively high climb angle, the cut-off angle 130 does not exceed a predetermined limit, for example a configurable limit between 0 to 6° as will be illustrated in FIG. 12. In particular, referring to FIG. 12, the flight path angle $\gamma$ is shown at a relatively high climb rate (i.e. $\gamma=9°$). An unlimited cut-off envelope angle 130 is illustrated by the partial segment 136. As shown, this segment 132 is 6° below the flight path angle $\gamma$. However, in order to decrease the sensitivity of the system 20 during conditions when the flight path angle is relatively large, for example 9°, indicative of a fairly steep climb, the cut-off envelope angle 130 is limited. In the example illustrated in FIG. 12, the cut-off angle limit is selected, for example, to be 1.4°. Thus, at flight path angles $\gamma$ greater than 7.4°, the cut-off angle will result in an envelope cut-off boundary 140, which is more than 6° below the flight path angle $\gamma$. As shown, since the cut-off angle limit was selected as 1.4°, the cut-off angle will be limited to 1.4° anytime the flight path angle is greater than 7.4°, even though the cut-off angle will be equal to or more than 6° less than the flight path angle $\gamma$. Thus, for the conditions illustrated in FIG. 12, the segment 140 begins at the cut-off offset 128 and continues along a line that is 1.4° from the horizon until it intersects the terrain advisory or terrain warning boundary 142 at the point 144. The actual advisory or warning boundary will be formed by the limited cut-off boundary 140 up to the point 144 and will continue with the normal warning boundary 142 beyond the point 144.

FIG. 13 illustrates a situation when the aircraft is descending and thus the flight path angle $\gamma$ is less than 0. During conditions when the flight path angle $\gamma$ is less than the normal descent angle, the warning boundary is lowered past the cut-off boundary for high sink-rate situations in order to prevent nuisance warnings during step-down approaches. In particular, a BETA sink rate enhancement is provided and is effective anytime the flight path $\gamma$ is below a predetermined configurable descent bias GBBIAS, for example, −4°. During such conditions, an angle BETA is added to the terrain advisory datum (THETA1) as indicated below. In particular, when the flight path angle $\gamma$ is greater than the descent bias angle GBBIAS or the flight path angle $\gamma$ is less than zero, BETA is selected as 0. When the flight path angle $\gamma$ is greater than zero, BETA is given by equation (11).

$$\text{BETA}=\gamma-\text{THETA1}; \text{ for } \gamma>0 \qquad (11)$$

When the flight path angle $\gamma$ is less than GBBIAS, the value for BETA is selected in accordance with equation (12) below.

$$\text{BETA}=K*(\gamma-\text{GBBIAS}), \qquad (12)$$

where k=0.5, $\gamma$=flight path angle and GBBIAS is selected as −4°.

FIG. 13 illustrates a condition when the flight path angle $\gamma$ is −8°. During this condition, the cut-off angle 130 is selected to be 6° below the flight path angle $\gamma$ and thus defines an envelope cut-off boundary 150 that extends from the cut-off offset 128 along a line which is −14° from the horizontal axis. Since the flight path angle $\gamma$ is less than GBBIAS, the angle BETA is added to the normal warning boundary according to equation (12) above. Thus, for a flight path angle of −8°, the BETA angle will be 2°. Thus, the terrain advisory or warning boundary, indicated by the boundary 151, instead of extending along the THETA1 slope, will extend along an angle which is 2° below the THETA1 slope to define the enhanced boundary 152. The warning cut-off boundary 152 thus will extend to the point 156 where it intersects the normal terrain advisory or terrain warning boundary 152. Since the cut-off angle boundary 150 is higher than boundary 152 up to the point 156, the cut-off boundary 150 will be utilized as the warning boundary up to the point 156. Beyond point 156, the BETA-enhanced warning boundary 152 will define the warning envelope.

Figure 14:
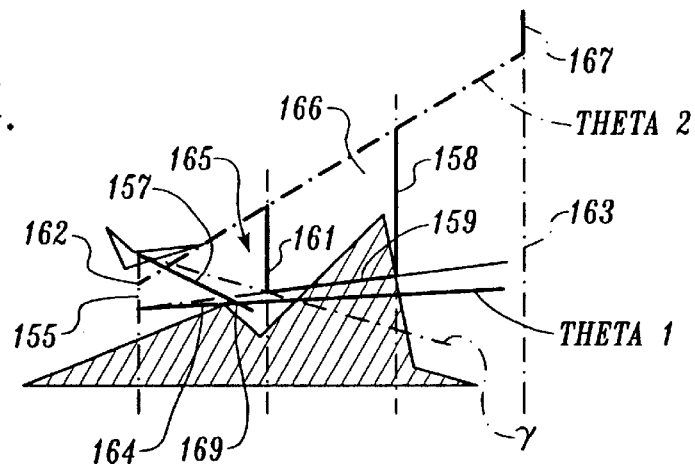
FIG. 14 is a graphical illustration of the terrain advisory and superimposed terrain warning signals for an aircraft relative to the terrain for a condition when the aircraft flight path angle is less than a first reference plane or datum.
Figure 15:
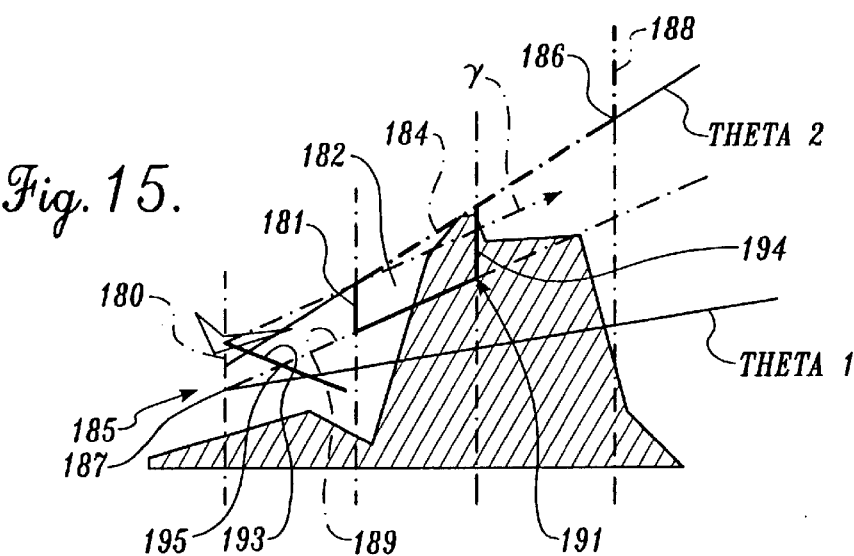
FIG. 15 is similar to FIG. 14 but for a condition when the flight path angle is between a first datum and a second datum.
Figure 16:
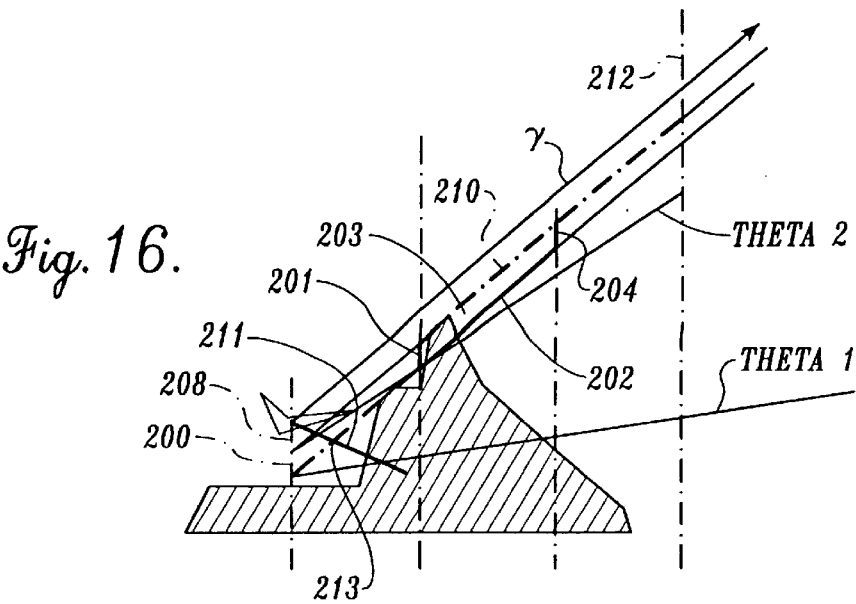
FIG. 16 is similar to FIG. 14 but for a condition when the flight path angle is less than the second datum.

FIGS. 14, 15 and 16 illustrate the composite terrain advisory and terrain warning boundaries for different conditions. The cross-hatched area illustrates terrain in the vicinity of the aircraft. Three conditions are illustrated. In particular, FIG. 14 represents a condition when the flight path angle $\gamma$ of the aircraft is less than the first datum THETA1. FIG. 15 represents a condition when the flight path angle $\gamma$ is between the first datum THETA1 and the second datum THETA2. FIG. 16 represents a condition when the flight path angle $\gamma$ is greater than the second datum THETA2. The terrain advisory boundaries are indicated in solid line while the terrain warning boundaries are illustrated by dashed lines.

Referring first to FIG. 14, the terrain advisory boundaries include a boundary 155, which extends from the aircraft to the ΔH terrain floor. Normally, the lower terrain advisory boundary 157 would extend from the segment 155 along an angle equal to the THETA1 slope. However, in this situation, the flight path angle $\gamma$ is illustrated to be greater than the GBBIAS angle; therefore, a BETA-enhanced boundary 159, as discussed above, is utilized which extends along an angle that is equal to the THETA1 angle plus the BETA angle, up to the LOOK-AHEAD distance for a terrain advisory. A vertical boundary 158 extends from the first datum THETA1 vertically upwardly along the LOOK-AHEAD distance for a terrain advisory. Since the cut-off boundary 157 is higher than the terrain advisory boundary 157 up to the point 169 where the two boundaries intersect, the cut-off boundary 157 becomes the terrain advisory boundary up to the point 169. Beyond the point 169, the boundary 159 is utilized as the warning boundary.

The terrain warning boundary includes a boundary 162 extending to a point equal to ½ of the terrain floor as discussed above. A boundary 165 extends from the boundary 162 at the THETA2 slope. A vertical boundary 167 extends from the boundary 165 along the LOOK-AHEAD distance for a terrain warning as discussed above.

FIG. 15 illustrates a situation when the flight path angle γ is greater than the THETA1 angle and less than or equal to the THETA2 angle. During this condition, the boundary for the terrain warning extends along a segment 180, which is at ½ of the ΔH terrain floor. A sloping boundary 184 extends from the segment 180 to the LOOK-AHEAD distance for a terrain warning (point 186). From there, a vertical boundary 188 extends vertically upwardly to define the terrain warning boundaries.

The terrain advisory boundary includes a boundary 185 which extends downwardly to the terrain floor, i.e. point 187. From point 187, the terrain advisory boundary extends along a segment 189 at the flight path angle γ up to a point 191, the LOOK-AHEAD distance for a terrain advisory. A vertical segment 194 extends along the LAD from the boundary 189 at the point 191.

In this illustration, an envelope cut-off boundary 193 cuts off a portion of the terrain advisory indication boundary since the flight path angle γ of the aircraft is greater than a predetermined limit. Thus, the portions of the warning boundary 189 below the cut-off angle boundary 193 are ignored; and the segment 193 becomes the effective terrain advisory indication up to the point 195, where the cut-off boundary 193 intersects the terrain advisory indication boundary 189. After the point 195, the boundary 189 will be the effective warning boundary.

FIG. 16 illustrates a situation when the flight path angle γ is greater than THETA2. In this situation, a terrain advisory boundary 200 extends from the aircraft to the boundary terrain floor. A lower boundary 202 extends at the flight path angle γ from the boundary 200 up to the LOOK-AHEAD distance for a terrain advisory. A vertical terrain advisory boundary 204 extends upwardly along the LOOK-AHEAD distance for the terrain advisory. Since the flight path angle γ is illustrated to the greater than GBBIAS, a segment 211, the cut-off boundary, defines the effective warning boundary up to a point 213 where the terrain advisory boundary intersects the cut-off warning boundary. After that point, segment 202, which is higher, becomes the warning boundary.

The terrain warning boundary extends along a segment 208 down to a point of ½ the terrain floor. A lower boundary 210 extends along an angle equal to flight path angle γ since it is greater than the THETA2 slope. A vertical terrain warning boundary 212 extends upwardly from the boundary 210 along the LOOK-AHEAD distance for a terrain warning.

In order to provide additional sensitivity of the warning system, terrain advisory signals within a predetermined portion of the LAD for a terrain advisory, for example ½ LAD, may be treated as terrain warnings. Thus, as shown in FIGS. 14, 15 and 16, vertical boundaries 161, 181 and 201, respectively, are shown, for example, at ½ LAD. Based upon the flight path angles shown, these segments define effective terrain advisory envelopes 166, 182 and 203.

ALTERNATIVE TERRAIN THREAT BOUNDARIES

Figure 17:
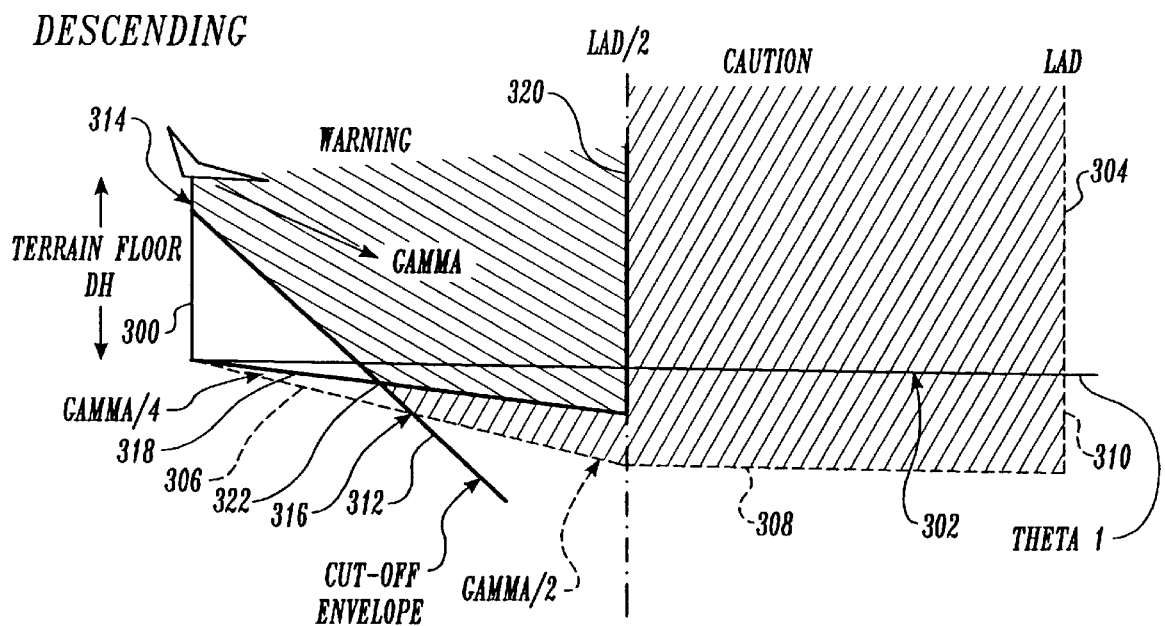
FIG. 17 is a graphical illustration of LOOK-AHEAD/LOOK-DOWN terrain advisory and warning boundaries for a condition when the aircraft is descending.
Figure 18:
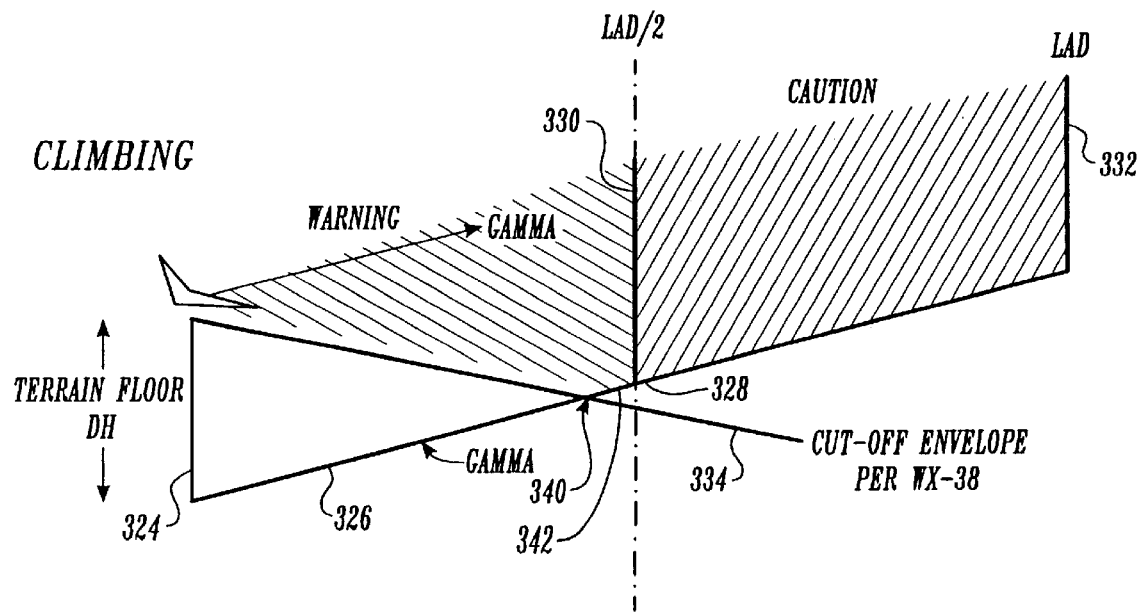
FIG. 18 is similar to FIG. 17 but for a condition when an aircraft is climbing.
Figure 19:
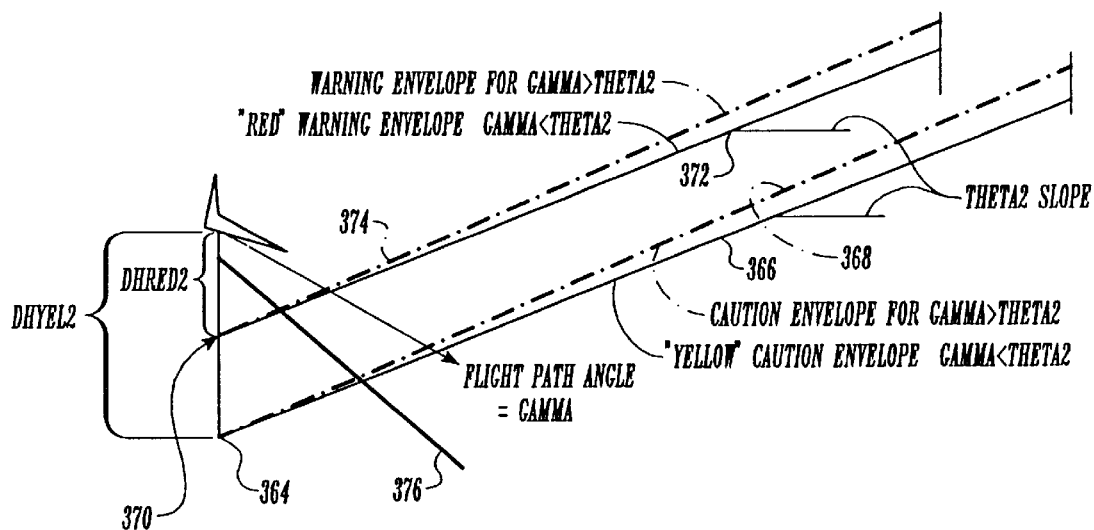
FIG. 19 is a graphical illustration of LOOK-UP terrain advisory and warning boundaries in accordance with the present invention.

Alternative terrain threat boundaries are illustrated in FIGS. 17–22. Similar to the terrain threat boundary discussed above and illustrated in FIGS. 5–16, the alternative terrain threat boundaries include a terrain floor boundary, terrain advisory boundaries (yellow alert) and terrain warning boundaries (red alert). In the alternative embodiment, the advisory and warning boundaries are further divided into two parts, a LOOK-AHEAD/LOOK-DOWN boundary for detecting terrain ahead or below the aircraft (FIGS. 17 and 18) and a LOOK-UP boundary for detecting precipitous high terrain ahead of the aircraft which may be difficult to clear (FIG. 19).

LOOK-AHEAD/LOOK-DOWN TERRAIN ADVISORY AND WARNING BOUNDARIES

As mentioned above, the LOOK-AHEAD/LOOK-DOWN boundaries are illustrated in FIGS. 17 and 18. Referring first to FIG. 17, LOOK-AHEAD/LOOK-DOWN advisory and warning boundaries are illustrated for a condition when the aircraft is descending (i.e. γ<0). During such a configuration, the first segment of the LOOK-AHEAD/LOOK-DOWN terrain advisory boundary, identified with the reference numeral 300, corresponds to the ΔH terrain floor boundary. As discussed above, the ΔH terrain floor boundary is a function of the aircraft from the runway. In order to determine the bottom segment 302 of the LOOK-AHEAD/LOOK-DOWN terrain advisory boundary, the flight path angle γ is compared with a configurable datum, THETA1, for example 0°. During descent conditions, the flight path angle γ will thus be less than THETA1. Thus, the LOOK-AHEAD/LOOK-DOWN terrain advisory boundary segment will extend from the ΔH terrain floor boundary segment 300 along the angle THETA1 to the look-ahead distance for a terrain advisory (LAD). The final segment 304 extends vertically upwardly from the segment 302 along the LAD.

The LOOK-AHEAD/LOOK-DOWN terrain advisory boundary may also be modified by the BETA sink rate enhancement as discussed above. In this embodiment, the BETA sink rate enhancement ensures that an advisory indication always precedes a warning indication when the aircraft descends into or on top of terrain. The BETA sink rate enhancement is determined as a function of the flight path angle γ and two (2) configurable constants KBETA and GBIAS. The BETA sink rate enhancement BETA1 for a LOOK-AHEAD/LOOK-DOWN terrain advisory is provided in equation (13) below for a condition when the aircraft is descending.

$$BETA1 = KBETA * (\gamma - GBIAS), \quad (13)$$

where GBIAS is a configurable constant, selected for example, to be zero (0) and KBETA is also a configurable constant selected, for example, to be 0.5.

Referring to FIG. 17, the BETA sink rate enhancement BETA1 for the LOOK-AHEAD/LOOK-DOWN terrain advisory boundary provides an advisory warning at a distance less than ½ LAD, unlike the terrain advisory boundary described above). More particularly, for the values defined above for the configurable constants KBETA and GBIAS, the BETA sink rate enhancement BETA1 results in a segment 306 which extends from the ΔH terrain floor segments 300 at an angle equal to γ/2 up to ½ of the LAD. Beyond ½ LAD, a segment 308 extends at the angle THETA1 to a distance equal to the LAD. A vertical segment 310 extends along the LAD to connect the segments 308 to the segment 304.

As discussed above, a cut-off boundary may be provided to reduce nuisance warnings. Referring to FIG. 17, the cut-off boundary is identified with the reference numeral 312. The cut-off boundary 312 extends from a vertical distance 314 below the aircraft along a cut-off angle up to the point of intersection 316 with the terrain advisory boundary. For distances less than the intersection 316, the cut-off boundary 312 forms the terrain advisory boundary. For distances beyond the point of intersection 316, the boundaries 306 and 308 form the terrain advisory boundaries.

The terrain warning boundary includes the segment 300 extending from the aircraft along the ΔH terrain floor. A bottom segment 318 connects to the segment 300 and extends long a BETA sink rate enhancement angle BETA2. The BETA sink ate enhancement angle is determined as a function of the flight path angle γ and a configurable constant KBETA2 as well as the constant GBIAS discussed above and provided in equation (14) below.

$$\text{BETA2} = \text{KBETA2}*(\text{GAMMA} - \text{GBIAS}), \tag{14}$$

where GBIAS is a configurable constant selected, for example, to be 0 and KBETA2 is also a configurable constant selected, for example, to be 0.25.

For such values of the constants KBETA2 and GBIAS, the BETA enhancement angle KBETA2 will be ¼*γ. Thus, the segment 318 extends from the segment 300 at an angle equal to ¼*γ up to ½ the LAD. A vertical segment 320 extends along a distance equal to ½*LAD from the segment 318 to define the terrain warning boundary.

Similar to the above, the terrain warning boundaries are also limited by the cut-off boundary 312. Thus, the cut-off boundary 312 forms the terrain warning boundary up to a point 322, where the cut-off boundary 312 intersects the lower terrain warning boundary 318. At distances beyond the point of intersection 322, the segment 318 forms the lower terrain warning boundary up to a distance equal to ½ of the LAD.

The terrain advisory and terrain warning boundaries for a condition when the aircraft is climbing (i.e. γ>0) is illustrated in FIG. 18. During such a condition, the BETA sink rate enhancement angles BETA1 and BETA2 are set to a configurable constant, for example, zero (0).

The terrain advisory boundary during a climbing condition is formed by extending a vertical segment 324 from the aircraft for a distance below the aircraft equal to the ΔH terrain floor. During a climbing condition, a segment 326 is extended from the segment 324 to the LAD at an angle equal to the flight path angle γ. At a point 328 where the segment 326 intersects a position equal to ½ of the LAD, a vertical segment 330 is extended up from the segment 326, forming a first vertical boundary for the terrain advisory condition. The line segment 326 from the point 328 to the LAD forms the lower terrain advisory boundary while a line segment 332 extending vertically upward from the line segment 326 along the LAD forms a second vertical boundary.

For the exemplary condition illustrated, a cut-off boundary 334 does not intersect the terrain advisory boundaries. Thus, the terrain advisory boundaries for the exemplary condition illustrated is formed by the segments 330 and 332 and that portion of the line segment 326 between the line segments 330 and 332.

The terrain warning boundaries for a condition when the aircraft is climbing includes the vertical segment 324 (FIG. 18) which extends from the aircraft to vertical distance equal to the ΔH terrain floor below the aircraft forming a first vertical boundary. For a condition when the aircraft is climbing, the line segment 326 extends from the segment 324 at the flight path angle γ to form the lower terrain warning boundary. The vertical segment 330 at a distance equal to ½ of the LAD forms the second vertical terrain warning boundary.

The cut-off boundary 334 limits a portion of the terrain warning boundary. In particular, the cut-off boundary 334 forms the lower terrain warning boundary up to a point 340, where the cut-off boundary 334 intersects the line segment 326. Beyond the point 340, a portion 342 of the line segment 340 forms the balance of the lower terrain warning boundary up to a distance equal to ½ of the LAD.

LOOK-UP TERRAIN ADVISORY AND WARNING BOUNDARIES

The LOOK-UP terrain advisory and terrain warning boundaries are illustrated in FIG. 19. As will be discussed in more detail below, the LOOK-UP terrain advisory and warning boundaries start at altitudes DHYEL2 and DHRED2, respectively, below the aircraft. These altitudes DHYEL2 and DHRED2 are modulated by the instantaneous sink rate (i.e. vertical speed, HDOT of the aircraft). The amount of modulation is equal to the estimated altitude loss for a pull-up maneuver, for example, at ¼G (i.e. 8 ft/sec²) at the present sink rate. The altitudes DHRED2 and DHYEL2 are dependent upon the altitude loss during a pull-up maneuver (AlPU) and the altitude loss due to reaction time (ALRT) discussed below.

Figure 20:
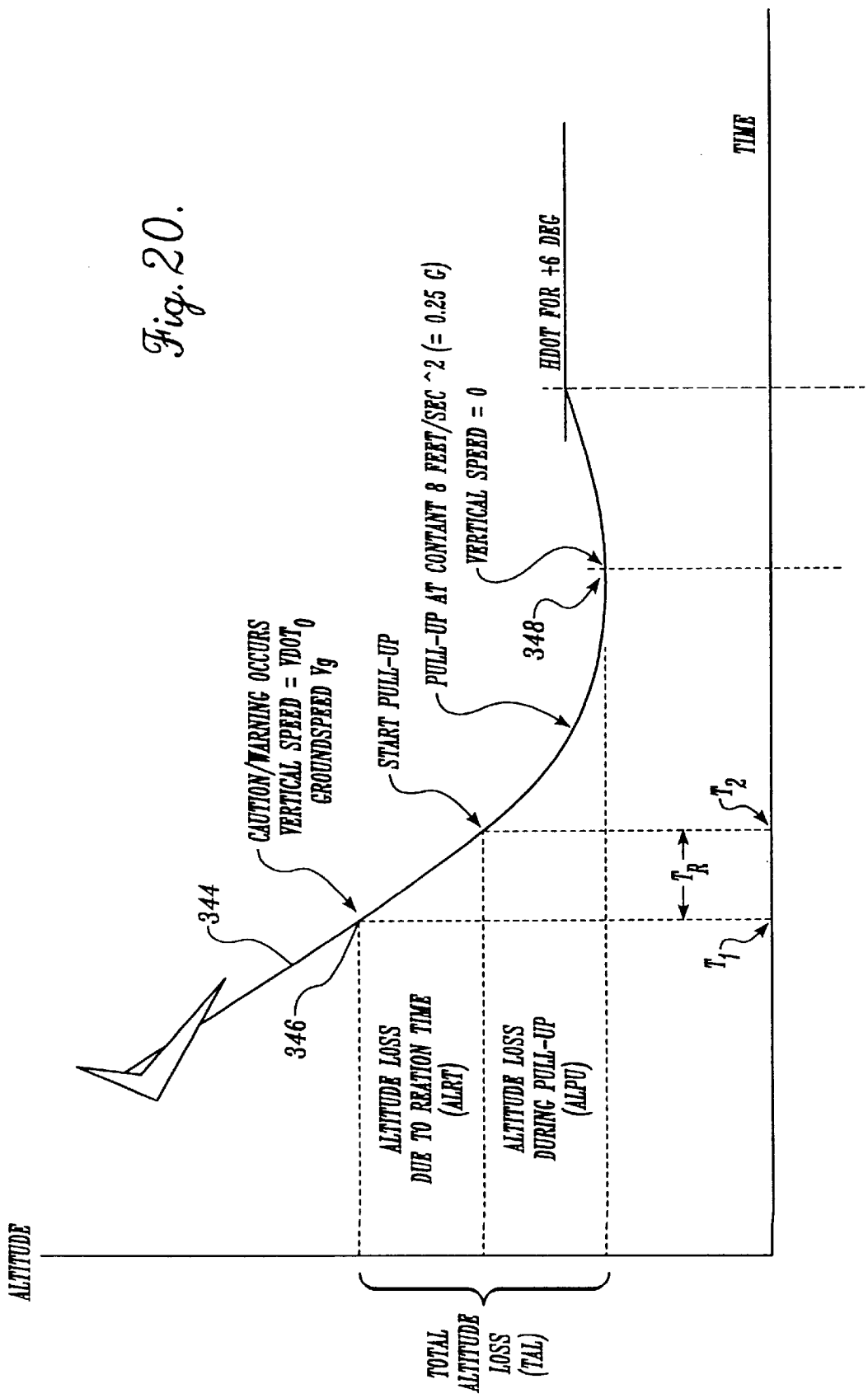
FIG. 20 is a graphical illustration of an aircraft during a pull-up maneuver.

The estimated altitude loss due to a pull-up maneuver ALPU is best understood with reference to FIG. 20, wherein the vertical axis relates to altitude in feet and the horizontal axis relates to time in seconds. The trajectory of the aircraft from a time shortly before pull-up is initiated to a time when the aircraft has recovered is shown and identified with the reference numeral 344.

Assuming an advisory or warning indication is generated at time $T_1$ at a point 346 along the trajectory 344, the altitude loss due to the reaction time of the pilot (ALRT) is given by equation (15) below.

$$\text{ALRT} = \text{HDOT}*T_R, \tag{15}$$

where HDOT equals the vertical acceleration of the aircraft in feet/sec and $T_R$ equals the total reaction time of the pilot in seconds.

Assuming a pull-up maneuver is initiated at time $T_2$, the altitude loss due to the pull-up maneuver ALPU may be determined by integrating the vertical velocity HDOT with respect to time as set forth in equation (16) below.

$$\text{HDOT}(t) = a*t + \text{HDOT}_0, \tag{16}$$

where "a" equals the pull-up acceleration and $\text{HDOT}_0$ is a constant.

Integrating both sides of equation (16) yields the altitude loss as a function of time H(t) as provided in equation (17) below.

$$H(t) = \frac{1}{2}*a*t^2 + \text{HDOT}_0 t \tag{17}$$

Assuming a constant acceleration during the pull-up maneuver, the time t until vertical speed reaches zero (point 348) is given by equation (18).

$$t = -\text{HDOT}_0/a \tag{18}$$

Substituting equation (18) into equation (17) yields equation (19).

$$ALPU = -(HDOT_0)^2/(2*a) \quad (19)$$

Equation (19) thus represents the altitude loss during the pull-up maneuver.

Figure 21:
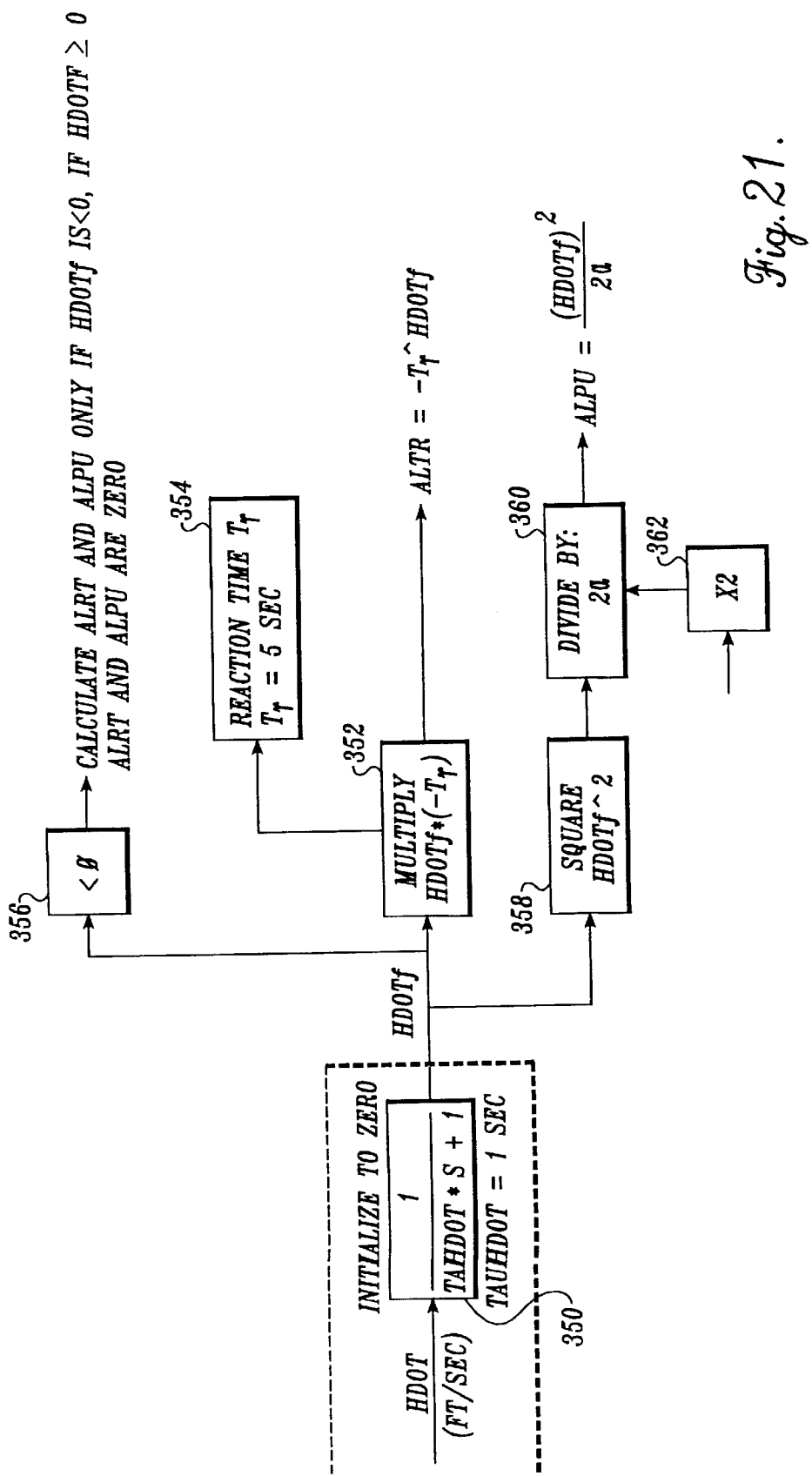
FIG. 21 is an exemplary block diagram for a system for generating a signal representative of the altitude loss due to pilot reaction time ALPT, as well as altitude loss due to a pull-up maneuver ALPU.

An exemplary block diagram for generating the signals ALTR and ALPU is illustrated in FIG. 21. In particular, a signal representative of the vertical velocity of the aircraft HDOT, available, for example, from a barometric altimeter rate circuit (not shown), is applied to a filter 350 in order to reduce nuisance warnings due to turbulence. The filter 350 may be selected with a transfer function of 1/(TAHDOT*S+1); where TAHDOT is equal to one second. The output of the filter 350 is a signal HDOTf, which represents the filtered instantaneous vertical speed; positive during climbing and negative during descent.

In order to generate the altitude loss due to reaction time signal ALTR, the signal HDOTf is applied to a multiplier 352. Assuming a pilot reaction time Tr, for example, of 5 seconds, a constant 354 equal to 5 seconds is applied to another input of the multiplier 352. The output of the multiplier 352 represents the signal ALTR, which is positive when HDOTf is negative and set to zero if the signal HDOTf is positive, which represents a climbing condition. More particularly, the signal HDOTf is applied to a comparator 356 and compared with a reference value, for example, zero. If the comparator 356 indicates that the signal HDOTf is negative, the signal HDOTf is applied to the multiplier 352. During climbing conditions, the signal HDOTf will be positive. During such conditions, the comparator 356 will apply a zero to the multiplier 352.

The altitude loss due to the pull-up maneuver signal ALPU is developed by a square device 358, a divider 360 and a multiplier 362. The filtered instantaneous vertical speed signal HDOTf is applied to the square device 358. Assuming a constant acceleration during the pull-up maneuver, for example, equal to 8 feet/sec$^2$ (0.25 G), a constant is applied to the multiplier 362 to generate the signal 2a. This signal, 2a, is applied to the divider 360 along with the output of the square device 350. The output of the divider 360 is a signal (HDOT f)$^2$/2a, which represents the altitude loss during a pull-up maneuver signal ALPU.

These signals ALRT and ALPU are used to modulate the distance below the aircraft where terrain advisory and terrain warning boundaries begin during a LOOK-UP mode of operation. More particularly, during such a mode of operation, ΔH terrain floor segment of the terrain advisory boundary DHYEL2 is modulated by the signals ALRT and ALPU while the ΔH terrain floor segment of the terrain warning boundary DHRED2 is modulated by the signal ALPU as indicated in equations (20) and (21), respectively.

$$DHYEL2 = ¾*ΔH + ALRT + ALPU \quad (20)$$

$$DHRED2 = ½*Δ + ALPU, \quad (21)$$

where ΔH represents the terrain floor as discussed above.

Thus, referring to FIG. 19, the LOOK-UP terrain advisory warning begins at a point 364 below the aircraft; equal to DHYEL2. If the flight path angle γ is less than a configurable datum THETA2, a terrain advisory boundary 366 extends from the point 364 to the advisory LAD at an angle equal to THETA2. Should the flight path angle γ be greater than THETA2, the lower advisory boundary, identified with the reference numeral 368, will extend from the point 364 at an angle equal to the flight path angle γ.

Similarly, the LOOK-UP terrain warning boundary begins at point 370 below the aircraft; equal to DHRED2. If the flight path angle γ is less than the angle THETA2, a warning boundary 372 extends from the point 370 at angle THETA2 to the warning LAD. Should the flight path angle γ be greater than THETA2, a warning boundary 374 will extend at an angle equal to the flight path angle γ between the point 370 and the warning LAD.

CUT-OFF ALTITUDE

The cut-off altitude is an altitude relative to the nearest runway elevation; set at, for example, 500 feet. Altitudes below the cut-of altitude are not displayed and are ignored by the terrain advisory and terrain warning computations.

The use of a cut-off altitude declutters the display discussed below around airports, especially during a final approach when the aircraft approaches the ground. A second advantage is that nuisance warnings on a final approach, due to altitude errors, terrain data base resolution and accuracy errors are minimized.

However, the use of a cut-off altitude during certain conditions, such as an approach to an airport on a bluff (i.e. Paine Field) at a relatively low altitude or even at an altitude below the airport altitude, may compromise system performance. More particularly, during such conditions, the use of a cut-off altitude may prevent a terrain warning from being generated because the threatening terrain may be below the cut-off altitude. In order to account of such situations, the system selects the lower of two cut-off altitudes; a nearest runway cut-off altitude (NRCA) and a cut-off altitude relative to aircraft (CARA). The NRCA is a fixed cut-off altitude, relative to the nearest runway. The CARA is an altitude below the instantaneous aircraft altitude (ACA) by an amount essentially equivalent to ΔH terrain floor boundary for an advisory condition, which, as discussed above, is a function of the aircraft distance to the nearest runway.

Equations (22) and (23) below set forth the NRCA and CARA. As mentioned above, the absolute cut-off altitude (ACOA) is the lower of the NRCA and CARA as set forth in equation (24).

$$NRCA = COH + RE, \quad (22)$$

where COH relates to the cut-off height and is a fixed configurable value, initially set between 400 feet and 500 feet; and RE equals the runway elevation.

$$CARA = ACA - ΔH - DHO, \quad (23)$$

where ACA is the instantaneous aircraft altitude; ΔH is the terrain floor which is proportional to the distance to the runway as discussed above; and DHO is a configurable bias, set to, for example, 50 feet.

$$ACOA = \text{lower of CARA, NRCA,} \quad (24)$$

except where ΔH DH1, in which case ACOA is always equal to NRCA.

DH1 is a point at which the ACOA is forced to be equal to NRCA independent of the aircraft altitude. The point DH1 is related to COH, ΔH and DHO such that on a nominal three (3) degree approach slope, CARA is equal to NRCA when the aircraft is at a distance equal to a distance DH1 from the airport, as illustrated in TABLE 2 below.

TABLE 2

| COH (feet) | DH1 (feet) | DISTANCE TO RUNWAY (n mile) |
|---|---|---|
| 300 | 50 | 1 |
| 400 | 100 | 1.5 |
| 500 | 150 | 2 |

The point DH1 forces the cut-off altitude (COH) above the runway whenever the aircraft is close to the runway to ensure robustness against nuisance warnings caused by altitude errors and terrain data base resolution margins to disable the terrain advisory and warning indications when the aircraft is within the aircraft perimeter. There are trade-offs between nuisance warnings and legitimate warnings. In particular, the lower COH, the closer the advisory and warning indications are given, making the system more nuisance prone. As indicated above, for a COH of 400, terrain advisory and warning indications are effectively disabled when the aircraft is closer than 1.5 n miles from the airport runway.

Figure 22:
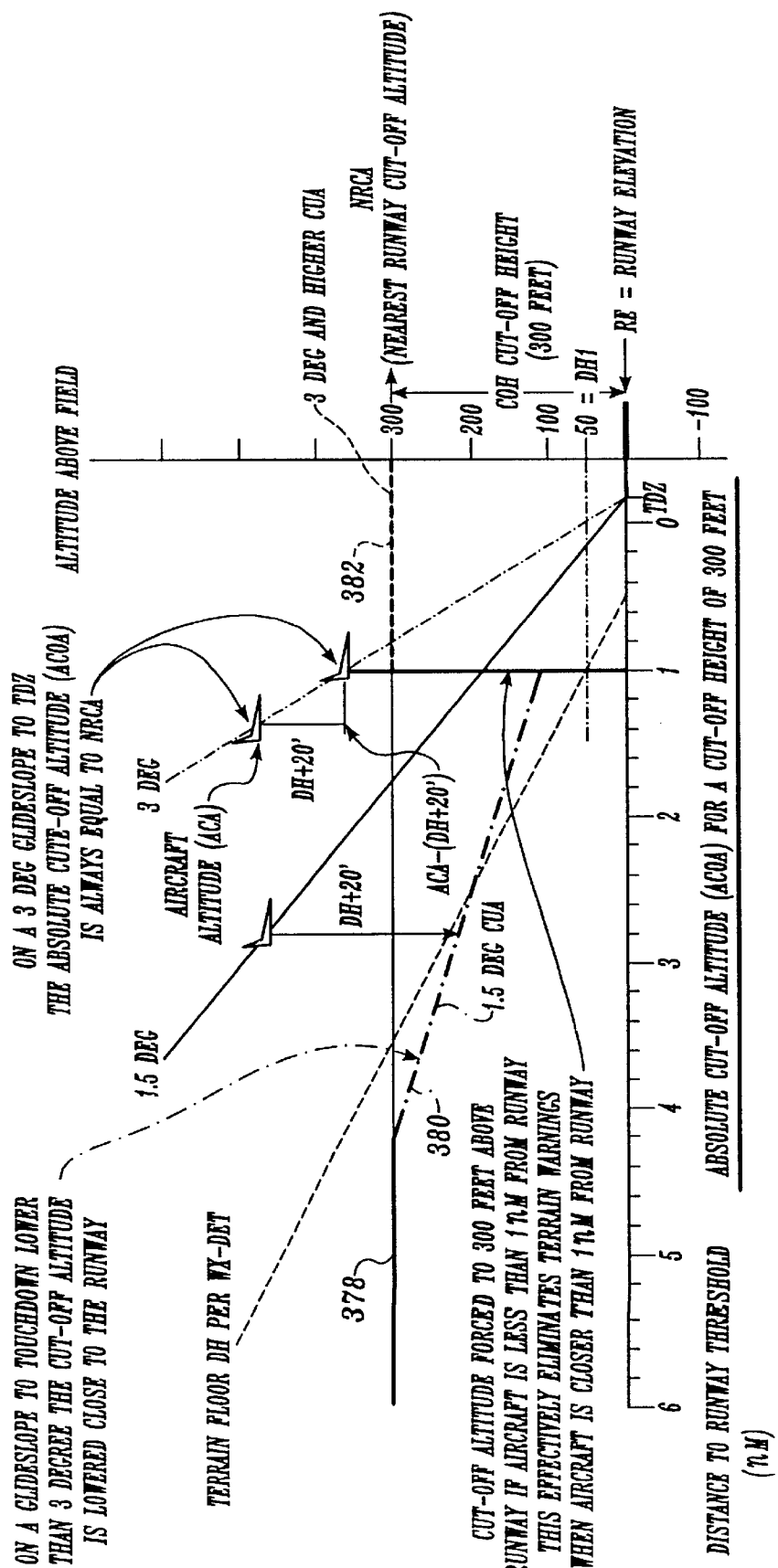
FIG. 22 is a graphical illustration of an alternative methodology for generating a cut-off altitude boundary.

FIG. 22 illustrates the operation of the alternative cut-off altitude boundaries. In particular, FIG. 22 illustrates a condition when the COH is set to 300 feet with DH1 equal to 50 feet. The cut-off altitude substantially for area from the runway, for example, greater than 4 nautical miles, is 300 feet, as indicated by the segment 378 when the glide slope angle is less than a predetermined angle, for example, 3°. As the aircraft gets closer to the runway, the COH is lowered, as illustrated by the segment 388, until the aircraft is within one (1) nautical mile of the runway, at which point the COH is forced to be 300 feet, which effectively disables any terrain advisory and warning indications within the aircraft is closer than one (1) nautical mile from the runway, as represented by the segment 382.

During a condition when the aircraft is on a, for example, 3° glide slope angle, the ACOA is forced to be the NRCA. As shown, the NRCA is illustrated by the segment 382.

DISPLAY SYSTEM

A display system, generally identified with the reference numeral 400, is illustrated in FIGS. 23–42. The display system 400 is used to provide a visual indication of the terrain advisory and terrain warning indications discussed above as a function of the current position of the aircraft. Background terrain information is also provided which provides an indication of significant terrain relative to the current position of the aircraft.

In order to declutter the display, background information may be displayed in terms of predetermined dot patterns whose density varies as a function of the elevation of the terrain relative to the altitude of the aircraft. Terrain advisory and terrain warning indications may be displayed in solid colors, such as yellow and red, relative to the groundtrack of the aircraft.

An important aspect of the invention is that the terrain background information as well as the terrain advisory and warning indications may be displayed on a navigational or weather display, normally existing within an aircraft, which reduces the cost of the system and obviates the need for extensive modifications to existing displays, such as a navigational and weather radar type display. In particular, the terrain data is converted to a weather radar format in accordance with the standard ARINC 708/453 for digital buses on civil aircraft. The terrain data, masked as weather data, can then be easily displayed on an existing navigational or a dedicated weather radar display that conforms with the ARINC 708/453 serial interface standard.

Figure 23:
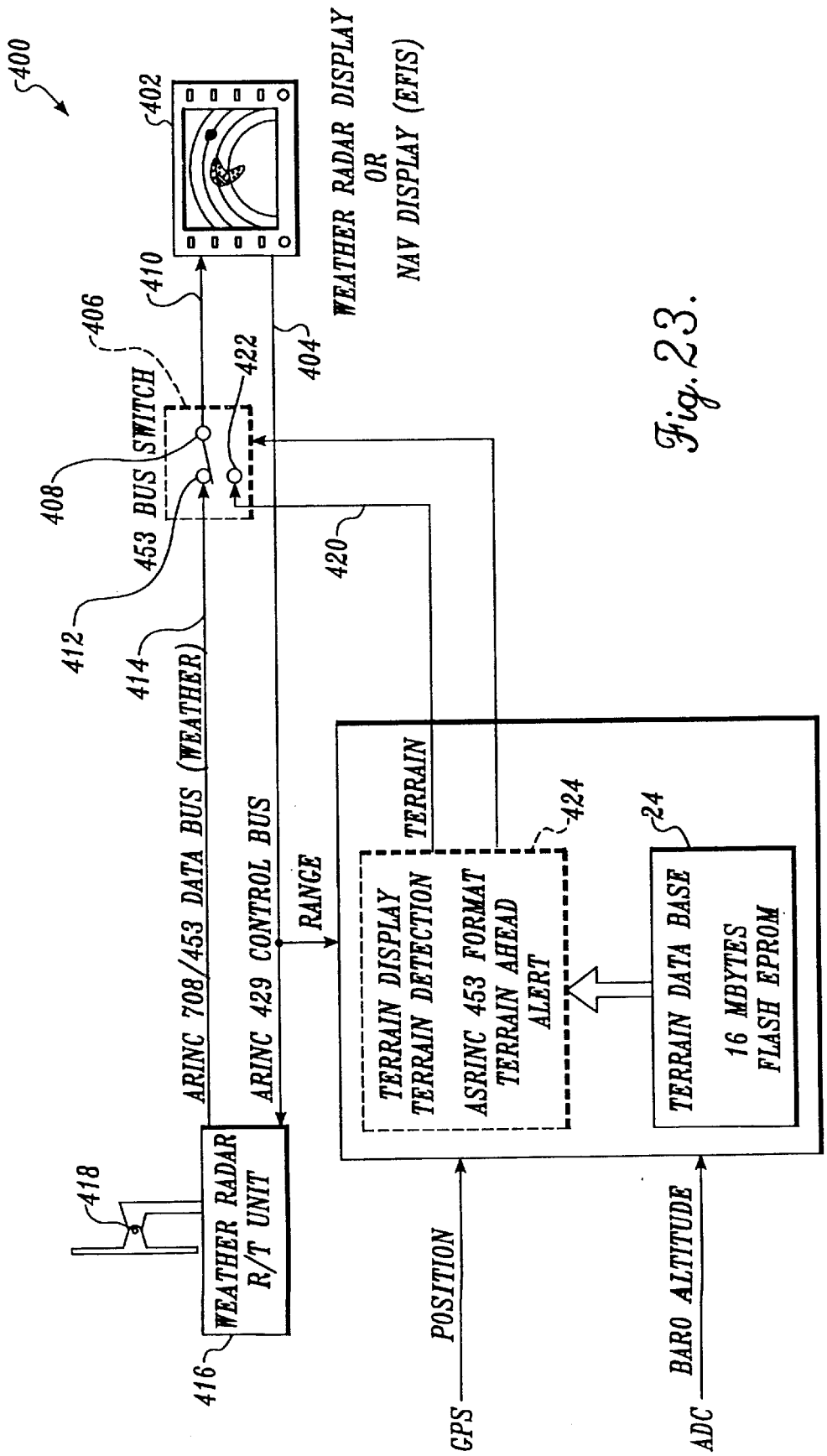
FIG. 23 is a block diagram of the display system.

Referring to FIG. 23, the display system 400 includes a weather radar display or navigational display 36 connected to a control bus 404 conforming to an ARINC 429 standard and a terrain data bus switch 406. The terrain data bus switch 406 enables selection between terrain data and weather data for display. More particularly, the data bus switch 406 includes a common pole 408 connected to the display 36 by way of a serial display bus 410. One contact 412 on the data bus switch 406 is connected to a serial weather data bus 414 and, in turn, to a weather radar R/T unit 416, which transmits weather radar data over the weather data bus 414 in conformance with the ARINC 708/453 standard.

An antenna 418 provides weather radar data to the weather radar R/T unit 416. The weather radar R/T unit 416 is also connected to the control bus 404, which is used for range and mode data.

In accordance with an important aspect of the invention, the terrain advisory and terrain warning indications, as well as the background information discussed above, are converted to "RHO/THETA" format. The converted terrain data is then applied to a terrain data serial bus 420, which conforms to the ARINC 453 standard, and connected to a contact 422 on the data bus switch 406 to enable selective display of either weather radar or terrain data on the display 36.

The system for converting the terrain advisory and warning indications as well as background terrain data to an ARINC 708/453 standard serial format is indicated as a functional block 424 in FIG. 23 and is described in more detail below. By converting such data into an ARINC 708/453 standard serial format, the data can be displayed on an existing display 36, which conforms to the ARINC 453 standard without the need for relatively complex and expensive modifications to the display's symbol generator.

Figure 24:
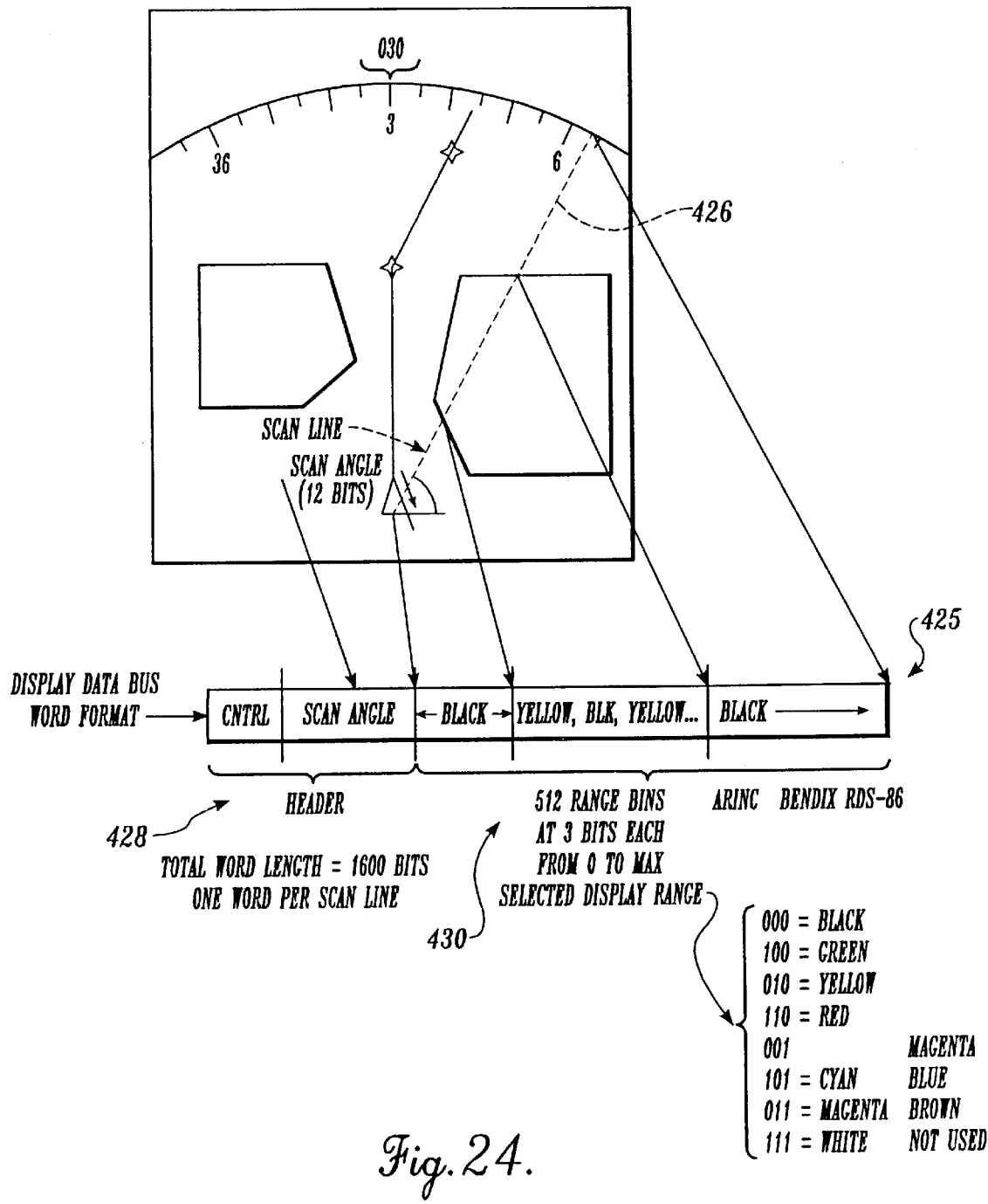
FIG. 24 is a functional diagram of the display data format in accordance with the ARINC 708/453 standard for a weather radar display.

Referring to FIG. 24, each word 425, in accordance with the ARINC 453/708 standard, is 1600 bits long and represents one spoke or radial 426 of the display 36. Normally, 512 spokes or radials 426 are transmitted for each complete sweep of the display 36. At a transmission rate of, for example, 1 megahertz (MHz), each word 425 takes about 1.6 milliseconds (msec) to transmit. For 512 spokes, one complete sweep will thus take about 4 seconds.

The 1600-bit words 425 include a header 428 and 512 range bins 430. The header 428 includes the control data on the control bus 404 and also includes a 12-bit code representing the antenna scan angle; the angle of the spoke relative to the aircraft heading equivalent to an indicator UP direction. The range bins 430 cover the distance from the antenna 418 to the maximum selected. Each of the 512 range bins includes three intensity bits, encoded into colors as indicated in TABLE 3 below.

TABLE 3

| 3-BIT RANGE CODE | COLOR |
|---|---|
| 000 | BLACK |
| 100 | GREEN |
| 010 | YELLOW |
| 110 | RED |
| 001 | — |
| 101 | CYAN |

TABLE 3-continued

| 3-BIT RANGE CODE | COLOR |
| --- | --- |
| 011 | MAGENTA |
| 111 | — |

As will be discussed in more detail below, the display system 400 is capable of displaying background terrain information as well as terrain threat indications as a function of the current position of the aircraft. The threat detection algorithm is run along the groundtrack of the aircraft. Thus, terrain threat indications are typically displayed along the groundtrack while background terrain is displayed relative to the heading of the aircraft.

Figure 25:
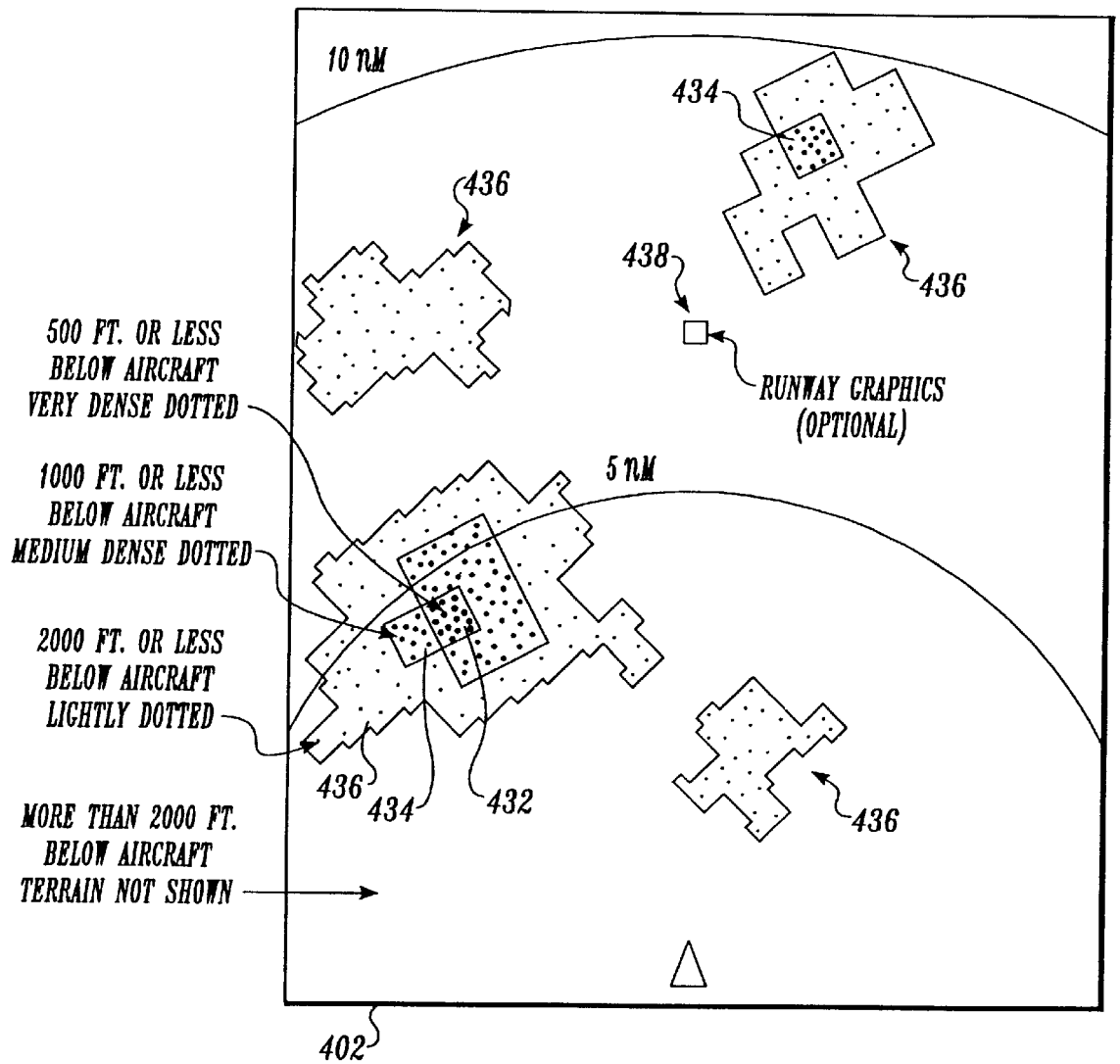
FIG. 25 is a plan view of a background terrain display illustrating the variable density dot pattern.

Referring to FIG. 25, the terrain background information is shown on the display 36. As will be discussed in more detail below, the elevation of the highest terrain relative to the altitude of the aircraft is shown as a series of dot patterns whose density varies as a function of the distance between the aircraft and the terrain. For example, a relatively dense dot pattern 432 may be used to indicate terrain that is, for example, 500 feet or less below the aircraft. A medium dense dot pattern 434 may be used to represent terrain that is 1000 feet or less below the aircraft, while a lightly dotted pattern 436 may be used to indicate terrain 2000 feet or less below the aircraft. In order to declutter the display 402, terrain more than, for example, 2000 feet below the aircraft, is not shown. The dots may be displayed in one of the colors indicated in TABLE 3 above, for example, yellow (amber). In addition, in the vicinity of an airport, a runway graph 438, for example, in green, may also be provided. The apparent display resolution may be increased by using more than one color along with the variable density dot patterns, for example, as shown in TABLE 4 below.

TABLE 4

| DOT DENSITY PATTERN | HIGH | 3000 | 0 |
| --- | --- | --- | --- |
| | MEDIUM | 4000 | 1000 |
| | LOW | 5000 | 2000 |
| COLOR | | GREEN | YELLOW |

Figure 26:
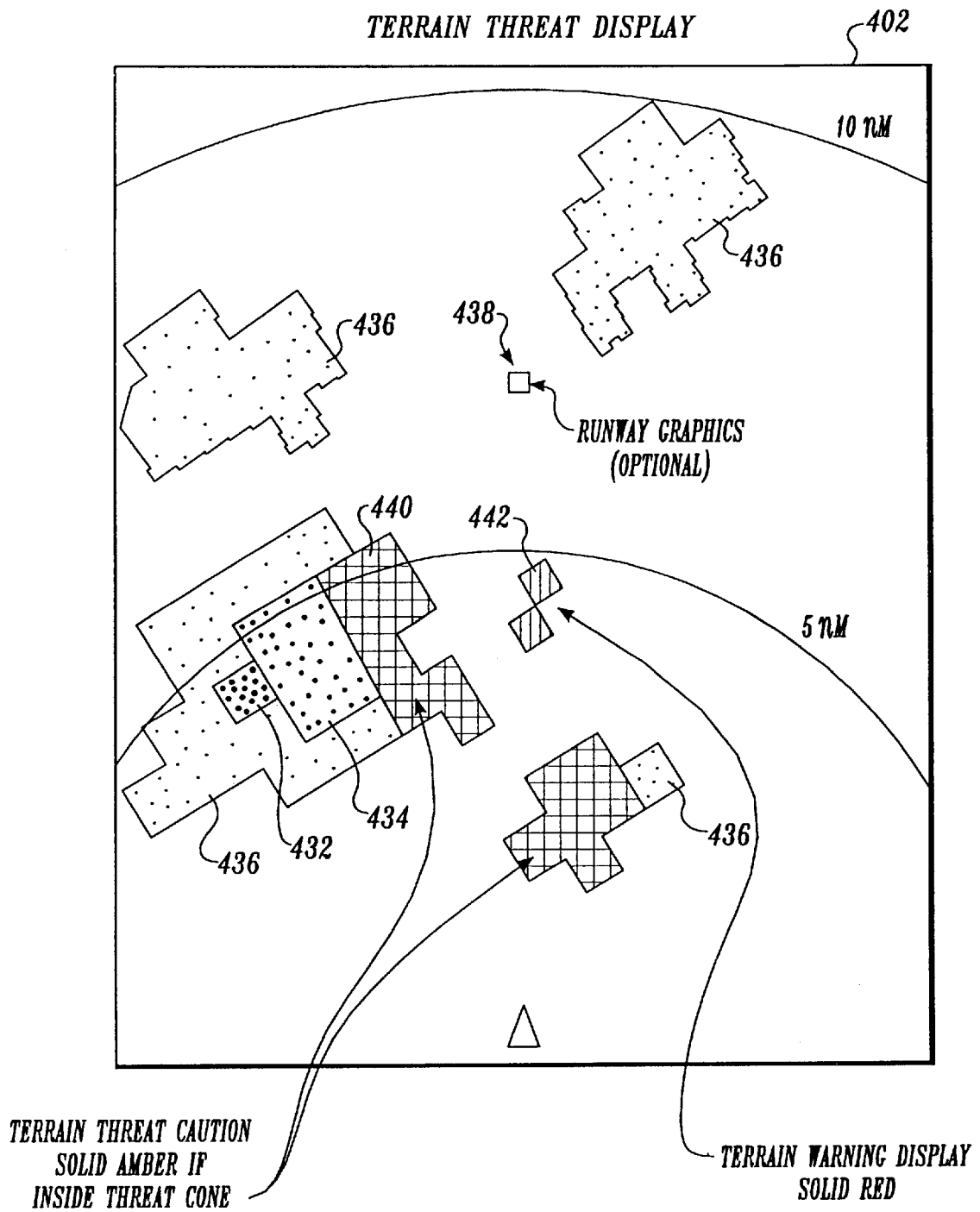
FIG. 26 is similar to FIG. 25 but additionally illustrates the terrain threat indications.

The display of a terrain threat indication is illustrated in FIG. 26. As shown, the terrain threat indication may be displayed contemporaneously with the background terrain information. Terrain advisory and terrain warning indications are displayed in solid shapes 440 and 442, respectively, for example, "squares"; the displayed terrain map cells which represent a threat painted solid yellow or red. More particularly, at an aspect ratio for the display of, for example, 3×4 (vertical to horizontal), the terrain cells will appear "square", particularly at relatively low-range settings. Colors are used to distinguish between terrain advisory and terrain warning indications. For example, red may be used to represent a terrain warning indication 442 while yellow or amber is used to represent a terrain advisory indication 440. By using colored shapes for terrain threat indications and dot patterns of variable density for the terrain background information, clutter of the display 402 is minimized.

The terrain data from the terrain data base 24, for example, as illustrated in FIG. 4B, is used to compute the terrain threat indications as well as background information for the display 36. As discussed above, the terrain data base 24 may be stored in a flash ROM 444 (FIG. 27) for convenience of updates. In order to facilitate update of the display 36 as a function of the position of the aircraft, terrain data from the flash ROM 444 is transferred to a random access memory (RAM) A, identified with the reference numeral 446. As will be discussed in more detail below, the RAM A is mapped with terrain data from the flash ROM 444, centered about the current position of the aircraft, as illustrated in FIG. 27.

In order to provide a relatively large display range, for example, 160 nautical miles, while minimizing processing time as well as the size of the RAM A, the RAM A is configured as a "wedding cake" as generally illustrated in FIG. 28 and configured such that the highest terrain resolution is near the position of the aircraft and the terrain farthest from the aircraft position has the lowest resolution. For example, the RAM A may be provided with four (4) layers. As shown, the instantaneous aircraft position is shown generally centered in layer 1, having the highest resolution. The resolution of layer 2 lies between the resolution of layer 3 and layer 1. Layer 4 (not shown) is provided with a relatively coarse resolution for use in a cruise mode.

Such a variable resolution display, configured as a layered wedding cake, minimizes the memory size of RAM A as well as the processing time. In order to improve the performance of the system, the flash ROM 444 may also be configured similar to a "wedding cake", as generally illustrated in FIG. 27.

As discussed above, the terrain data base 24 may be provided with variable resolution with a relatively fine resolution of, for example, 30×20 arc sec (i.e. ½×½ arc min). The relatively coarse resolution of layers 2 and 3 can be formed by combining finer resolution maps. With such a resolution, the configuration of RAM A may be selected in accordance with TABLE 5.

TABLE 5

| LAYER | RESOLUTION (MINUTES) | LAYER SIZE (MINUTES) |
| --- | --- | --- |
| 1 | ½ × ½ | 32 × 32 |
| 2 | 1 × 1 | 64 × 64 |
| 3 | 2 × 2 | 128 × 128 |
| 4 | 5 × 5 | REMAINING AREA |

Each layer is generally centered relative to the aircraft position as shown in FIG. 28 at the time of the update of RAM A. Each layer of the "wedding cake" has its own update boundary. For example, layer 1 of the RAM A includes an update boundary 448. As the aircraft passes through the update boundary 448, the RAM A is updated with new terrain data from the flash ROM 444 (FIG. 27) as will be discussed in more detail below.

Figures 29, 30:
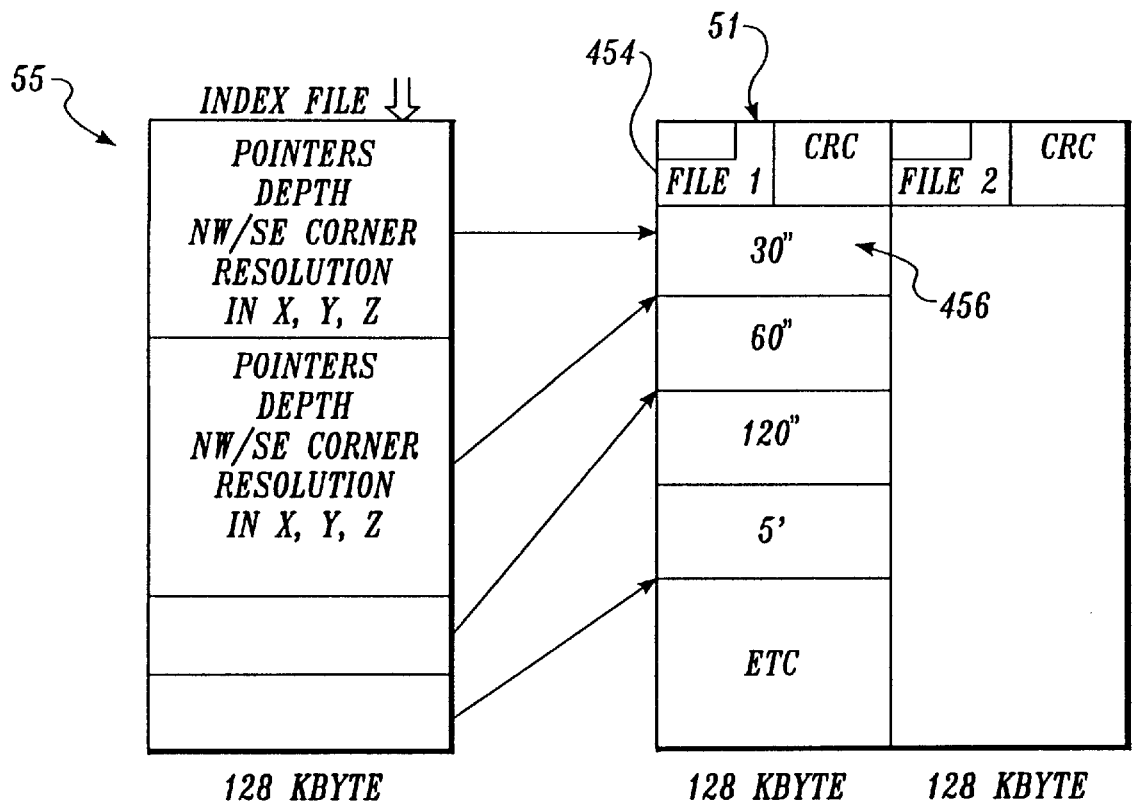
FIG. 29 is a diagram of the file format of the files in the terrain data base in accordance with the present invention.
FIG. 30 illustrates a terrain map of the terrain data base in accordance with the present invention illustrating the highest elevation in each of the cells within the map.

Because of the refresh rates required for the display 36, the terrain data may be stored in files alternative to the format illustrated in FIG. 4A. For example, the file format of the terrain data may include an index file or header 55, stored in one or more 128K byte storage blocks and a plurality of data files 51, as generally shown in FIG. 29.

As shown, each index file 55 may include pointers to specific data files 51, the length of the map file, as well as the position of one or more of the corner boundaries of the file 51, for example, northwest and southeast corners of each map file 51, which facilitates updates of the display 36 as a function of the current aircraft position. The index file 55 may contain information regarding the length of the map file 51, a start of file or altitude offset, the resolution of the map file 51, and whether and how the file 51 is compressed to enable use of various compression algorithms.

The data files 51 may include a file header 454 as well as data blocks 456 which, as shown, can be grouped according to resolution size. The file header 454 indicates various information about the file. The format of the header 454 may be structured as follows:

<MAJOR VERSION BYTE><MINOR VERSION BYTE><FILE STATUS BYTE><ATTRIB BYTE>
<FILE NAME (8 CHARACTERS)><EXTENSION (4 CHARACTERS)>
<FILE LENGTH LONGWORD>
<TIME STAMP LONGWORD>
<CRC LONGWORD>
<SPME LONGWORD>

The major and minor version bytes relate to the revision status of the data in the data files 51. The minor version is set as the inverse of the byte value of the major version such that a default erase will indicate a zero version. The file status byte 457 provides various information regarding the status of the file as discussed below, while the attribute byte is reserved. The file name, extension file length, and spare data are self-explanatory. The time stamp relates to the operational time of the system (i.e. length of time in use) while the CRC data relates to the data files 51.

The status byte may be used to provide the following information regarding the data blocks 456, for example, as set forth in TABLE 6 below.

TABLE 6

| FLAG BYTE VALUE | INFORMATION |
|---|---|
| FF | EMPTY |
| FE | DOWNLOADING |
| FO | VALID |
| EO | READY TO ERASE |
| . | RESERVED |
| . | RESERVED |
| 00 | RESERVED |

The EMPTY status (FF) is set by erasing the data blocks 456, while the DOWNLOADING status (FE) is set as part of the image. The VALID status (FO) is set when the file is loaded. Lastly, the READY TO ERASE (EO) is set by the file system for obsolete blocks. The file structure may also be as described in Appendix 1.

As indicated below, various corrections of the data files 51 may be required in areas near runways. FIG. 30 illustrates a portion of the terrain data base 24 around a particular airport, Boeing Field, with a resolution of, for example, ½×½ minute subcells 455, shown with a runway 456 drawn in. The elevations, as discussed above, are selected to be the highest elevations within the cells 455, rounded up to the next highest resolution increment, for example 100 feet. While such a system provides useful and conservative terrain data for use with the terrain data base 24, such a system in the vicinity of an airport can cause the elevations of the runway 456 to be too high or too low. For example, the elevation of the runway 456 at Boeing Field is known to be 17/15 feet; rounded off to zero (0) feet. FIG. 30 shows the elevation of runway 456 to be 200/300 feet, for example, by the averaging algorithm discussed above. Such errors in the runway elevation can degrade system performance, and, in particular, cause improper performance of the terrain advisory and terrain warning cut-off boundaries below 500 feet, for example, as illustrated in FIG. 22.

In order to solve this problem, the actual elevation of the runway 456, rounded to the nearest resolution, is used for cells 455 around a perimeter of the runway 456, as generally shown in FIG. 31. In particular, a first perimeter, illustrated by the dashed box 458, is selected to be about ±1 cell (i.e.  ½ minute) from the centerline of the runway 456. The elevations in all of the cells 455 intersected by the dashed box 458 are set to the actual runway elevation and rounded to the nearest resolution. For Boeing Field, the elevation for such cells is 0 feet.

Consideration is also given for a narrow approach and a wide approach. The dashed box 460 represents a wide approach while the dashed box 462 represents a narrow approach. The cells 464 and 466, intersected by the wide approach box 460, are set on the actual runway elevation, rounded to 0 feet. Inside the approach perimeter, as indicated by the arc 467, the elevation for the cells is selected to be either the runway elevation or the ΔH terrain floor (as discussed above). For example, if the corner of the cell 468, closest to the runway 456, is 1.386 nM from the runway 456, the ΔH terrain floor will be 86 feet; rounded to nearest 100 feet=100 feet. Thus, the elevation of cell 468 is selected as 100 feet.

FIG. 32 illustrates the differences between the elevations in selected cells 468, 470 and 472 before and after correction. Before correction, the elevation of cells 468, 470 and 472 was 300 feet. After correction, the elevation of cells 470 and 472 are corrected to the runway elevation and rounded to the nearest resolution (i.e. 0 feet). The cell 468 is corrected to the ΔH terrain floor elevation of 100 feet.

FIG. 33 illustrates another situation where the elevation of cells, due to the rounding-off method discussed above, can result in a situation where the cell elevations adjacent a runway, represented as a staircase 474, are below the runway elevation. The correction method, discussed above, can also be used to correct the various cells around the runway 456 up to the runway elevation in a manner as generally discussed above.

Figure 34:
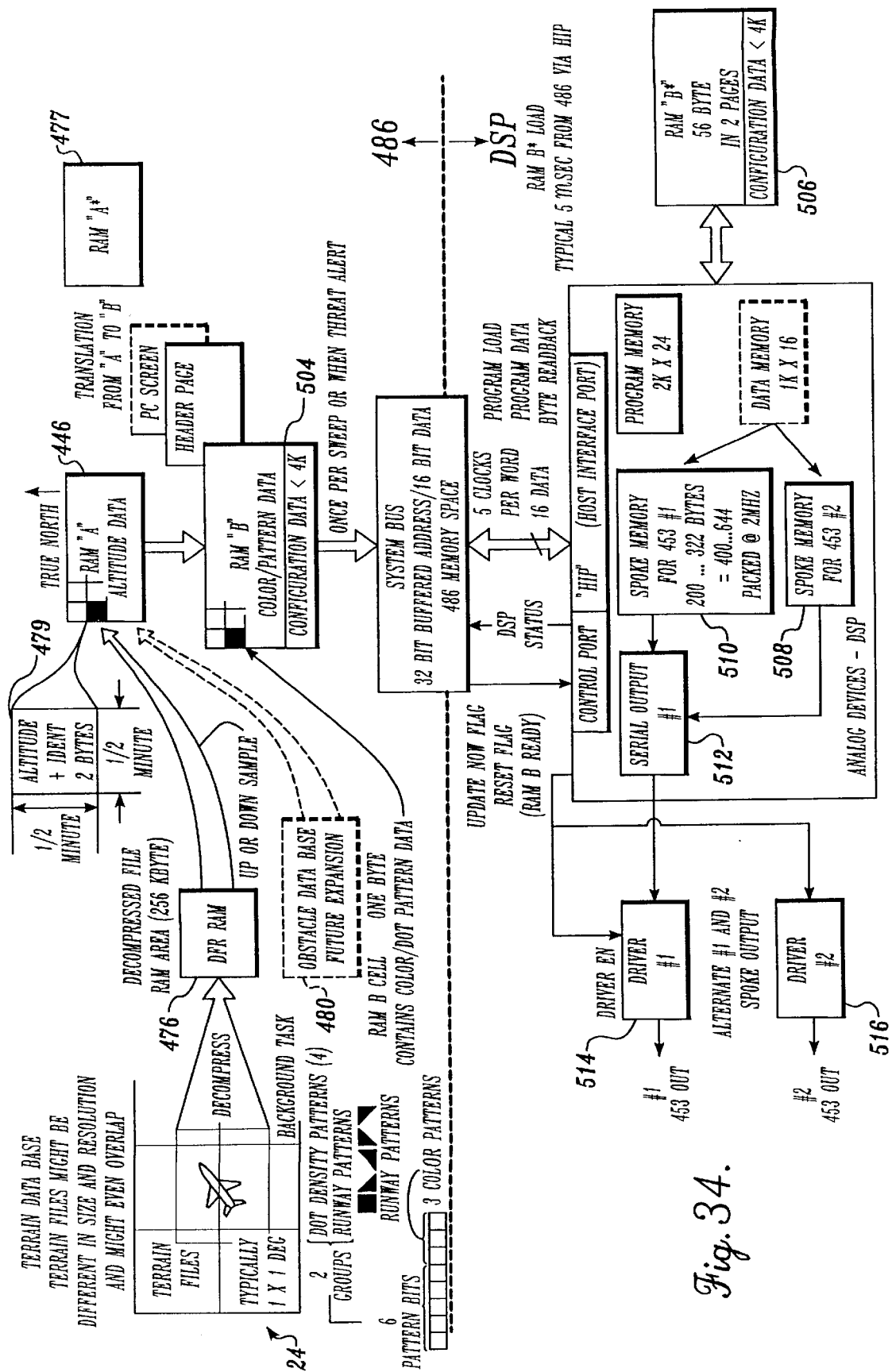
FIG. 34 is a block diagram of the display system in accordance with the present invention illustrating the memory configuration and the data flow.

FIG. 34 represents a simplified block diagram for implementation for the display system 400 in accordance with the present invention. The display system 400 may include a microprocessor, for example, an Intel type 80486, 25 MHz type microprocessor ("486") and an Analog Devices type digital signal processor (DSP). The DSP is primarily used for calculating the RHO/THETA conversions to off load the 486.

The display system 400 may have a normal mode and a cruise mode. In a normal mode, the display system 400 displays terrain out to, for example, 100 nautical miles, while in cruise mode out to about 320 nautical miles. In the cruise mode, it is contemplated that the background terrain display levels can be lowered by the pilot such that terrain, for example 10,000 feet or 20,000 feet below the aircraft, can be displayed. Alternatively, the display level could automatically be adjusted to the highest terrain within the selected display range; the value of this level set forth in amber, for example.

The 486 runs a "file picker" routine which searches the terrain data base 24 for terrain data covering the area relative to the current position of the aircraft. For example, in a normal mode, the file picker routine searches the terrain data base 24 for terrain data covering an area approximately 256×256 minutes relative to the current position of the aircraft. As indicated above, the terrain data base 24 includes index files 55 (FIGS. 4B and 29) which may include the northwest and southeast corners of each map file 51 in order to facilitate the search. A list of files covering the area is assembled and maintained.

As indicated above, the index file 55 also includes information as to whether and how the data files 51 are compressed. The files may be compressed/decompressed by a modified Hoffman code, such as PKZIP as manufactured by PKWARE, INC.

If the data files 51 are compressed, the files are decompressed in the background because of the relatively long decompression time and stored in a decompressed file RAM (DFR) 476, for example 256K bytes. The decompressed files are then transferred to RAM A, identified with the reference number 446. On power-up, one or two files around the aircraft are decompressed and displayed to allow immediate display of a limited range, relative to the position of the aircraft. As more terrain data files are decompressed, the additional range is displayed.

The RAM A may be configured in a plurality of cells 479 (FIG. 34), representative of a terrain area ½×½ minutes, with true north appearing at the top of RAM A as shown. Each cell 479 is two bytes wide and includes data regarding the highest altitude in the cell as well as the identity of each cell 479. As such, the RAM A is addressable by X and Y coordinates and thus represents a map with an altitude in each cell 479. The identity of the cell may be used to distinguish between terrain data, for example, from the terrain data base 24 and obstacle data. As discussed above, in some applications, an obstacle data base may be utilized.

As indicated above, the RAM A may be configured as a wedding cake with various layers, as generally shown in FIG. 28 with the top layer (i.e. layer 1) having the highest resolution (i.e. ½×½ minute cells). Terrain data is loaded into the RAM A such that the aircraft is roughly centered in the top layer, where the terrain advisory and warning detection algorithms are run. Once the aircraft moves outside the update boundary 448 (FIG. 28), the top layer of the RAM A is reloaded with terrain data with the aircraft centered. The lower layers may also be provided with update boundaries, which enable the lower layers to be updated independently and less frequently than the top layer.

Figure 34A:
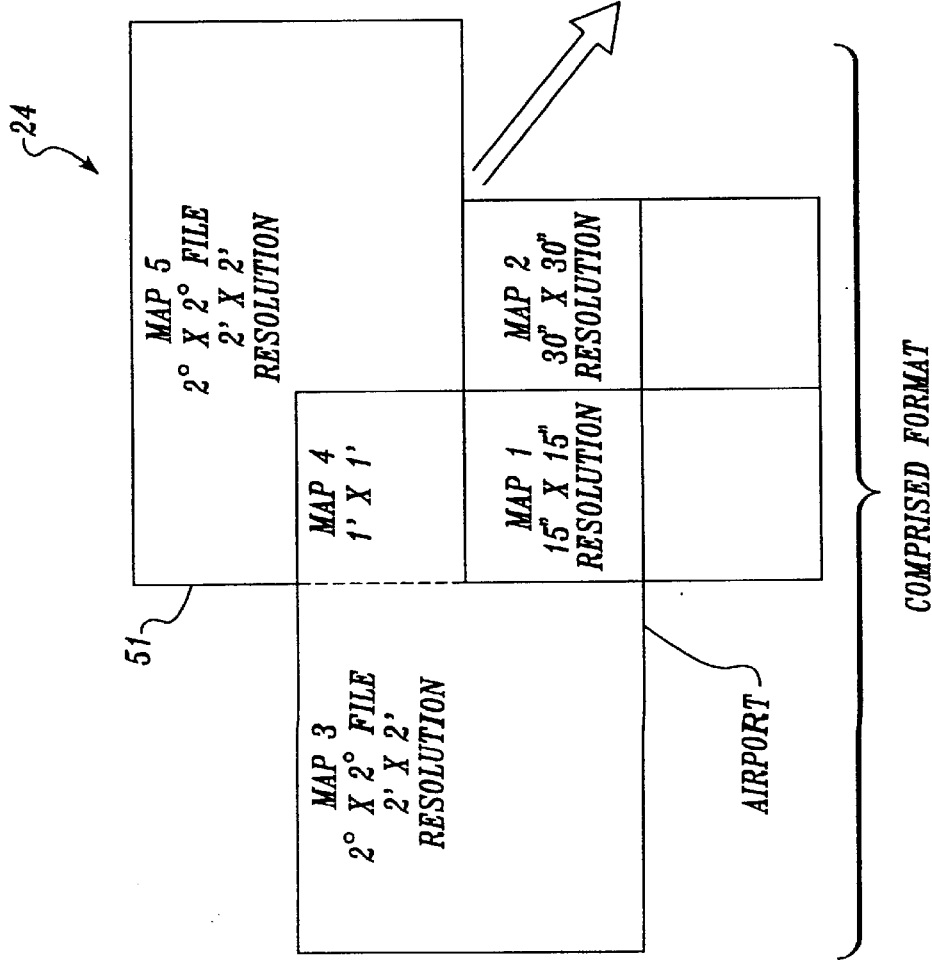
FIG. 34A is a block diagram of a configuration alternative to that shown in FIG. 34.

As discussed above and illustrated in FIG. 27, the flash ROM 444 for the terrain data base 24 may also be configured as a wedding cake as illustrated in FIG. 28. In such an implementation, the highest resolution is provided near the airports while the coarser resolution is provided away from the airports as generally shown in FIG. 27. For example, as illustrated in FIG. 34A, the terrain data base 24 may be configured with 1°×1°, 2°×2° or 10°×10° map files. Some of the map files may overlap, similar to a "wedding cake". As shown, the terrain maps closest to airports are provided with the highest resolution, for example 15×15 arc seconds. Maps further away from the airport may be provided with resolutions of, for example, 1×1 minute or 2×2 minutes while a coarse resolution (i.e. 2°×2° or 10°×10°) may be provided even further from the airport.

An upload routine may be used to upsample or downsample terrain or obstacle data into the RAM A from the DFR RAM 476 as shown in FIG. 34. Such a routine is well within the ordinary skill in the art. The top three layers (i.e. layers 1, 2 and 3) of the RAM A (FIG. 28) are updated from the map file source from the flash ROM 444 for the terrain data base 24 having the highest resolution, except for the 5×5 minute layer, which is updated only from a 5×5 minute file source to reduce processing time.

Alternatively, as shown in FIG. 34A, an additional RAM A*, identified with the reference numeral 477, may be provided and structured similar to the RAM A 446, forming a "ping-pong" memory arrangement. In this embodiment, one terrain data file 51 is decompressed one file at a time and loaded into the DFR RAM 476 and then upsampled to either the RAM A or RAM A*. For example, while the RAM A is being loaded with additional decompressed files, the terrain threat and display algorithms are executed from the RAM A*. Once the RAM A is updated, the RAM A is then used for the computations while the other RAM A* is updated with new data from the DFR RAM 476 to account for changes in the aircraft position.

The 5×5 minute resolution layer is primarily intended for use in a cruise mode to provide a look-ahead range of about 320 nM. As discussed above and illustrated in FIG. 29, each file includes an index file 55 which contains data relative to the resolution of the terrain data in a particular map file 51. Such information can be used to vary the resolution of the map files as a function of longitude and latitude position. For example, the latitude resolutions of the map files can be decreased at higher latitudes in a northward direction. Moreover, longitude resolution in the RAM A can be varied and provided with, for example, a one degree latitude hysteresis to prevent flipping back and forth as an aircraft cruises northwardly. Once the terrain data from the terrain data base 24 is loaded into the RAM A, the terrain advisory and warning algorithms ("detection algorithms") are run once per second as discussed below.

Figure 35:
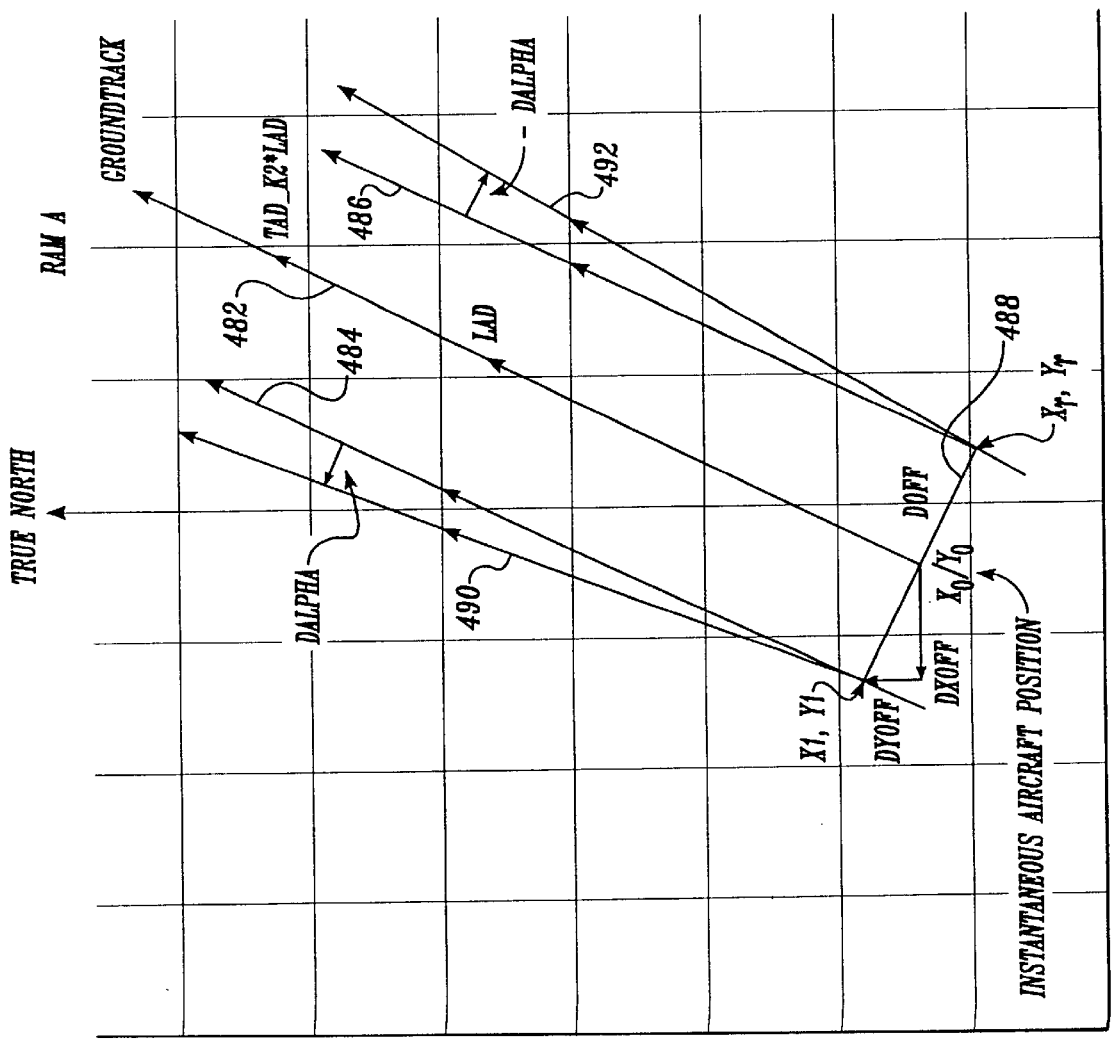
FIG. 35 is a diagram of a terrain map illustrating the determination of the look-ahead vector array.

The terrain threat algorithms discussed above are based on a single vector along the groundtrack. The single vector provides acceptable results because the relatively crude resolution of the terrain data base 24 is based upon the highest elevation per cell and the natural noisiness of the groundtrack angle and position information. However, the single vector approach does not take into account various errors, due to, for example, the terrain data base 24, GPS longitude and latitude errors as well as the published track angle accuracy. As such, the single vector along the groundtrack may be substituted with an array of vectors, as generally shown in FIG. 35, which takes such errors into account. In particular, the groundtrack vector is identified with the reference numeral 482 originating at the instantaneous aircraft position $X_0$, $Y_0$. A pair of vectors 484 and 486 are disposed at a configurable distance $D_{OFF}$, for example 0.2 nM along a segment 488, perpendicular to the vector 482 at points $X_1$, $Y_1$ and $X_r$, $Y_r$. A pair of outside vectors 490 and 492, originating at points $X_1$, $Y_1$ and $X_r$, $Y_r$, respectively, are directed at a configurable angle $D_{ALPHA}$, relative to the vectors 484 and 486. The configurable angle $D_{ALPHA}$ may be selected as 3 degrees, equivalent to the groundtrack accuracy of the GPS.

The coordinates $X_1$, $Y_1$ and $X_r$, $Y_r$ for the vectors 490 and 492, respectively, are determined. More particularly, the incremental X and Y vectors, $DX_{OFF}$ and $DY_{OFF}$, are determined as set forth in equations (25) and (26) as set forth below.

$$DX_{OFF} = \{D_{OFF}/COS(LAT)\} * COS(GROUNDTRACK), \quad (25)$$

where $D_{OFF}$ is a configurable distance between $X_0$, $Y_0$ and $X_1$, $Y_1$, for example 0.2 nm and the factor 1/COS(LAT) is used to convert $DX_{OFF}$ to nautical miles when $DX_{OFF}$, $DY_{OFF}$ is in minutes and $D_{OFF}$ is in nautical miles.

$$DY_{OFF} = D_{OFF} * SIN(GROUNDTRACK) \quad (26)$$

The coordinates $X_r$, $Y_r$ can be determined in a similar manner.

The threat detection algorithms are initiated by calculating the range increments DELTA $X_{NS}$ and DELTA $Y_{NS}$ along a north-south coordinate system along the groundtrack. Referring to FIG. 36, each spoke 426 has 512 size range bins as discussed above, or 256 double range bins. In order to convert from an X-Y coordinate system to the north-south coordinate system, the range increments DELTA $X_{NS}$, DELTA $Y_{NS}$ are determined in accordance with equations (27) and (28). (The term 1/COS (LATITUDE) is used to convert from arc minutes to nautical miles.)

DELTA $X_{NS}$=DETECTION STEP
SIZE*SIN(GROUNDTRACK)*1/COS(LATITUDE)  (27)

DELTA $Y_{NS}$=DETECTION STEP SIZE*COS
(GROUNDTRACK)  (28)

Figure 37:
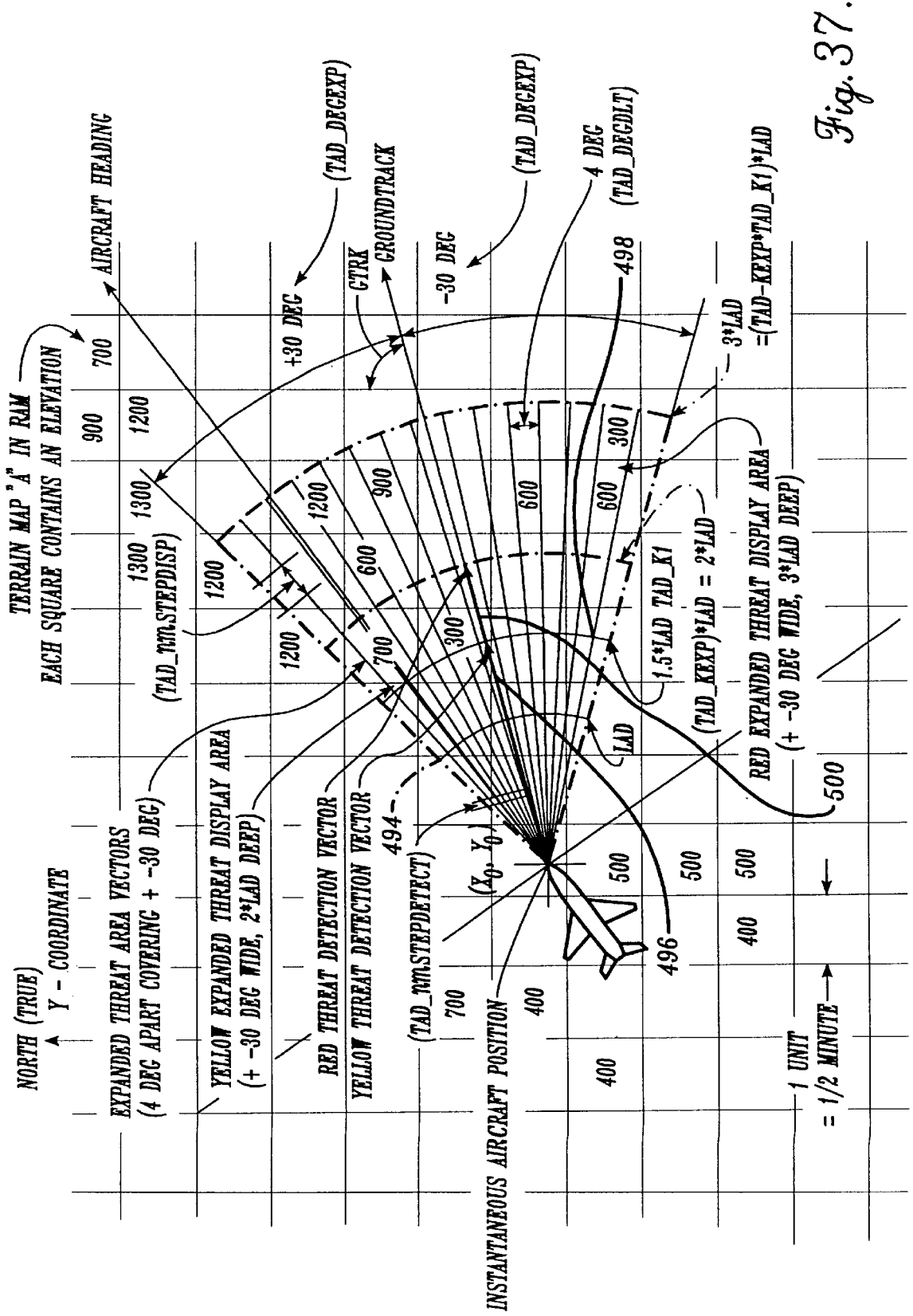
FIG. 37 is a terrain map illustrating the computation of the hazardous.

After the range increments DELTA $X_{NS}$ and DELTA $Y_{NS}$ are determined, the threat detection algorithm computation is initiated at the instantaneous position $X_0$, $Y_0$ of the aircraft (FIG. 37). The position is then incremented by the range increments DELTA $X_{NS}$ and DELTA $Y_{NS}$ and the range is incremented by a configurable step size, for example ⅛ unit, as discussed above. After the new coordinates are determined, the current terrain altitude at the new coordinate is determined. The terrain detection algorithms, as discussed above, are then computed for the current advisory LAD, as indicated by the arc 494, defining a yellow threat detection vector 496. In order to provide additional warning time for a terrain warning, the terrain warning indication can be computed out to a distance equal to 1.5*LAD, as indicated by the arc 498 to define a red threat detection vector 500. The above steps are repeated for the look-ahead vector arrays 490 and 492 (FIG. 35). The entire computation is done at a rate of once per second.

Whenever the threat detection algorithm detects terrain along the look-ahead vector arrays 490 and 492 (FIG. 35), the offending terrain is painted in an expanded cone around the groundtrack as shown in FIG. 37. In particular, the expanded cone includes a plurality of vectors, spaced, for example, 4° apart (configurable value), for ±90° (configurable value) on each side of the groundtrack. For an expanded terrain warning, the cone may be expanded out distances, for example as set forth in TABLE 7 below.

TABLE 7

(For an expansion factor of 2)

| | NORMAL | | EXPANDED | |
|---|---|---|---|---|
| TYPE OF THREAT | LOOK-AHEAD/ LOOK-DOWN | LOOK-UP | LOOK-AHEAD/ LOOK-DOWN | LOOK-UP |
| ADVISORY | 1.0 * LAD | 2.0 * LAD | 2.0 * LAD | 4.0 * LAD |
| WARNING | 0.5 * LAD | 1.5 * LAD | 1.0 * LAD | 3.0 * LAD |

The terrain threat is painted on the display 36 by calculating the starting vector angle DISPA as set forth in equation (29) when a terrain threat along the groundtrack has been detected.

DISPA=GROUNDTRACK+30 degrees  (29)

The range increments are then determined as set forth in equations (30) and (31).

DELTA $X_{NS}$=DISPLAY STEP SIZE*SIN(DISPA)*1/COS(LATITUDE)  (30)

DELTA $Y_{NS}$=DISPLAY STEP SIZE*COS(DISPA),  (31)

where the display step size is a configurable constant, for example ½ unit.

After the range increments DELTA $X_{NS}$ and DELTA $Y_{NS}$ are determined, the instantaneous position of the aircraft $X_0$, $Y_0$ is incremented by the same and the range is incremented by the step size. The altitude is then determined for the current position on the terrain map. Subsequently, the threat detection algorithms are run for the distances as discussed above. Should a threat be detected, a color is loaded into a RAM B, identified with the reference numeral 504 (FIG. 34). At the end of the yellow and red threat vectors 496 and 500, the vector angle DISPA is incremented by 4 degrees with the above steps being repeated until all vectors are done.

In addition to the terrain detection and display algorithms, a background terrain algorithm is also executed relative to the terrain data in RAM A (FIG. 34) once every screen update, about 4 seconds. The background terrain algorithm simply compares the current altitude of the aircraft with the various terrain altitude data in the RAM A. Any of the dot patterns 432, 434 and 436 (FIG. 25) resulting from the computation are stored in the RAM B (FIG. 34) organized in a wedding-cake configuration (FIG. 28), similar to the RAM A (FIG. 34). In addition, the RAM B is organized in single byte cells containing the color/dot pattern as discussed above. The closest runway may also be stored in the RAM B as either a circular or square pattern in, for example, a green color.

The color/dot pattern in the RAM B (FIG. 34) is transferred to the DSP memory RAM B*, identified with the reference numeral 506, once per screen update (i.e. 4 sec) and synchronized to the DSP screen painting period. If a threat is detected as discussed above, a new RAM B image is transferred to the DSP RAM B* 206 immediately. The image transfer time typically fits between two spokes. If not, the DSP will send an old spoke stored in its spoke memory 508, 510 twice.

The DSP then performs the RHO/THETA conversion on the data in RAM B* 506 using the updated aircraft position, selected range and heading data from the 486, as discussed below. Changes in the selected range are implemented on the fly (i.e. the next spoke) without restarting the sweep.

As discussed above, the ARINC 708/453 weather radar format consists of 512 spokes covering a configurable scan range of typically ±90 degrees and a range selected, for example, on a weather data control panel. For ARINC systems, each spoke is calculated twice, once for the left selected range and once for the right selected range. The spokes are then transmitted by way of a serial port 512, interleaved left spoke and right spoke to the bus switch 406 (FIG. 23) by way of a pair of drivers 514 and 516 (FIG. 34).

The resolution of the scan conversion is 256 range bins; each range bin actually being a double range bin per the ARINC 708/453 standard format. Such a resolution is sufficient for the dot patterns 518 illustrated in FIGS. 25 and 26.

Figure 38:
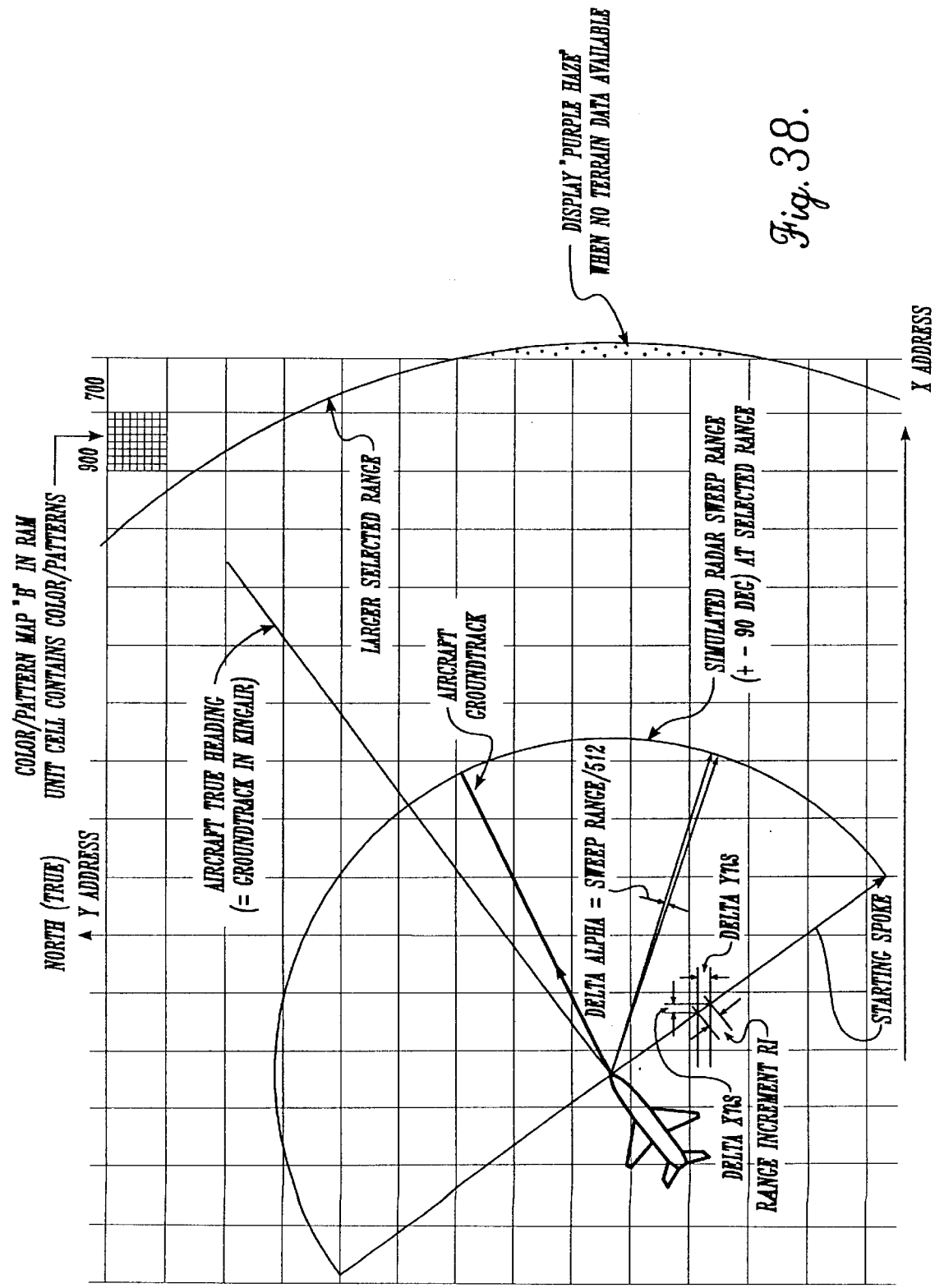
FIG. 38 is a diagram of a terrain map superimposed on a display screen illustrating the sweep range and the determination of the incremental range increments.

The RHO/THETA conversion is best understood with reference to FIG. 38. In particular, once per sweep (i.e. every 4 seconds) the range increment R1 is determined. The range increment is the selected range divided by 256. After the range increment is determined, the starting spoke angle is determined (i.e., the aircraft true heading plus 90 degrees). Lastly, the incremental spoke angle DELTA ALPHA is determined. The incremental spoke angle DELTA ALPHA is the sweep range divided by 512; the total number of spokes per sweep.

Once per spoke (i.e. 512 times per 4 second sweep), the incremental range coordinates DELTA $X_{ns}$, DELTA $Y_{ns}$ are computed and the spoke angle is incremented by DELTA ALPHA, as discussed above. The incremental range increment coordinates $X_{ns}$ and $Y_{ns}$ are computed in accordance with equations (32) and (33), respectively.

DELTA $X_{ns}$=RI*SIN(SPOKE ANGLE)*1/COS(LATITUDE)  (32)

DELTA $Y_{ns}$=RI*COS(SPOKE ANGLE)  (33)

Once per range increment (i.e. 512×256 times per 4 second sweep), the instantaneous aircraft position $X_0$, $Y_0$ is incremented by DELTA $X_{ns}$ and DELTA $Y_{ns}$. The color/pattern for the new position is looked up and output to the display 36. These steps are repeated for the rest of the spoke.

With the use of the DSP, two computations can be done in parallel. In particular, the color/pattern of each range bin including the conversion of the longitude to nautical miles (i.e. multiplication by 1/COS (LAT)). With reference to FIG. 38, this computation is performed relative to the true north map coordinate system with the aircraft true heading pointing up and the spoke angles referenced to it. The second computation addresses each display indicator pixel in order to paint the required dot pattern, relative to the display screen coordinate system.

The generation of dot pattern is illustrated in FIGS. 39–42. In general, the scan conversion is simulated by overlaying each RHO/THETA range bin over a calculated indicator pixel map which includes corrections for display aspect ratio using fractal 8×8 dot patterns.

Figure 40:
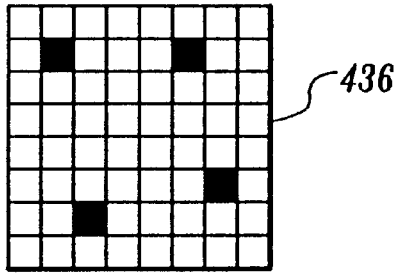
FIG. 40 is a diagram of the different fractal patterns used to provide the variable density display of non-hazardous display indications.
Figure 40:
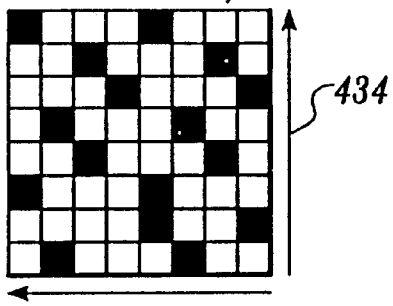
Figure 40:
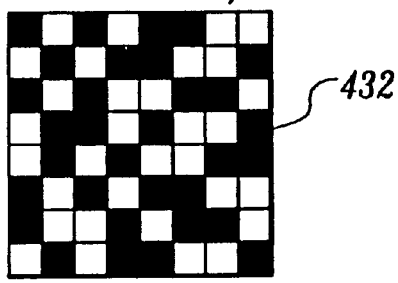

The fractal patterns corresponding to the variable density dot patterns 432, 434 and 436 (FIG. 25) are illustrated in FIG. 40. The fractal pattern size is selected to be 8×8 pixels. The densest pattern 432 includes ½, or 32, of the 64 pixels filled. In the medium density pattern 434, 16, or ¼, of the pixels are filled. In the least dense pattern 4 of 64, or 1/16, of the pixels are filled.

Figure 39:
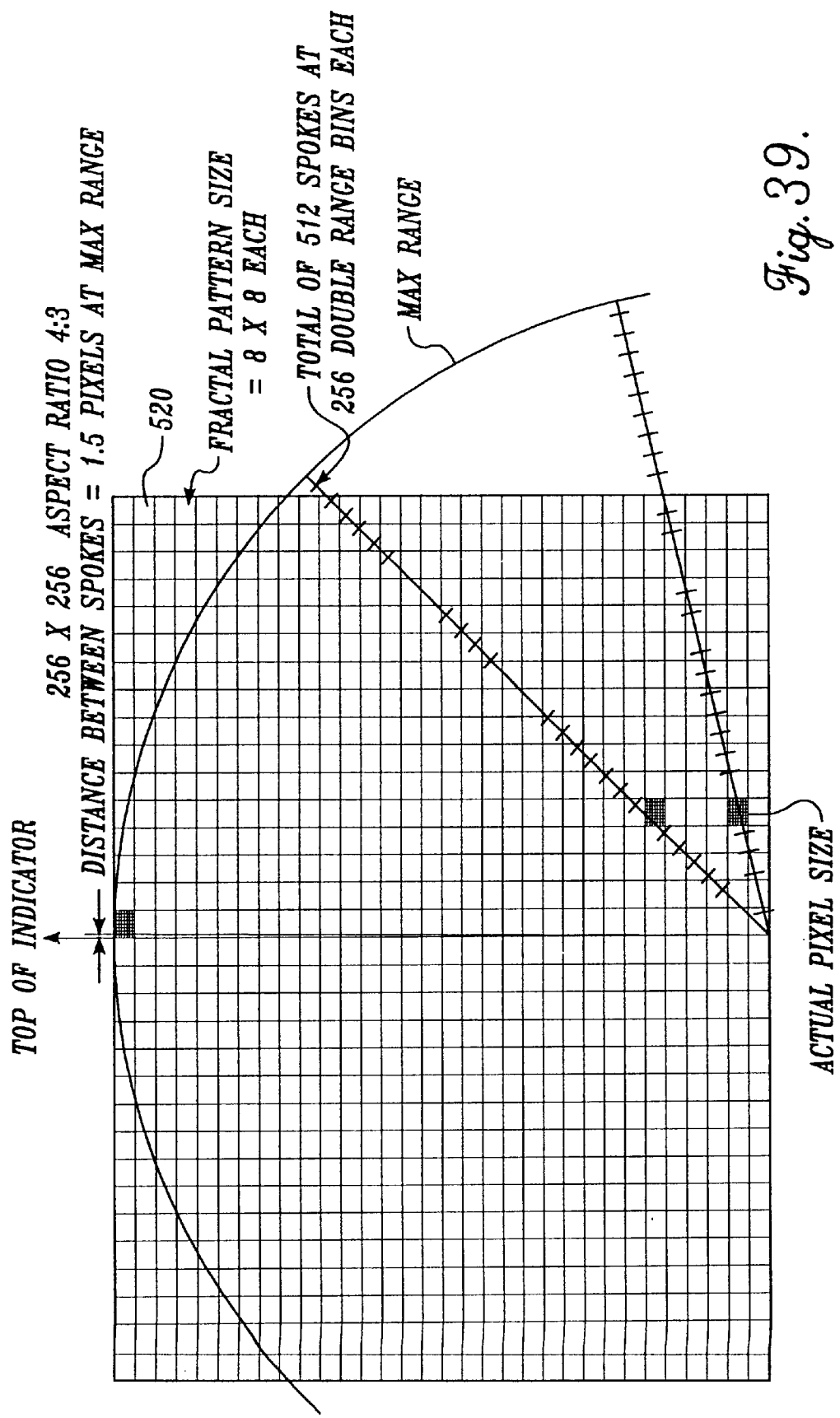
FIG. 39 is a diagram of a pixel map of the display.

Referring to FIG. 39, the display screen is divided into a pixel map, consisting of, for example, 256×256 pixels 520. As mentioned above, the 8×8 fractal patterns are overlaid onto the pixel map to provide the variable density dot patterns 432, 434 and 436 illustrated in FIG. 25.

Figure 41:
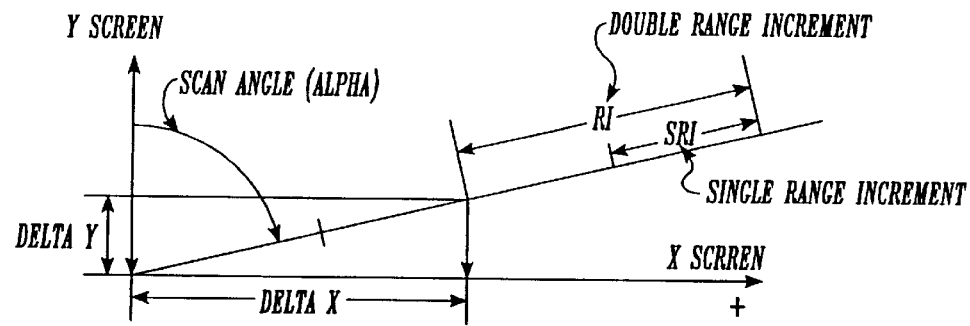
FIG. 41 is a diagram illustrating the determination of the X and Y increments of the display screen.
Figure 42:
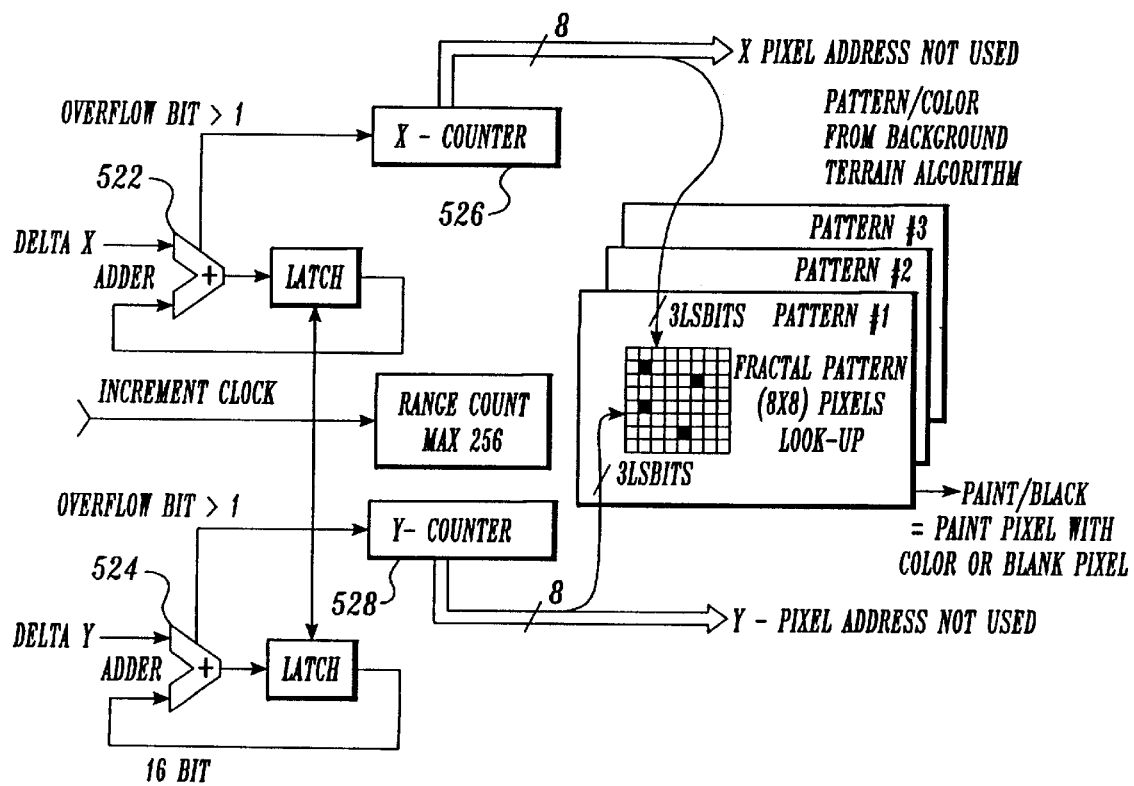
FIG. 42 is a diagram of the method for superimposing the fractal patterns on the displayed pixel map.
Figure 43:
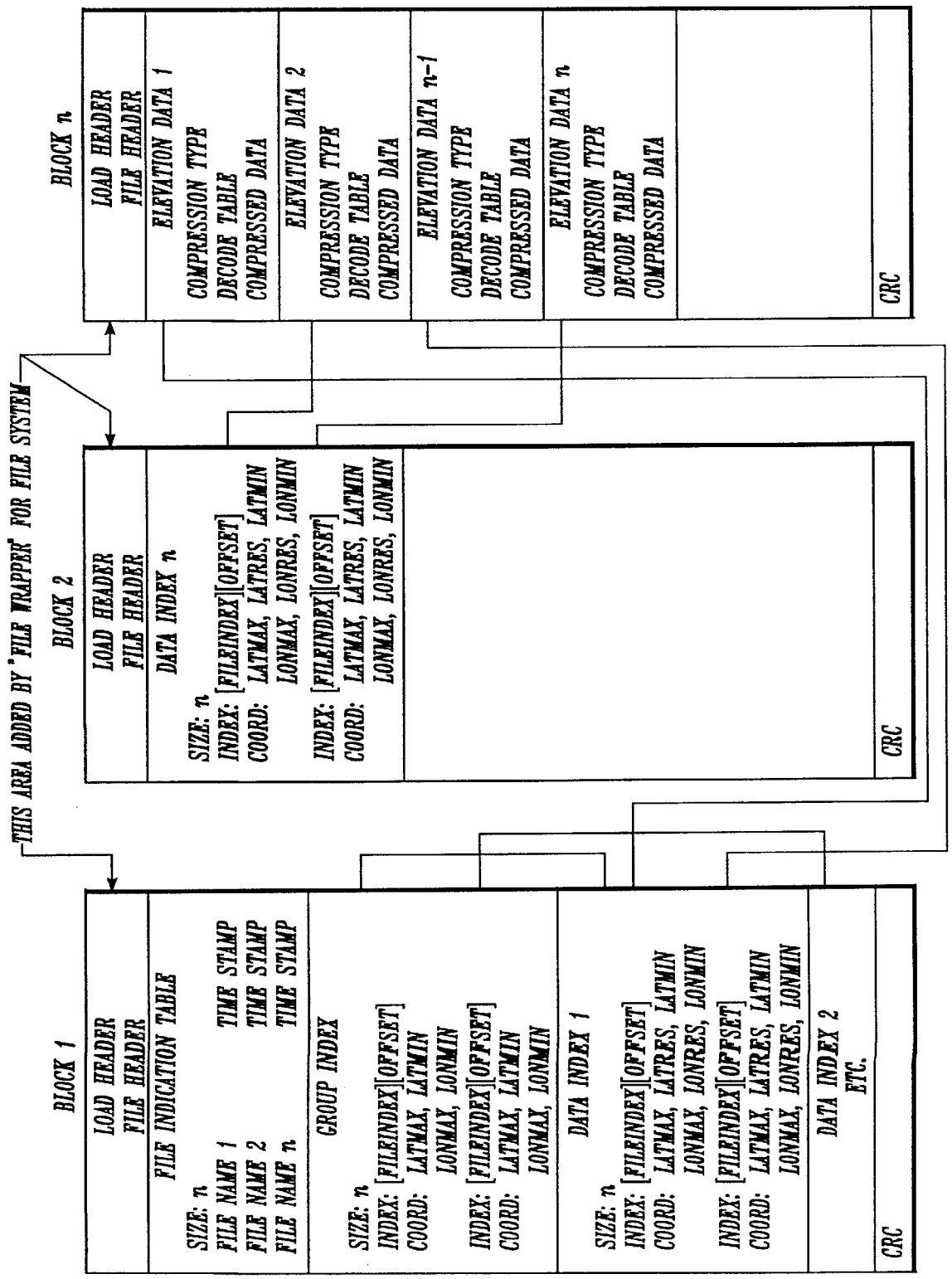
FIG. 43 is an illustration of a terrain data format in accordance with the present invention.

The computation of the dot patterns is best understood with reference to FIGS. 39, 41 and 42. Using an X-Y coordinate system, each spoke is determined at the bottom center of the display 36. For a 256×256 pixel display, the starting point corresponds to 120, 0. Next, the incremental X and Y coordinates relative to the scan angle ALPHA are 30 determined according to equations (34) and (35).

$$DELTA\ X = RI*SIN(ALPHA) \quad (34)$$

$$DELTA\ Y = RI*COS(ALPHA), \quad (35)$$

where RI=a double range increment and ALPHA=the scan angle. These increments are added to the starting point 128, 0. After each increment, the selected fractal pattern is looked up in the RAM B * to determine whether to send the last range increment as either block or colored.

Referring to FIG. 42, the increments DELTA X and DELTA Y are applied to a pair of adders 522 and 524, which, in turn, are applied to an X-counter 526 and a Y-counter 528. As discussed above, the X counter 526 starts at 128 and counts up if DELTA X>0. If DELTA X<0, the X-counter counts down, indicating a pixel on the left (FIG. 39) of the starting position. Since the starting pixel is at the bottom of the display, the Y-counter 528 starts at zero and always counts up. A range counter 528 counts up to 256; the maximum number of double range bins. The range counter 528 is driven by an increment clock such that the pattern/color is painted once per range increment. The output indicates whether the pixel is to be painted left black.

As discussed above, the background terrain algorithm determines the particular fractal pattern to be used. This data is applied to the DSP to enable the pixels on the pixel map (FIG. 29) to be painted or left blank. In particular, the three least significant bits from the X counter 526 and Y counter 528 are used to select the fractal pattern as shown.

The scan conversion simulation is performed in parallel with the RHO/THETA conversion which determines the color/dot pattern of the range bin to be transmitted. The color/dot pattern provided by the RHO/THETA conversion is then overlaid with the fractal dot pattern to determine whether the range bin color should be black or painted to provide the proper dot pattern on the display.

Obviously, many modifications and variations of the present invention are possible in light of the above teachings. Thus, it is to be understood that, within the scope of the appended claims, the invention may be practiced otherwise than as specifically described above.

APPENDIX 1

TERRAIN DATA STRUCTURE

The terrain data format is made up of four distinct parts, the file indirection table, the group index, the data index, and the compressed elevation data itself. See FIG. 43.

Notes: All multi-byte numbers are stored Little Endian (LSB . . . MSB).

File Indirection Table

A file indirection table is provided at the top of the index file block. The file index field is each data index is used to index into this table to get the ASCII filename for file system usage. This filename is then mapped be the file system to the correct 128 kbyte physical memory block. A time stamp is provided for each file, this can be used to match to the time stamp in the file header for each file. This helps check for consistency between the index files and the data files.

SIZE: 16-bits—unsigned

Number of filenames defined:

Repeated for each filename

FILENAME: 16-bytes—ASCII

ASCII filename with the extension included

<Drive>:<File 8>.<Ext 3>

TIME STAMP: 32 bits—unsigned

The number of seconds since Jan. 1, 1980 (DOS's time base).

Group Index

The group index is used to reduce the number of data index's which must be searched to find the area of interest. The group indexes are built by dividing the earth into TBD bands or geographic areas, current thinking is 10 degrees bands. These bands need not be of equal size. The group index points to the corresponding data index block to use for this area. The area covered by the group must be a rectangle. Note: the group index and data index occupy the same file.

Definitions:

SIZE: 16-bits—unsigned

Number of groups

The following is repeated for each group defined:

INDEX:

| 32-bits - unsigned | |
| --- | --- |
| 12 - bits | 20 - bits |
| File Index | offset |
| File Index: | Always 0 for group index |
| offset: | offset in bytes to start of | index file for this group

LAT MAX: 24-bits—signed

NW corner latitude

Scaling: LSB=180/2^23

Sign: (+)=North, (−)=South

LAT MIN: 24-bits—signed

SE corner latitude
  Scaling: LSB=180/2^23
  Sign: (+)=North, (−)=South
LON MIN: 24-bits—signed
  NW corner longitude
  Scaling: LSB=180/2^23
  Sign: (+)=East, (−)=West
LON MAX: 24-bits—signed
  SE corner longitude
  Scaling: LSB=180/2^23
  Sign: (+)=East, (−)=West
Memory Usage: 16 bytes per group
  Assume 60 groups worst case=9600 bytes
Data Index
  The data index contains information defining the coverage, resolution and storage location of each individual terrain data file. The data indexes are grouped together per the group index defined above (i.e. group 2's data indexes immediately follow group 1's data indexes).
Definitions:
SIZE: 16-bits—unsigned
  Number of index's
The following is repeated for each index defined:

INDEX:

| 32-bits - unsigned | |
| --- | --- |
| 12 - bits | 20 - bits |
| File Index | offset |
| File Index: | Filename index for data |
| offset: | offset in bytes to start of | index file for this group
LAT MAX: 24-bits—signed
  NW corner latitude
  Scaling: LSB=180/2^23
  Sign: (+)=North, (−)=South
LAT RES: 8-bits—unsigned
  Number of rows per 1 degree
LAT MIN: 24-bits—signed
  SE corner latitude
  Scaling: LSB=180/2^23
LON MIN: 24-bits—signed
  NW corner longitude
  Scaling: LSB=180/2^23
  Sign: (+)=East, (−)=West
LON RES: 8-bits—unsigned
  Number of columns per 1 degree
LON MAX: 24-bits—signed
  SE corner longitude
  Scaling: LSB=180/2^23
Memory Usage: 18 bytes index (terrain file)
  Assume 8000 files=144 k-bytes
Data
  The following defines the format for the actual elevation data. The index files above are used to locate the desired elevation file, and also contain information on the location, resolution etc.
  Note: for all data types below, the return elevationvalues at 16 bit singed values.

Figure 44:
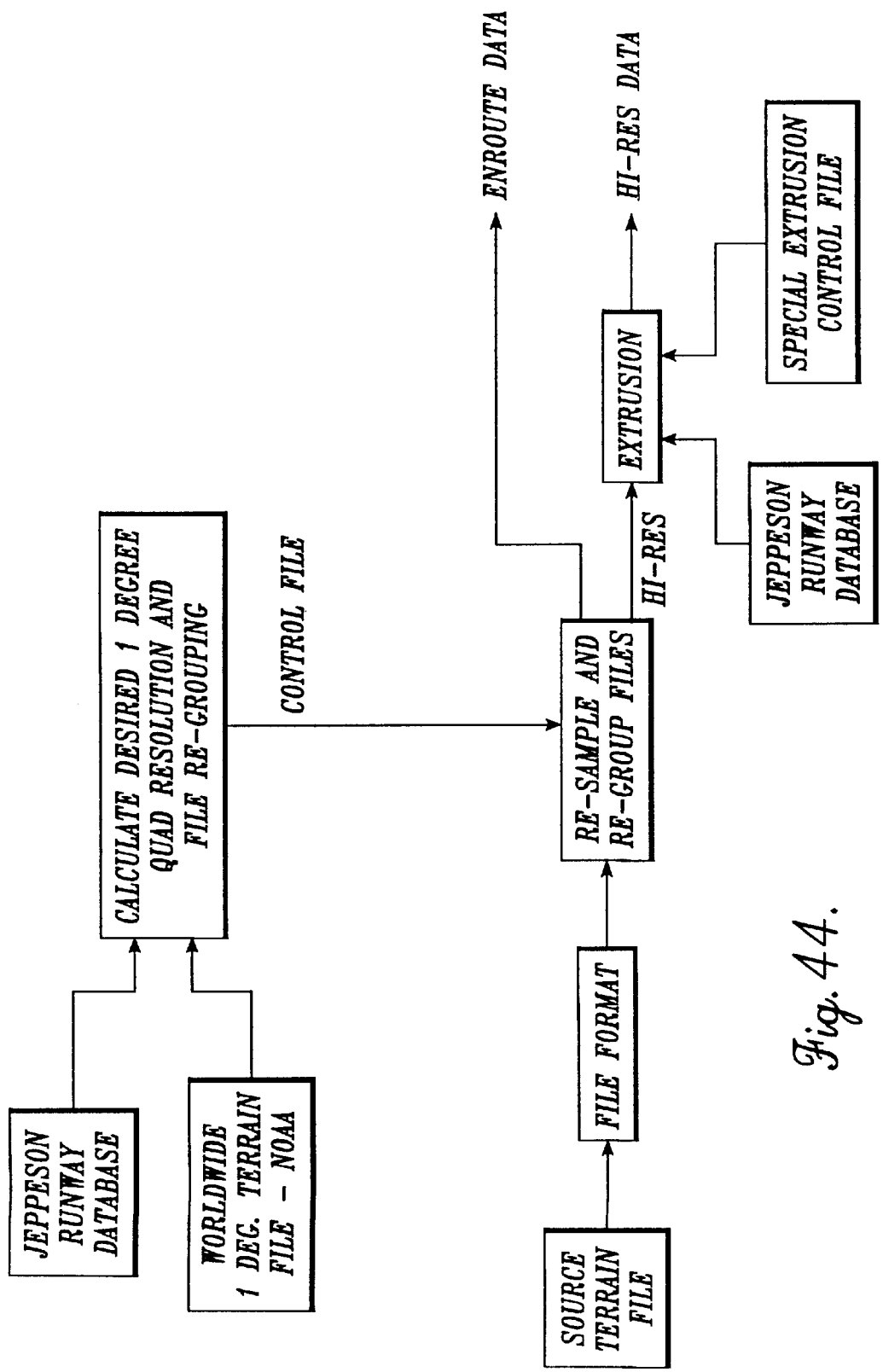
FIG. 44 is illustrative of steps to build the Terrain database from the original data in accordance with the present invention.
Figure 45:
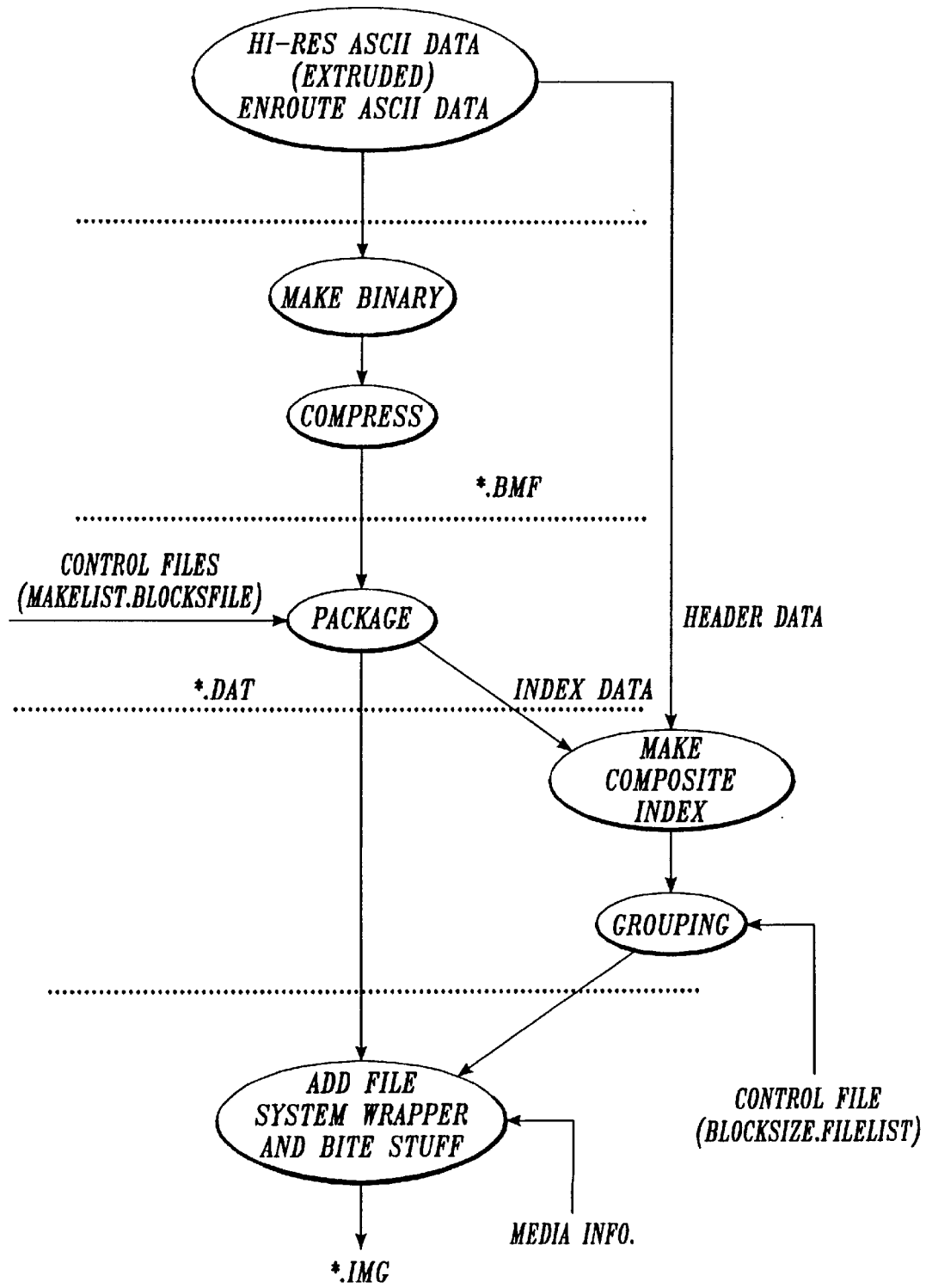
FIG. 45 is illustrative of steps to build the Terrain database from the original data in accordance with the present invention.

First value is always compression type as defined below:
COMPRESSION TYPE: 8 bits—unsigned
  Compression:
    0=no compression
    1=HUFFCODE—type 1
    2=HUFFCODE—type 2 (currently not used)
    3=Run length (currently not used)
    4=water or constant elevation
  For type 0, no compression, the uncompressed elevation values are stored directly.
  The following definition is for the HUFFCODE compressed data format:
  The top of the data contains the decode tables needed to uncompress the terrain data.
Note: Decompression needs the Number of X and Y values of decoded file (from index file).
Decode tables:
FIRSTCODE SIZE: 1 byte—unsigned
  Size in bytes of firstcode and symbol pointer tables (max 32 bytes)
FIRSTCODE TAB: n bytes—unsigned
  Firstcode table
SYMBOL POINTER TABLE: n words—unsigned
  Used with Firstcode table to index into symbol table.
SYMBOL SIZE: 1 word—unsigned
  Size in bytes of symbol table (max 256 words)
SYMBOL TAB: n words—signed
  Symbol table. Contains decoded symbol
FIRSTVALUE: 1 word—signed
  First elevation value. Used by linear predictor
Note: typical words decode table size is less than 150 bytes.
ELEVATIONS: Compressed elevation values in binary
  Note: padded to align on byte boundary currently.
For Compression type 4, (water/same elevation value), only 3 bytes are needed. The compression type byte defined above, and the 16 bit elevation value. This is used for files that contain only one elevation value. This will typically be used for water and "no-elevation" areas.
Build System
  FIGS. 44 and 45 show a preliminary look at the steps to build the Terrain database from the original source data.
Some key points:
1. Currently basic input file is 1 degree at 30 arc-seconds. This matches NOAA data. System should be built to handle any filesize.
2. Build system uses a control file automatically generated from runway database and a NOAA provided worldwide 1 degree terrain file. Control file contains a list of every 1 degree quad which is needed (i.e. on land), and what the desired resolution of that 1 degree file should be. Resolution is determined by proximity to an airport and the maximum elevation value of that one degree file. 1 of 3 resolutions are currently output, 30, 60, and 120 arc-seconds. In addition, the control file will indicate which 1 degree quads can be combined into one file. This is done for lower resolution quads in an attempt to keep the filesizes even and reduce the number of files.
3. Enroute data is at 5 minute resolution. Enroute data is separate from hi-resolution data above (overlaps), and is grouped in 10 degree by 10 degree blocks.
4. All files have the runway extrusion algorithm run on them. Runway extrusion should be run at the resolution that the data will be used in the system, it does not need to be run on the enroute data.
5. Some files will need a special extrusion run on them. This will be defined in a separate control file.

Grouping and packaging control files are needed to ensure that the build system groups the files into the correct structure.

Notes on "Terrain Data Embedded Format"

Maps are read from the file system, decompressed, and then used to update "RAM A" as the aircraft moves across it. Due to the slow speed of the decompression, two RAM A's are used. The detection and display algorithm uses one RAM A while the file picker updates the other RAM A with the latest maps. After the file picker has updated its RAM A, the RAM's are swapped and the process starts over.

The file picker process starts by the TAD asking the file system to open a file with a known, fixed name ("TERRAIN.IDX"?). This file contains the file indirection table, the group index table, and the data index tables. The TAD then periodically scans the group index table to find map groups that cover the general vicinity of the aircraft. This scan is done once for each source set of maps (currently two: hi-res and en-route). This step quickly reduces the number of maps that need to be considered for decompression from several thousand down to a few hundred. It identifies candidate groups by comparing the group bounding box stored in the group index table entry against the aircraft's current position. The number of group index table entries is stored at the top of the table, and all the entries immediately follow.

When a candidate group is found, the TAD uses the <fileindex> in the group index table entry to locate the file containing the data index tables. If the number is zero (the usual case), it indicates that the data is in the main index file (the one we are already reading). A future option would be to make the number non-zero. It would then identify a secondary index file named in the file indirection table. Once the file containing the data index table is opened, the TAD seeks to the <offset> in the group index table entry and starts reading the data index table for that group.

Each data index table begins with its number of entries. The TAD scans each of the data index table entries looking for any of the maps needed for the current aircraft position.

If a data index table entry is found to describe one of the maps we need, the TAD uses the <fileindex> to get the name of the map package file from the file indirection table. A map package file is a concatenation of a couple hundred compressed maps. From there it reads the compression type and calls the correct decompression algorithm to decompress the file. The decompressed data is then up-sampled or down-sampled into the appropriate tiers of RAM A. When up-sampling (filing higher resolution tiers with lower resolution data), the highest resolution data is used. To support this TAD must keep track of the current resolution used to fill each cell of RAM A. For down-sampling the highest elevation is always used. The enroute tier of RAM A is always filled with only enroute data. When all map files within the aircraft's area have been processed RAM A is released.

Terrain Information System

According to invention, a terrain information system or "Peaks" mode is available to provide a contoured display of terrain below the aircraft. The display provides the flight crew with a means of assessing the potential terrain conflicts which might occur if a rapid descent is initiated from the aircraft's normal flight path. For example, a loss of cabin pressure may require the crew to initiate an emergency decent and it would be very useful if the crew had a map of the terrain below the aircraft. This would be particularly important when the aircraft is traversing mountainous terrain. Since the terrain display 402 of the terrain advisory and warning system, as described above, normally does not display terrain more than 2000 feet below the aircraft, this system would generally not be available for planning a rapid decent from a relatively high altitude. Thus, the invention provides a system whereby a pilot can select a display of the terrain below and ahead of the aircraft regardless of the aircraft's current altitude. In another embodiment of the invention, the Peaks mode can be implemented such that this mode is the normal or default display when the terrain advisory and warning system is not displayed.

Figure 46:
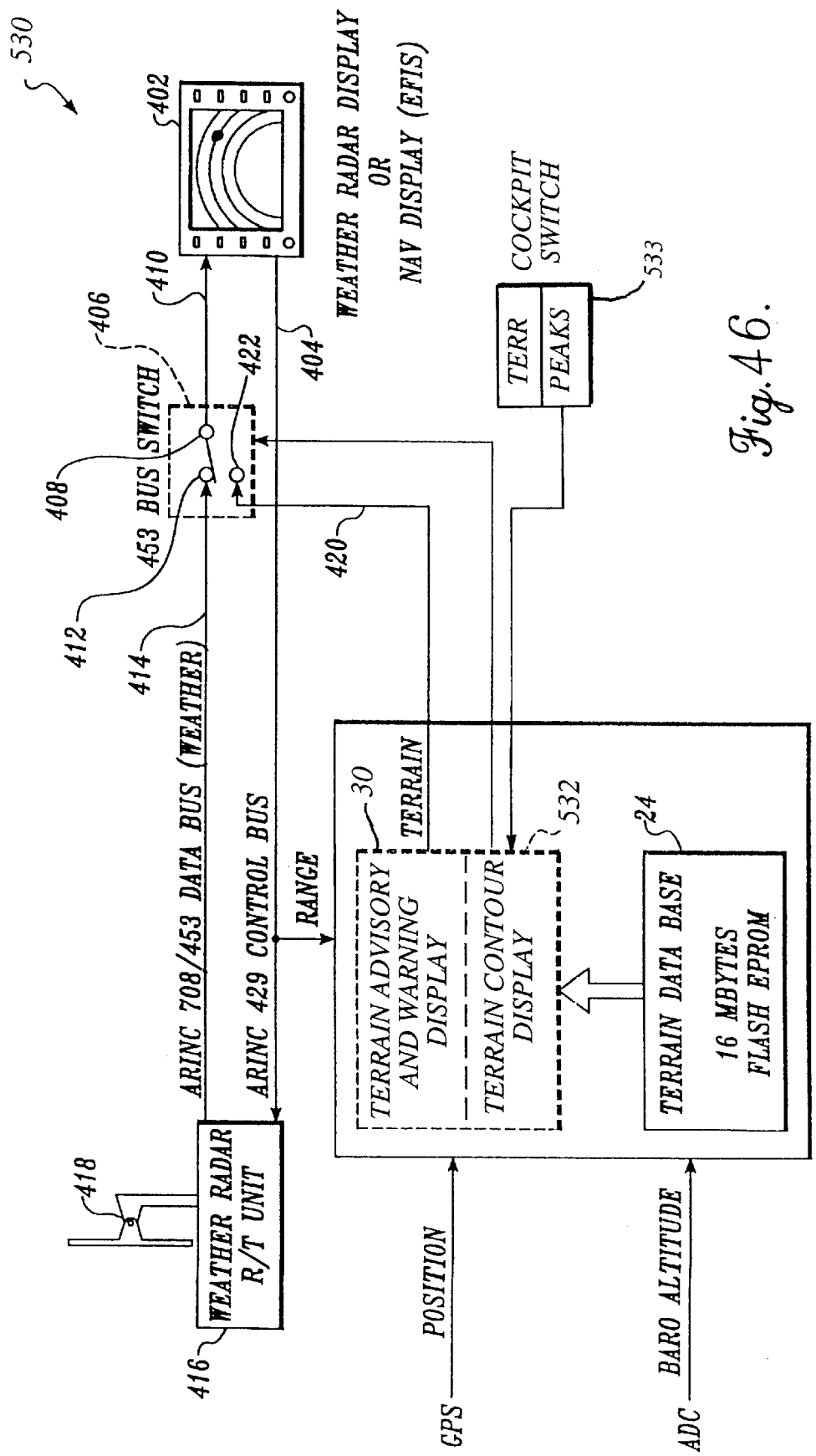
FIG. 46 is a block diagram of a combined terrain advisory and warning system and a terrain information system according to the invention.

FIG. 46 provides in block diagram form an illustration of the major components of the terrain information system as indicated by the reference numeral 530. The embodiment of the terrain information system 530 shown in FIG. 46 is an enhanced version of the terrain advisory and warning display system 400 as described above in connection with FIGS. 1A, 1B and 23. A block 532 represents the logic for both the terrain warning LOOK-AHEAD warning generator 30 of FIG. 1A and the terrain information system 530.

One method of selecting the Peaks mode is to provide a cockpit switch 533 in order to permit the crew to manually select a depiction of the contours of the terrain below the aircraft on the display 402. In one embodiment of the switch 533, one push would select the terrain advisory and warning display and a second push would select the Peaks mode. A third push would deselect both modes. In addition or alternatively, as indicated above, the peaks mode can also be selected automatically such that it is the default display on the display 402.

The preferred embodiment provides for the automatic switching from the Peaks mode to the terrain advisory and warning mode. For example in the situation where aircraft approaches close enough to the terrain to generate the terrain advisory or warning while in the Peaks mode, the terrain warning generator 30 will automatically switch the display 402 to the appropriate terrain advisory or warning.

The terrain information system 530 operates by scanning the terrain database 24 in the region which is defined by the range selection of the terrain display 402. The terrain display algorithm, which is described in detail in connection with FIG. 47 below, locates the highest and the lowest points of the terrain within the range of the scan and, using these values as bounds, divides the intermediate terrain elevations into n layers or terrain contours. In the preferred embodiment of the invention, there will normally be up to six layers (0–5) displayed on the display 402. These layers are depicted on the display 402 as shown in Table 1 below.

TABLE 1

| LAYER | COLOR Terrain BELOW Aircraft Altitude | COLOR Terrain ABOVE Aircraft altitude | INTENSITY |
| --- | --- | --- | --- |
| 0 (Lowest) | Black | Yellow | No Display |
| 1 | Green | Yellow | 12.5% |
| 2 | Green | Yellow | 25% |
| 3 | Green | Yellow | 50% |
| 4 | Green | Yellow | 75% |
| 5 (Highest) | Red | Red | 100% |

In one embodiment of the invention, the terrain layers intermediate between the lowest and the highest layer, as indicated in the second column, are displayed in varying densities of green. In this embodiment, the intermediate terrain layers are always colored green. The highest or peak elevations are displayed as a solid red or, for some applications, a red with a fill pattern of 75%. The lowest elevation are not displayed which will result in the lowest elevation being appearing in black on the weather radar CRT or EFIS display 402.

In another embodiment of the invention a distinction is made on the display 402 based on whether or not the aircraft is above or below the terrain. In this case, as indicated in the third column, the intermediate terrain layers above the altitude of the aircraft will be displayed in varying fill densities of yellow.

Since the lowest and highest terrain levels can be quite small in horizontal extent, for example sharp peaks, these layers can be smeared. In this case the surrounding cells in the database 24 are also depicted on the display 402 as either black or red as appropriate.

It should be noted that in aircraft where a color display such as the radar or EFIS 402 is not available, a monochrome display can be used. In this case, the terrain contours would be displayed in the varying fill patterns described above but, to enhance the distinctiveness of the highest layer, the highest layer can be made to blink on and off at a predetermined rate. There also may be some cases where it would be desirable to have the highest layer of the color display blink on and off instead of smearing or perhaps even in combination with smearing.

Figure 48:
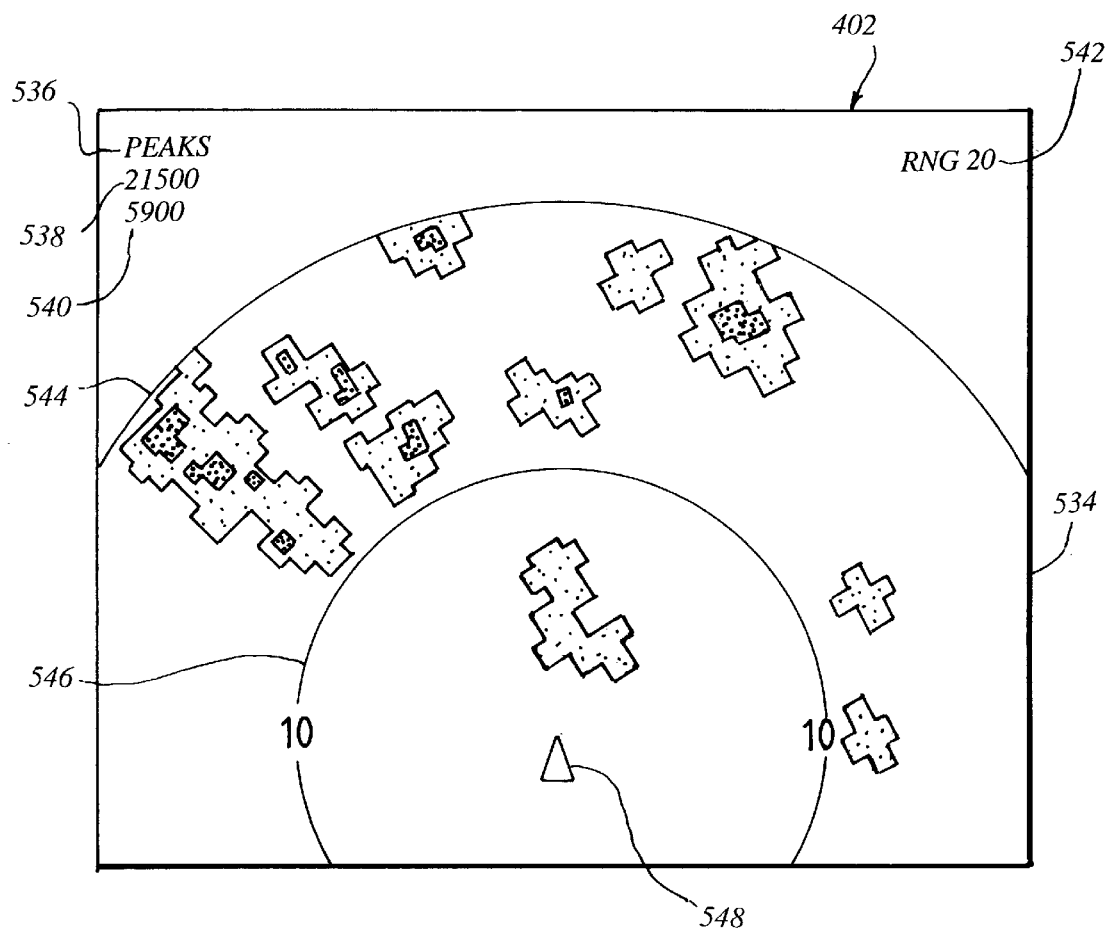
FIG. 48 is diagram of a cockpit display illustrating a terrain contour map generated by the terrain information system of FIG. 46.

A example of a Peaks mode display 534 on the weather radar display 402 is provided in FIG. 48. When the Peaks mode is selected, a legend "PEAKS" 536 is generated on the cockpit display 402 along with a numerical display 538 indicating the highest terrain elevation and a numerical display 540 of the lowest terrain elevation. The numerical displays 538 and 540 can also be combined and displayed in terms of hundreds of feet such as 215/59. The range of the terrain display 534 is also selectable and is shown at 542 on the top right of the display 402. One or more range rings 544 and 546 can also be included in the terrain contour display 534 to serve as an indication of the range of portions of the terrain from the aircraft which in turn is depicted as a triangle 548 in the lower center of the terrain display 534.

In order to provide a more intuitive display of the terrain contours, the intervals between the various layers displayed on the terrain display 534 are varied. In the preferred embodiment of the invention, the elevations of the tops of the layers are determined by the relations set forth in table 2 below. In table 2, $\Delta$ represents the difference between the highest elevation $h_{MAX}$ and the lowest elevation $h_{MIN}$ depicted on the terrain display 534.

TABLE 2

| Boundary | Value |
| --- | --- |
| Top of Layer 5 | $h_{MAX}$ |
| Top of Layer 4 | $h_{MIN}$ + 0.95$\Delta$ −100 ft |
| Top of Layer 3 | $h_{MIN}$ + 0.60$\Delta$ |
| Top of Layer 2 | $h_{MIN}$ + 0.30$\Delta$ |
| Top of Layer 1 | $h_{MIN}$ + 0.05$\Delta$ |
| Top of Layer 0 | $h_{MIN}$ + 200 ft |

As indicated in Table 2 above, the top of layer 0 will encompass all the terrain elevation cells that are within 200 feet of the minimum terrain elevation. In certain circumstances such as when the terrain is relatively flat, this constant can be reduced to a lower value such as 100 feet in order to provide a more detailed view of the terrain.

Preferably, in order to avoid cluttering of the display when the terrain is relatively flat, the layers of the contour display 534 are successively eliminated, beginning with layer 5, when the value of $\Delta$ is less than 600 feet. For essentially flat terrain, only layer 1 having a fill pattern of 12.5% or alternatively, a completely black display will be provided on the terrain display 534.

In the preferred embodiment, the top of layer 4 is determined by the relation $h_{MIN}$+95%$\Delta$−100 feet so as to insure that there is always some red displayed on the terrain display because there will be very little difference in elevation between layer 5 and layer 4. As can be seen from this relation, when the terrain is very flat, the terrain display 534 will be all black.

It will also be appreciated that in the preferred embodiment, there is very little difference in the elevation of the top of the lowest layer 0 and the top of the next layer 1. The advantage of this approach is that it can provide a display of the contours of rivers and shorelines which can be very useful to pilots with respect to geographical orientation.

Figure 47:
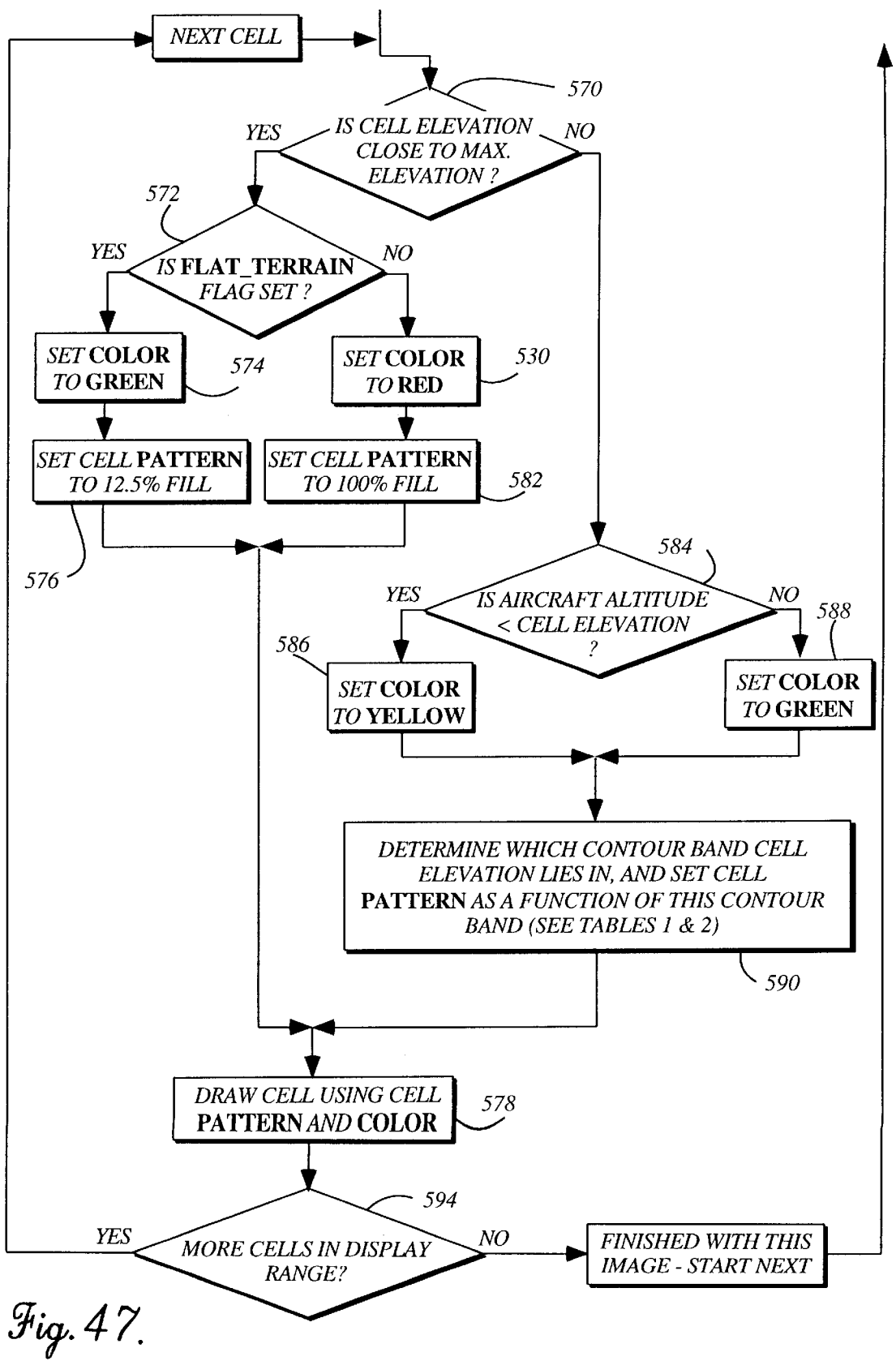
FIG. 47 is a flow chart illustrating the logic of the terrain contour map generated by the terrain information system of FIG. 46.
Figure 47A:
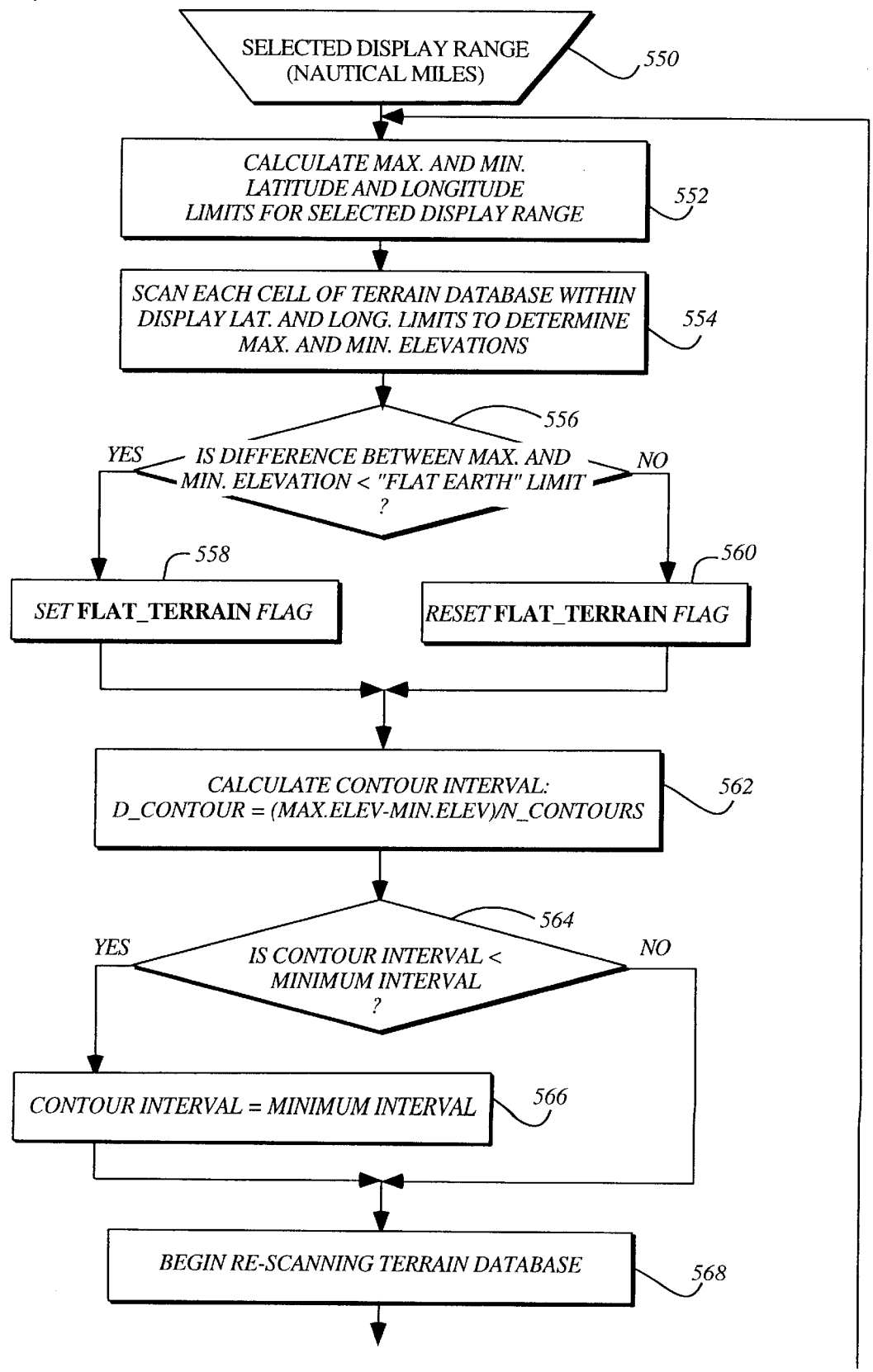

FIG. 47 is a flow chart generally illustrating the logic executed by the terrain information generator portion or peaks mode of the block 532 shown in FIG. 46. The first step in the peaks mode, as indicated at a block 550, the display range 542 is selected. Next, as shown at a pair of blocks 552 and 554, the values $h_{MAX}$ and $h_{MIN}$ are calculated for each cell in the terrain database 24 within the display range 542. Then, as indicated at a decision block 556, if the difference $\Delta$ between $h_{MAX}$ and $h_{MIN}$ is less than a predetermined value, for example 100 feet, then a "flat_terran" flag is set at a block 558 otherwise it is reset at a block 560.

At this point as indicated by a block 562, an interval between contour levels is calculated and a determination is made at a decision block 564 as to whether the interval is less than a predetermined minimum. If the contour interval is less than the minimum interval, then the value for the interval is set equal to the minimum as indicated at a block 566.

After the above computations have been performed, the peaks mode logic 532 starts a scan of each terrain cell within the display range as shown by a block 568. First, as indicated by a decision block 570, a determination is made as to whether the cell elevation is close to $h_{MAX}$. If it is, and if the flat_terrain flag is set, determined at a decision block 572, the logic generates, as shown at a pair blocks 574 and 576, a signal causing the display 402 indicated at a block 578, to draw the cell in green with a 12.5% fill pattern. Alternatively, if the flat_terrain flag is set, for example if $\Delta$ is less than 100, the display of each cell can be left black. Returning to the decision block 572 if the flat_terrain flag is not set, then, as indicated by a pair of blocks 580 and 582, the color of the cell is set to red with a 100% fill pattern.

In one embodiment of the invention, after a determination at the point 570 that the elevation is not close to $h_{MAX}$, the aircraft altitude is compared to the cell elevation as shown at a block 584. If the aircraft is below the cell elevation, the cell color is set to yellow, indicated by a block 586 otherwise, the cell is set green as indicated by a block 588. However, in the preferred embodiment, the intermediate cell colors will always be set to green. It should be noted, that if the cell elevation is equal to or below the lowest layer 0, no color will be generated for that cell.

After the cell color has been set at 586 or 588, the cell elevation is scaled and the cell fill pattern selected as shown at a pair of blocks 590 and 592. Preferably, this scaling and selection of cell fill patterns will be in accordance with the values set forth in Tables 1 and 2 above. The process described above is then repeated for each cell in the display range as indicated by a decision block 594.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An aircraft terrain information system for providing a visual display to the pilot of the contours of the terrain proximate to the aircraft, the warning system comprising:

position means for receiving signals representative of the position of the aircraft;

terrain data means for storing terrain data representative of terrain elevations;

a cockpit display; and contour means, responsive to said position means and said terrain data means, for displaying on said cockpit display a display of the contours of at least a portion of the terrain proximate to the aircraft wherein said contour display includes the highest $h_{MAX}$ and lowest $h_{MIN}$ terrain levels of said portion of the terrain.

2. The system of claim 1 wherein said contour displayed on said cockpit display is independent of the aircraft's altitude.

3. The system of claim 1 wherein said contour display is displayed as plurality of terrain contour layers between said highest and lowest levels.

4. The system of claim 3 wherein there are n of said contour layers and wherein n is equal to at least 5.

5. The system of claim 4 wherein at least a portion of the intervals between said contour layers is varied as a function of the difference Δ between said highest and lowest terrain levels.

6. The system of claim 4 wherein the intervals between said contour levels are not all equal.

7. The system of claim 6 wherein at least a portion of the intervals between said contour layers is a function of the difference Δ between said highest and lowest terrain levels.

8. The system of claim 3 wherein the last or highest of said displayed contour layers is displayed in a first color and the first or lowest contour layer is displayed in a second color.

9. The system of claim 8 wherein said contour layers intermediate said first and said last contour layers are displayed in a third color.

10. The system of claim 9 wherein first color is red and said second color is black.

11. The system of claim 10 wherein said third color is green.

12. The system of claim 9 additionally including altitude means for generating a signal representing the altitude of the aircraft and color selection means responsive to said altitude signal for displaying a portion of said intermediate contour layers in a fourth color when the aircraft is below the altitude of said portion of said intermediate colors.

13. The system of claim 9 wherein said intermediate layers have a dot pattern density that increases with increasing altitude.

14. The system of claim 6 wherein the tops of a plurality of said contour layers are equal to $h_{MIN}+K_N \Delta$ where the values of $K_n$ equal are less than 1.0.

15. The system of claim 14 wherein the top of the highest of said contour layers is at $h_{MAX}$.

16. The system of claim 14 wherein the top of the next to the highest of said contour layers is approximately equal to $h_{MIN}+0.95\Delta-100$ feet.

17. The system of claim 15 wherein the top of the lowest of said contour layers is a predetermined distance above $h_{MIN}$.

18. The system of claim 17 wherein said predetermined distance is between 100 feet and 200 feet.

19. The system of claim 5 wherein the number of layers n is a function of Δ such that below a first predetermined value of Δ the number n of said layers displayed is decreased as Δ is decreased.

20. The system of claim 19 wherein Δ is below a second predetermined value, thereby indicating that the terrain is relatively flat, only one of said layers is displayed.

21. The system of claim 1 wherein said contour means additionally displays on said cockpit display numeric values representing $h_{MIN}$ and $h_{MAX}$.

22. The system of claim 21 wherein said contour means additionally displays on said cockpit display a range value.

23. The system of claim 1 wherein said cockpit display is a weather radar display.

24. The system of claim 1 wherein said cockpit display is a navigational display.

25. The system of claim 3 wherein said display is a monochrome display and at least a portion of said contour layers are displayed in a dot pattern wherein said dot pattern density increases with increasing altitude.

26. The system of claim 25 wherein the highest of said contour layers blinks at a predetermined rate.

27. An aircraft terrain warning and information system for providing a visual display to the pilot of a warning of terrain proximate to the aircraft and alternatively a display of the contours of the terrain proximate to the aircraft, the warning system comprising:

position means for receiving signals representative of the position of the aircraft;

terrain data means for storing terrain data representative of terrain elevations;

altitude means for generating altitude signals representative of the altitude of the aircraft;

a cockpit display;

warning means responsive to said position means, said altitude signal and said terrain data means, for generating on said cockpit display a warning display of terrain proximate to the aircraft in response to predetermined warning criteria; and contour means, responsive to said position means and said terrain data means, for displaying on said cockpit display a display of the contour of the terrain proximate to the aircraft, wherein said displaying of the contour of terrain is performed independently of the degree of hazard of said terrain to the aircraft.

28. The system of claim 27 including selection means for selecting said contour display on said cockpit display.

29. The system of claim 28 wherein said selection means includes a switch located in the cockpit to enable the pilot to select said contour display.

30. The system of claim 28 wherein said selection means includes means for generating said contour display at the default display on said cockpit display.

31. The system of claim 28 means responsive to said warning criteria for replacing said contour display with said warning display.

32. The system of claim 27 wherein said contour displayed on said cockpit display is independent of the aircraft's altitude.

33. The system of claim 27 wherein said contour display is displayed as plurality of terrain contour layers between highest and lowest levels of said terrain proximate to the aircraft.

34. A method for displaying terrain information to a flight crew comprising the steps of:
  (a) obtaining information about aircraft position;
  (b) accessing a data base of terrain information; and
  (c) displaying on a display contours of at least a portion of the terrain proximate to the aircraft position wherein said contour display includes a highest $h_{max}$ and a lowest $h_{min}$ terrain levels of said portion of the terrain.

35. The method of claim 34 wherein the step of displaying said contours is independent of an altitude of the aircraft.

36. The method of claim 34 wherein the step of displaying said contours further comprises the steps of displaying a plurality of contour levels and wherein a highest of said contour levels is displayed in a first color and a lowest of said contour levels is displayed in a second color.

37. The method of claim 34 wherein the step of displaying said contours further comprises displaying a first color when a contour is above an altitude of an aircraft and a second color when a contour is below the altitude of the aircraft.

38. The method of claim 34 further comprising the step of displaying a range value.

39. The method of claim 34 wherein said step of displaying comprises displaying on a weather radar display.

40. The method of claim 34 wherein said step of displaying further comprises the step of displaying an elevation for each contour.

41. A device for providing terrain information to the flight crew of an aircraft comprising:
  an first input for receiving aircraft position data;
  a second input coupled to a terrain database;
  an output coupled to a display device; and
  a processor coupled to said first and said second input and to said display device for displaying on said display device a plurality of contours of at least a portion of terrain information stored in said terrain database, proximate to the aircraft wherein the contours displayed on said display device include a highest $h_{max}$ and a lowest $h_{min}$ terrain level of said portion of terrain information.

42. A device for providing terrain information to the flight crew of an aircraft comprising:
  an first input for receiving aircraft position data;
  a second input coupled to a terrain database;
  an output coupled to a display device; and
  a processor coupled to said first and said second input and to said display device for displaying on said display device a plurality of contours of at least a portion of terrain information stored in said terrain database, proximate to the aircraft wherein the contours displayed on said display device include a highest $h_{max}$ and a lowest $h_{min}$ terrain level of said portion of terrain information and wherein a contour above an altitude of the aircraft is displayed in a first color and a contour below the altitude of the aircraft is displayed in a second color.

43. An aircraft terrain information system for providing a visual display to the pilot of the contours of the terrain proximate to the aircraft, the warning system comprising:
  position means for receiving signals representative of the position of the aircraft;
  terrain data means for storing terrain data representative of terrain elevations;
  a cockpit display; and
  contour means, responsive to said position means and said terrain data means, for displaying on said cockpit displaying:
    a display of contours at a first altitude above the aircraft in a first color;
    a display of contours at a second altitude relative to the aircraft in a second color;
    a display of contours at a third altitude relative to the aircraft in a third color; and
    a display of contours at a fourth altitude relative to the aircraft in a fourth color.

44. A device for providing terrain information to the flight crew of an aircraft comprising:
  a first input for receiving aircraft position data;
  a second input coupled to a terrain database;
  an output coupled to a display device; and
  a processor, coupled to said first and said second input and to said display device for displaying on the display device, a plurality of contours of at least a portion of terrain information stored in said terrain database, proximate to the aircraft wherein the contours displayed on the display device include:
    contours at a first altitude above the aircraft in a first color;
    contours at a second altitude relative to the aircraft in a second color;
    contours at a third altitude relative to the aircraft in a third color; and
    contours at a fourth altitude relative to the aircraft in a fourth color.

45. A method for providing terrain information to the flight crew of an aircraft comprising the steps of:
  receiving aircraft position data;
  accessing a terrain database;
  displaying a plurality of contours of at least a portion of terrain information stored in said terrain database, proximate to the aircraft wherein the step of displaying contours includes the steps of:
    displaying contours at a first altitude above the aircraft in a first color;
    displaying contours at a second altitude relative to the aircraft in a second color;
    displaying contours at a third altitude relative to the aircraft in a third color; and
    displaying contours at a fourth altitude relative to the aircraft in a fourth color.

* * * * *

UNITED STATES PATENT AND TRADEMARK OFFICE
CERTIFICATE OF CORRECTION

PATENT NO.   : 6,092,009
DATED        : July 18, 2000
INVENTOR(S)  : J. Howard Glover Page 1 of 1

It is certified that error appears in the above-identified patent and that said Letters Patent is hereby corrected as shown below:

Related U.S. Application Data
U.S. Provisional Application No. 60/023,305 Jul.30, 1996 and U.S. Application Serial No. 08/509,642 Jul. 31, 1995.

Signed and Sealed this

Eighteenth Day of December, 2001

Attest:

JAMES E. ROGAN
*Attesting Officer*   *Director of the United States Patent and Trademark Office*

UNITED STATES PATENT AND TRADEMARK OFFICE
Certificate

Patent No. 6,092,009                                                         Patented: July 18, 2000

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: J. Howard Glover, Bellevue, Washington; and Kevin J. Conner, Kent, Washington.

Signed and Sealed this Fifth Day of November 2002.

*WILLIAM A. CUCHLINSKI, JR.*
*Supervisory Patent Examiner*
*Art Unit 3661*

UNITED STATES PATENT AND TRADEMARK OFFICE
CERTIFICATE OF CORRECTION

PATENT NO.    : 6,092,009
DATED         : July 18, 2000
INVENTOR(S)   : J. Howard Glover Page 1 of 1

It is certified that error appears in the above-identified patent and that said Letters Patent is hereby corrected as shown below:

<u>Column 12,</u>
Line 50, following the word path, delete "Y0" and insert -- Y --
Line 50, following the word is, delete "less" and insert -- greater --
Lines 62-63, following the word the, delete "flight path angle Y" and insert -- second datum THETA2 --

Signed and Sealed this

Twenty-first Day of January, 2003

JAMES E. ROGAN
*Director of the United States Patent and Trademark Office*